US009717088B2

(12) United States Patent
Reisslein et al.

(10) Patent No.: US 9,717,088 B2
(45) Date of Patent: Jul. 25, 2017

(54) MULTI-NODAL WIRELESS COMMUNICATION SYSTEMS AND METHODS

(71) Applicant: THE ARIZONA BOARD OF REGENTS FOR AND ON BEHALF OF ARIZONA STATE UNIVERSITY, Tempe, AZ (US)

(72) Inventors: Martin Reisslein, Tempe, AZ (US); Frank James, Tempe, AZ (US)

(73) Assignee: Arizona Board of Regents on behalf of Arizona State University, Tempe, AZ (US)

(*) Notice: Subject to any disclaimer, the term of this patent is extended or adjusted under 35 U.S.C. 154(b) by 154 days.

(21) Appl. No.: 14/852,461

(22) Filed: Sep. 11, 2015

(65) Prior Publication Data
US 2016/0081006 A1    Mar. 17, 2016

Related U.S. Application Data

(60) Provisional application No. 62/049,119, filed on Sep. 11, 2014.

(51) Int. Cl.
H04W 40/24    (2009.01)
H04W 72/04    (2009.01)
(Continued)

(52) U.S. Cl.
CPC ......... *H04W 72/0453* (2013.01); *H04L 45/66* (2013.01); *H04L 45/74* (2013.01); *H04W 40/24* (2013.01); *H04W 84/12* (2013.01)

(58) Field of Classification Search
CPC ........ H04L 45/66; H04L 45/74; H04W 40/24; H04W 72/0453; H04W 84/12
(Continued)

(56) References Cited

U.S. PATENT DOCUMENTS 6,801,508 B1*  10/2004  Lim .................... H04L 12/5601
                                                         370/310.1
7,570,629 B1*   8/2009  McCormack .......... H04L 45/16
                                                         370/352
(Continued)

OTHER PUBLICATIONS

James, F., "New Multi-nodal Wireless Communication System Method", Master of Science Thesis, Arizona State University, Tempe, Apr. 2014, pp. 1-141.

Primary Examiner — Chi H Pham
Assistant Examiner — Robert Lopata
(74) Attorney, Agent, or Firm — Ari M. Bai; Polsinelli PC

(57) ABSTRACT

A multi-nodal wireless communication system comprises a system controller configured to create a link layer communication network. The system controller comprises a set of hardware finite state machines configured to receive a frame from a device associated with the link layer communication network as a request for data transmission, identify that the frame includes a unique ID value, transmit the unique ID value to an associated hardware queue, the hardware queue configured to construct at least one frame header associated with a base station to facilitate data transmission between the base station and the first device or between the first device and the network using one frame header, and process the frame in the link layer communication network by facilitating communication between the first device and the base station using the at least one frame header or between the first device and the network using one frame header.

20 Claims, 55 Drawing Sheets

Overview of 802.11 Subsystems

(51) Int. Cl.
*H04L 12/721* (2013.01)
*H04L 12/741* (2013.01)
*H04W 84/12* (2009.01)

(58) Field of Classification Search
USPC .......................................................... 370/329
See application file for complete search history.

(56) References Cited

U.S. PATENT DOCUMENTS

| | | |
|---|---|---|
| 8,068,479 B2 | 11/2011 | Martin et al. |
| 8,599,829 B2 | 12/2013 | Martin et al. |
| 2004/0136390 A1* | 7/2004 | Kim ........................ H04L 29/06 |
| | | 370/412 |
| 2005/0157690 A1 | 7/2005 | Frank et al. |
| 2005/0265298 A1* | 12/2005 | Adachi ............. H04W 72/1289 |
| | | 370/338 |
| 2006/0140112 A1* | 6/2006 | Ginzburg ................ H04L 47/10 |
| | | 370/229 |
| 2007/0147424 A1* | 6/2007 | Anigstein ............... H04L 25/14 |
| | | 370/469 |
| 2012/0087312 A1* | 4/2012 | Laroia .................... H03L 7/085 |
| | | 370/328 |
| 2012/0093068 A1* | 4/2012 | Okuda ................... H04B 7/155 |
| | | 370/315 |
| 2013/0080563 A1* | 3/2013 | Archer .............. G06F 15/17318 |
| | | 709/212 |
| 2014/0328350 A1* | 11/2014 | Hao ........................ H04L 47/80 |
| | | 370/401 |
| 2017/0013449 A1* | 1/2017 | Raman ................. H04W 12/06 |

\* cited by examiner

Example Inter-RAT Handover Setup (4G Source to 3G Target Network) (Barton, 2012)

*Example of Inter-RAT Handoff Execution (4G Source to 3G Target Network)*
*(Barton, 2012)*

WiFi: 802.11

| FC | Duration /ID | Addr1 | Addr2 | Addr3 | Seq# | Addr4 | Payload | FCS | |
|---|---|---|---|---|---|---|---|---|---|
| 2 | 2 | 6 | 6 | 6 | 2 | 6 | 0-2312 | 4 | Bytes |

| Protocol Version | Type | SubType | To DS | From DS | More Frags | Retry | More Data | WEP | Order | |
|---|---|---|---|---|---|---|---|---|---|---|
| 2 | 2 | 4 | 1 | 1 | 1 | 1 | 1 | 1 | 1 | Bits |

Ethernet: 3 Frame Types

1) Ethernet: (Most Common = DIX)

| Preamble | DEL | DST MAC | SRC MAC | Ethernet Type | Payload | CRC |
|---|---|---|---|---|---|---|

2) Ethernet: (802.3 + LLC-802.2)

| Preamble | DEL | DST MAC | SRC MAC | Ethernet Length | LLC | Payload | CRC |
|---|---|---|---|---|---|---|---|

3) Ethernet: (802.3 + LLC=0xFFFF), 802.3 Only

| Preamble | DEL | DST MAC | SRC MAC | Ethernet Length | LLC | Payload | CRC |
|---|---|---|---|---|---|---|---|

4) Ethernet: (802.3 + LLC-802.2 + SNAP)

| Preamble | DEL | DST MAC | SRC MAC | Ethernet Length | LLC | SNAP | Payload | CRC |
|---|---|---|---|---|---|---|---|---|

VLAN Frame: (VLAN Header)

| Preamble | DEL | DST MAC | SRC MAC | TPID | Priority | CFI | VLAN ID | Ethernet Length/Type | ... |
|---|---|---|---|---|---|---|---|---|---|

*Network Frame Headers that may be pre-populated on a per Flow basis*

FIG. 13

| Preamble | Ethernet MAC | VLAN | FC | DATA | 802.11 MAC | PAYLOAD | CRC |
|----------|--------------|------|------|--------|-------------|---------|-----|
| Preamble | Ethernet MAC | VLAN | FC | DATA | Cellular MAC | PAYLOAD | CRC |
| Preamble | Ethernet MAC | VLAN | FC | FUNC | Meas. Chan. | Last=1 | CRC |
| Preamble | Ethernet MAC | VLAN | FC | FUNC | Chan. Est. | Last=1 | CRC |
| Preamble | Ethernet MAC | VLAN | FC | FUNC | Download FW | Last=1 | CRC |
| Preamble | Ethernet MAC | VLAN | FC | FUNC | Radio Ctrl Mask | Last=1 | CRC |
| Preamble | Ethernet MAC | VLAN | FC | FUNC | Beacon Template | Last=1 | CRC |
| Preamble | Ethernet MAC | VLAN | FC | FUNC | Probe Template | Last=1 | CRC |
| Preamble | Ethernet MAC | VLAN | FC | FUNC | ACK Template | Last=1 | CRC |

*Frame Format Examples*

FIG. 14

Example Spread Spectrum Rx (5 MHz) Mixed with AWGN

Blackman-Tukey (Signal+no noise, left plot: Signal+noise, right plot), Hamming Window, Lag = 20

Covariance, (Signal+No Noise, left plot, Signal+Noise, right plot) Model Order = 30

*Covariance, (Signal+No Noise, left plot, Signal+Noise, right plot)*
*Model Order = 5*

Modified Covariance, (Signal+No Noise, left plot, Signal+Noise, right plot), Model Order = 30

| Algorithm Runs | Resolution | 1 | 2 | 3 | 4 | 5 | 6 | 7 | 8 | 9 | 10 | Mean (u) |
|---|---|---|---|---|---|---|---|---|---|---|---|---|
| Blackman Tukey | High | 100 | 66.67 | 100 | 100 | 66.67 | 100 | 100 | 100 | 66.7 | 66.7 | 86.668 |
| Welch | High | 66.67 | 66.67 | 33.33 | 66.67 | 33.33 | 66.7 | 66.7 | 66.67 | 66.7 | 100 | 63.335 |
| Yule Walker | High | 66.67 | 100 | 100 | 100 | 33.33 | 100 | 100 | 66.67 | 66.7 | 66.7 | 80.001 |
| Burg | High | 66.67 | 66.67 | 66.67 | 66.67 | 66.67 | 66.7 | 66.7 | 33.33 | 66.7 | 66.7 | 63.336 |
| Covariance | High | 66.67 | 100 | 66.67 | 33.33 | 66.67 | 33.3 | 100 | 33.33 | 66.7 | 66.7 | 63.334 |
| Modified Covariance | High | 66.67 | 33.33 | 33.33 | 100 | 100 | 66.7 | 33.3 | 100 | 100 | 100 | 73.333 |
| MUSIC | High | 100 | 33.33 | 100 | 100 | 66.67 | 66.7 | 66.7 | 100 | 100 | 66.7 | 80.001 |
| Blackman Tukey | Medium | 66.67 | 66.67 | 66.67 | 66.67 | 66.67 | 33.3 | 66.7 | 66.67 | 66.7 | 66.7 | 63.336 |
| Welch | Medium | 66.67 | 66.67 | 33.33 | 33.33 | 33.33 | 66.7 | 66.7 | 66.67 | 66.7 | 66.7 | 56.668 |
| Yule Walker | Medium | 66.67 | 66.67 | 66.67 | 66.67 | 66.67 | 66.7 | 66.7 | 33.33 | 66.7 | 66.7 | 63.336 |
| Burg | Medium | 66.67 | 66.67 | 66.67 | 66.67 | 33.33 | 66.7 | 66.7 | 66.67 | 66.7 | 66.7 | 63.336 |
| Covariance | Medium | 66.67 | 66.67 | 66.67 | 33.33 | 66.67 | 33.3 | 66.7 | 66.67 | 66.7 | 66.7 | 60.002 |
| Modified Covariance | Medium | 33.33 | 33.33 | 66.67 | 66.67 | 66.67 | 66.7 | 66.7 | 66.67 | 66.7 | 66.7 | 60.002 |
| MUSIC | Medium | 100 | 33.33 | 66.67 | 66.67 | 33.33 | 100 | 66.7 | 66.67 | 66.7 | 100 | 70.001 |
| Blackman Tukey | Low | 66.67 | 66.67 | 66.67 | 66.67 | 66.67 | 66.7 | 33.3 | 66.67 | 66.7 | 66.7 | 63.336 |
| Welch | Low | 66.67 | 66.67 | 33.33 | 33.33 | 33.33 | 66.7 | 66.7 | 66.67 | 66.7 | 66.7 | 56.668 |
| Yule Walker | Low | 66.67 | 66.67 | 66.67 | 66.67 | 66.67 | 66.7 | 66.7 | 66.67 | 66.7 | 66.7 | 66.67 |
| Burg | Low | 66.67 | 66.67 | 66.67 | 66.67 | 33.33 | 66.7 | 66.7 | 66.67 | 66.7 | 66.7 | 63.336 |
| Covariance | Low | 66.67 | 66.67 | 66.67 | 33.33 | 66.67 | 66.7 | 33.3 | 66.67 | 66.7 | 66.7 | 60.002 |
| Modified Covariance | Low | 33.33 | 0 | 66.67 | 66.67 | 66.67 | 66.7 | 66.7 | 66.67 | 66.7 | 33.3 | 53.335 |
| MUSIC | Low | 33.33 | 66.67 | 33.33 | 66.67 | 33.33 | 66.7 | 66.7 | 66.67 | 33.3 | 33.3 | 50 |

*Output Results (Response) Table*

FIG. 42

ANOVA analysis of output results (Plot 1: (L) Algorithm vs Mean & Plot 2: (R) Resolution vs Mean)

ANOVA analysis of output results ((L) Algorithm vs Mean & (R) Resolution vs Mean)

Tukey HSD Means Test (Test for Interaction)

FIG. 47

Example of a HW Design/IP Verification and Unit Test Environment

Queue 1: 30% Quality of Service

Android 1:    10.1.1.2
    Android 2:    10.1.1.3
    Android 3:    10.1.1.4
    Android 4:    10.1.1.5

Queue 2: 50% Quality of Service iPad 1:    100.1.1.2
    iPad 2:    100.1.1.3
    iPad 3:    100.1.1.4
    iPad 4:    100.1.1.5

Queue 3: 20% Quality of Service

SamSung 1:    100.1.1.20
    SamSung 2:    100.1.1.30
    SamSung 3:    100.1.1.40
    SamSung 4:    100.1.1.50

Explanation:
When a device associates to a network, messages are exchanged between the network and the device.

In this case, the messages would be forwarded to the centralized controller that would then associate the device ID (in this example, IP address) to the end mobile device. At the same time queues would be setup based upon user configuration (type of device).

FIG. 52

Example: Aggregate = 100 pps -> pps=Packets Per Second

Queue 1: 25% Quality of Service = 25 packets per sec from this queue
    Android 1:    10.1.1.2
    Android 2:    10.1.1.3
    Android 3:    10.1.1.4
    Android 4:    10.1.1.5

Queue 2: 50% Quality of Service = 50 packets per sec from this queue
    iPad 1:    100.1.1.2
    iPad 2:    100.1.1.3
    iPad 3:    100.1.1.4
    iPad 4:    100.1.1.5

Queue 3: 25% Quality of Service = 25 packets per sec from this queue
    SamSung 1:    100.1.1.20
                    -Packet 1 (800 Bytes)
                    -Packet 2 (700 Bytes)
                    -Packet 3 (800 Bytes)
                    -Packet 4 (700 Bytes)    Explanation:
    SamSung 2:    100.1.1.30              As frames come in from the
    SamSung 3:    100.1.1.40              network to individual devices, they
    SamSung 4:    100.1.1.50              are distributed to the appropriate
                                                  device queue.

FIG. 53

MULTI-NODAL WIRELESS COMMUNICATION SYSTEMS AND METHODS

CROSS REFERENCE TO RELATED APPLICATIONS

This is a non-provisional application that claims benefit to U.S. provisional application Ser. No. 62/049,119, filed on Sep. 11, 2014, and is herein incorporated by reference in its entirety.

FIELD

The present document relates generally to multi-nodal wireless communications systems and methods; and more particularly, to performance roaming and autonomous distribution of wireless devices.

BACKGROUND

Wireless Technologies such as Wi-Fi and Cellular are converging in the market place. This convergence promotes a need for link layer network technologies that better facilitates the convergence of these technologies both from the radio frequency (RF) modulation adaptation perspective as well as from the link layer protocol support perspective. The following describes two main wireless technologies.

Wi-Fi Technology

Wi-Fi base stations (often referred to as Wi-Fi access points) are devices that are deployed in disparate locations where RF coverage is needed; they are found in houses, supermarkets, shops, and college campuses. Often these devices have memory, a general purpose processor (GPP), a modem which is often comprised of a digital signal processor, and hardware (HW) such as a field programmable gate array (FPGA) as well as RF hardware (e.g. filter, amplifier, impedance circuit, antenna, etc. . . . ). Newer designs now have system-on-chip (SoC) designs which combine the GPP with digital signal processing (DSP) Intellectual Property (IP) technologies so they provide a more integrated and smaller form factor solution. These designs, however, require memory and an RF front end to support the receiver(s) and transmitter(s) and additionally require a network interface for network access to the private network of the service provider that interconnects with the Wide Area Network (WAN) wired for the purpose of providing access to the Internet as well as management support interfaces so that remote operation and maintenance (O&M) can be supported. The 802.11 base stations such as found on cell towers can provide a modem or wired network interface that can be multiplexed across a remote microwave channel or connected directly to fiber, ATM, or Ethernet network.

The RF characteristics of Wi-Fi devices commonly utilize omni-directional antennas. Multiple antennas on these devices are controlled separately to transmit separate spatially diverse streams. Wi-Fi device modulation techniques such as the use of Complementary Code Key (CCK) in concert with Quadrature Phase Shift Keying (QPSK) for 802.11b, CCK and Orthogonal Frequency Division Multiplexing (OFDM) in concert with Quadrature Amplitude Modulation (QAM) (e.g. 16 or 64 QAM) or Phase Shift Keying (PSK) (e.g. BPSK or QPSK) are both used for 802.11g, OFDM with QAM or PSK used on each subcarrier is only used for 802.11a, 802.11n (max. 64 QAM, rate 5/6) utilizes OFDM in concert with QAM and PSK modulation techniques, and lastly 802.11 ac which can utilize 256 QAM (rates 3/4 and 5/6) with use of MIMO to perform spatial diversity between multiple OFDM user streams using much smaller cell sizes.

Management support interfaces for Wi-Fi devices are defined by the Telecommunications Management Network (TMN) model which encourage protocol support for different layers of a network infrastructure. Simple Network Management Protocol (SNMP) is the predominant protocol in national provider networks today.

Cellular Technology

Cellular base stations, as is the case with Wi-Fi base stations, are located across the country in proximity to cellular towers. Often these towers are visible in close proximity to interstates, highways, and neighborhoods; these towers are found (sometimes camouflaged) in areas where RF coverage is needed. These towers are commonly referred as "cell towers" and often are equipped with dipole antennas so as to reduce impedance mismatch between the receiver and the antenna (impedance mismatch causes Voltage Standing Wave Ratio (VSWR) which is a measure of reflected voltage) that causes transmitter signal distortion. As is the case with Wi-Fi devices, these devices have memory, a general purpose processor (GPP), a modem which is often comprised of a digital signal processor and other hardware such as a FPGA. Newer designs now have system-on-chip (SoC) designs which combine the GPP with the DSP technologies so they require a smaller form factor. These designs, however, require memory and an RF front ends (e.g. filter, amplifier, impedance circuit(s) and antenna(s)) to support the receiver(s) and transmitter(s) and additionally require management support interfaces so that remote operation and maintenance (O&M) can be supported. Unlike Wi-Fi, these devices have additional subsystems that manage roaming between many different cells across the country. In addition, many transceivers are located at the same location. The common modulation techniques used by cellular base stations are Gaussian Minimum Shift Keying (GMSK) for Global System for Mobile Communications (GSM), that is data is sent through a Gaussian filter before it is MSK modulated/demodulated, Code Division Multiple Access (CDMA2000) in concert with PSK (e.g. BPSK, QPSK), WCDMA in concert with PSK or QAM which is used for Universal Mobile Telecommunications System (UMTS) systems. T-Mobile and AT&T utilize UMTS/GSM, while Verizon utilizes CDMA2000 for voice transmissions while using LTE which uses Orthogonal Frequency Multiple Access (OFDMA, different subcarriers are utilized to transmit to different cellular mobile entities) in concert with PSK or QAM on each subcarrier for data transmission. Cellular base stations often utilize dipole antennas that reduce the amount of impedance mismatch found in 50 ohm coax connections between the antenna and the RF front end. The RF front end is comprised of a high bandwidth filter(s), antenna(s), impedance circuit(s), and amplifier(s).

Cellular and Wi-Fi System Comparison

Wi-Fi RF cell coverage sizes are limited by their higher frequency (WiFi=2.4 GHz and 5 GHz versus cellular/850 MHz), limited allowed power transmission interference from other devices in this unlicensed band (though somewhat mitigated by its modulation technique), and more importantly by their link layer communication specification. Unlike cellular communication, Wi-Fi communication devices specify a link layer communication model based upon a CSMA/CA format. The CSMA/CA format is not as effective multiple access protocol as is the case with TDM, OFDMA or CDMA technologies. Though Wi-Fi can close links at longer distances, greater amplification and antenna directivity is required as well as cooperative changes to the Wi-Fi link layer timing specifications. Example: DIFS is the amount of time a station must sense a clear radio before beginning a new transmission sequence. Note that a node can format and buffer a data frame to be transmitted during this time interval. SIFS is the amount of time a station must wait before sending or beginning to receive a RTS, CTS or ACK frame, note that the SIFS time includes the amount of time to format the ACK frame to be transmitted; this is possible since only the first portion of the data frame (e.g. BSSID) is used in the ACK message. PIFS is the DIFS for the access point in a special access method known as Point Coordination Function. The times are defined such that the RTS, CTS, and ACK frames are given a higher priority (i.e. once a packet transmission sequence has begun, the station holds onto the channel until it is finished). Without 802.11 RTS/CTS handshaking the following time periods are observed.

IEEE mandates the following timing for 802.11a:
Time Slot=9 μs
SIFS=16 μs $$DIFS_{802.11a} = SIFS + 2 \times Time\ Slot = 34\ \mu s \quad (1)$$

IEEE mandates the following timing for 802.11b:
Time Slot=20 μs
SIFS=10 μs
PIFS=SIFS+Time Slot=30 μs $$DIFS_{802.11b} = SIFS + 2 \times Time\ Slot = 50\ \mu s \quad (2)$$

IEEE mandates the following timing for 802.11g:
Time Slot=9 μs
SIFS=10 μs $$DIFS_{802.11g} = SIFS + 2 \times Time\ Slot = 28\ \mu s \quad (3)$$

Sender procedure: Wait DIFS, Send Data, Wait SIFS, Listen for and receive ACK (until maximum ACK timeout), Repeat Receiver Procedure: Listen for and receive Data, Wait SIFS, Send ACK, Wait DIFS. Given this link layer communication protocol, the destination must start constructing the ACK message once the first part of the data message has been received. Once it has been determined that the data message was received without error, an ACK message may be transmitted. The following is the timing calculation for sending the ACK message:

$$\tau\_total = \tau\_ACK(+\tau\_SIFS) \quad (4)$$

$\tau_{total}$=Total Time
$\tau_{ACK}$=Transmission of ACK message
$\tau_{SIFS}$=Short Interframe Spacing With the speed of light $3 \times 10^8$ m/sec, a 802.11 ACK transmission can travel a distance of 300 m/usec. Assuming a normal transmission of an ACK message, the receiver could be no greater than 3 km (given the speed of light, a nice number) away or 10 usec. If ACK timeout was increased (to say 19 usec), the maximum slot time for a point to multi-point communication environment is equal to the slot time. For 802.11b the slot time of 20 usec equates to a maximum distance of 6 km. Other wireless standards have similar limitations but the distances are shorter.

Cellular requirements to address cellular reselection within greater cell sizes (>1 Km), though is possible with some cellular protocols, requires special configuration of the cellular chipsets to accomplish. 802.11, due to the CSMA/CA protocol requirements is much harder to accomplish unless it is a point to point connection. FIG. 3 describes the general cellular reselection process as defined by the 2G specification (3G specification includes neighbor list evaluation—not depicted here).

It is with these observations in mind, among others, that various aspects of the present disclosure were conceived and developed.

SUMMARY

Implementations described and claimed herein address the foregoing problems, among others, by providing systems, methods, and devices for high performance roaming and autonomous distribution of wireless devices where the repetitive data path functions for each individual client device is implemented in hardware. Aspects of the present disclosure further include enhancing radio transmission such that end user devices may choose a base station over other base stations in an area (based upon Power Spectral Density (PSD) and broadcast transmission parameters). Aspects of the present disclosure further include end user service based queuing and an end user device prioritization configuration. Accordingly, one implementation of the present disclosure may take the form of a multi-nodal wireless communications system comprising at least one system controller configured to create a link layer communication network. The system controller comprises a set of hardware finite state machines configured to: receive a network frame buffer from a base station associated with the link layer communication network; evaluate a source address of the base station; translate the source address to a unique ID value; transmit the unique ID value to a hardware queue; construct at least one predefined frame header template associated with the base station by the hardware queue to facilitate data transmission for the base station; receive a frame from a device associated with the link layer network as a request for the data transmission; identify that the frame includes the unique ID value; retrieve instructions and classifications associated with the unique ID value to locate at least one predefined frame header template associated with the base station; and process the frame in the link layer communication network using the instructions and classifications and the at least one predefined frame header template.

Another implementation of the present disclosure may take the form of a multi-nodal wireless communications system, comprising: at least one system controller configured to create a link layer communication network, the system controller comprising a set hardware finite state machines configured to: receive a frame from a first device associated with the link layer communication network as a request for data transmission; identify that the frame includes a unique ID value; transmit the unique ID value to an associated hardware queue, the hardware queue configured to construct at least one frame header associated with a base station to facilitate data transmission between the base station and the first device or between the first device and the network using one frame header; and process the frame in the link layer communication network by facilitating communication between the first device and the base station using the at least one frame header or between the first device and the network using one frame header.

Another implementation of the present disclosure may take the form of a method of transmitting data frames in a multi-nodal wireless communications system, comprising: utilizing a system controller configured to create a link layer communication network, the system controller including a set of hardware finite state machines configured to perform the operations of: receiving a first frame from a device associated with the link layer communication network as a request for data transmission; identifying that the first frame includes a unique identifier; transmitting the unique identifier to an associated hardware queue, the hardware queue configured to construct at least one predefined frame header associated with a base station to facilitate data transmission between the base station and the device; and processing the first frame in the link layer communication network by facilitating communication between the device and the base station using the at least one predefined frame header.

BRIEF DESCRIPTION OF THE DRAWINGS

FIG. 13 is a simplified illustration of network frame headers;

FIG. 14 is a simplified illustration of frame format examples;

FIG. 42 is a table showing output results;

Figure 47:
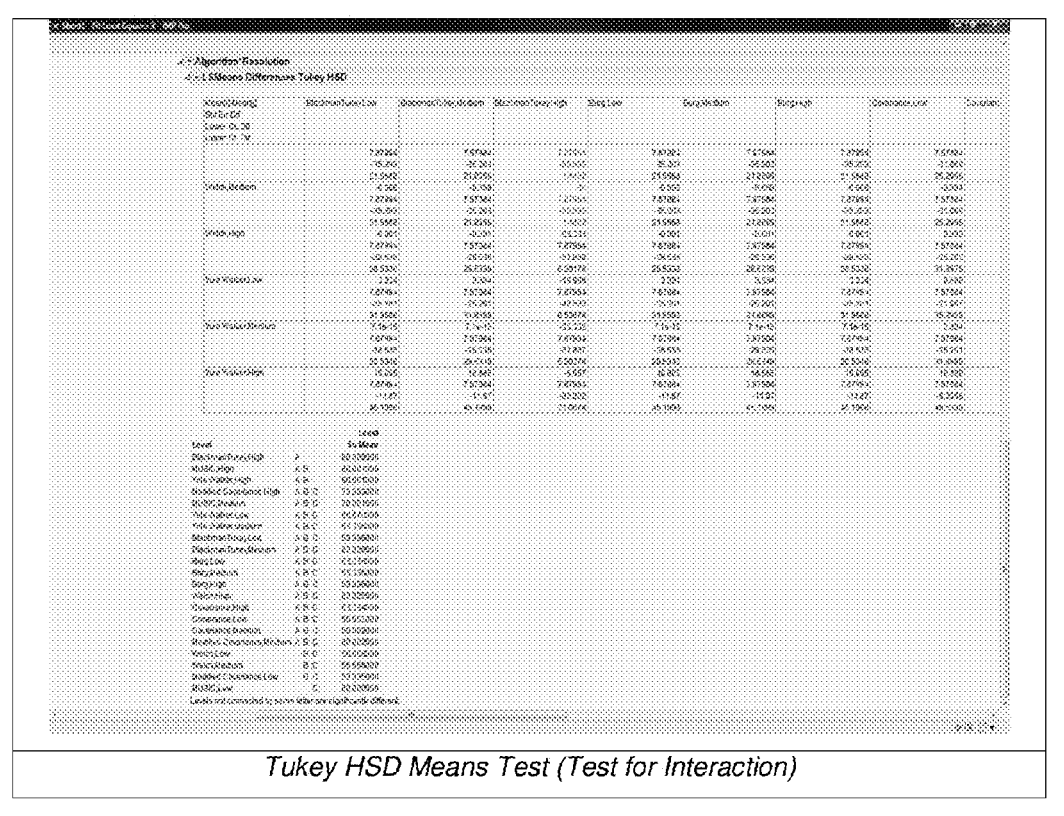

FIG. 47 is an illustration showing a Tukey HSD means test;

FIG. 52 is a simplified illustration showing end user service based queuing.

FIG. 53 is a simplified illustration showing additional details regarding end user service based queuing.

Corresponding reference characters indicate corresponding elements among the view of the drawings. The headings used in the figures do not limit the scope of the claims.

DETAILED DESCRIPTION

Figure 1:
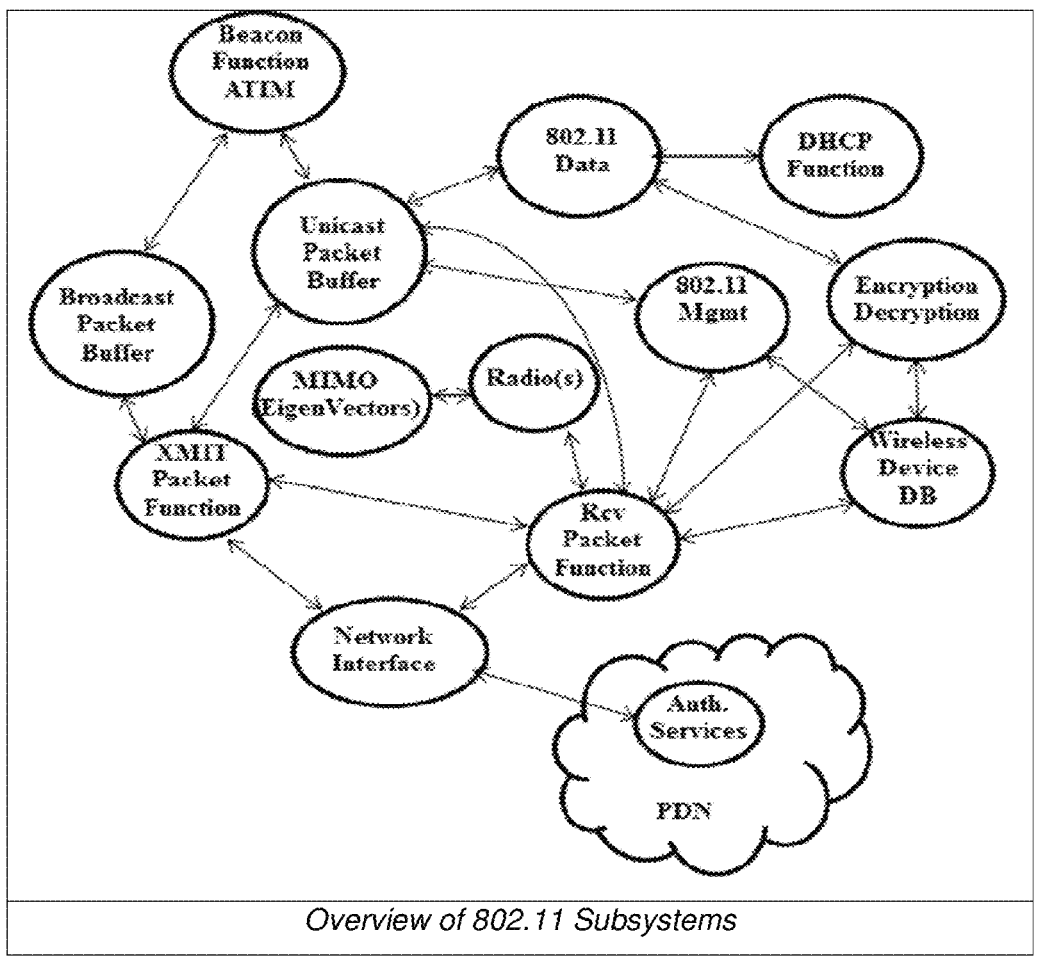
FIG. 1 is a simplified illustration of an overview of 802.11 subsystems.
Figure 2:
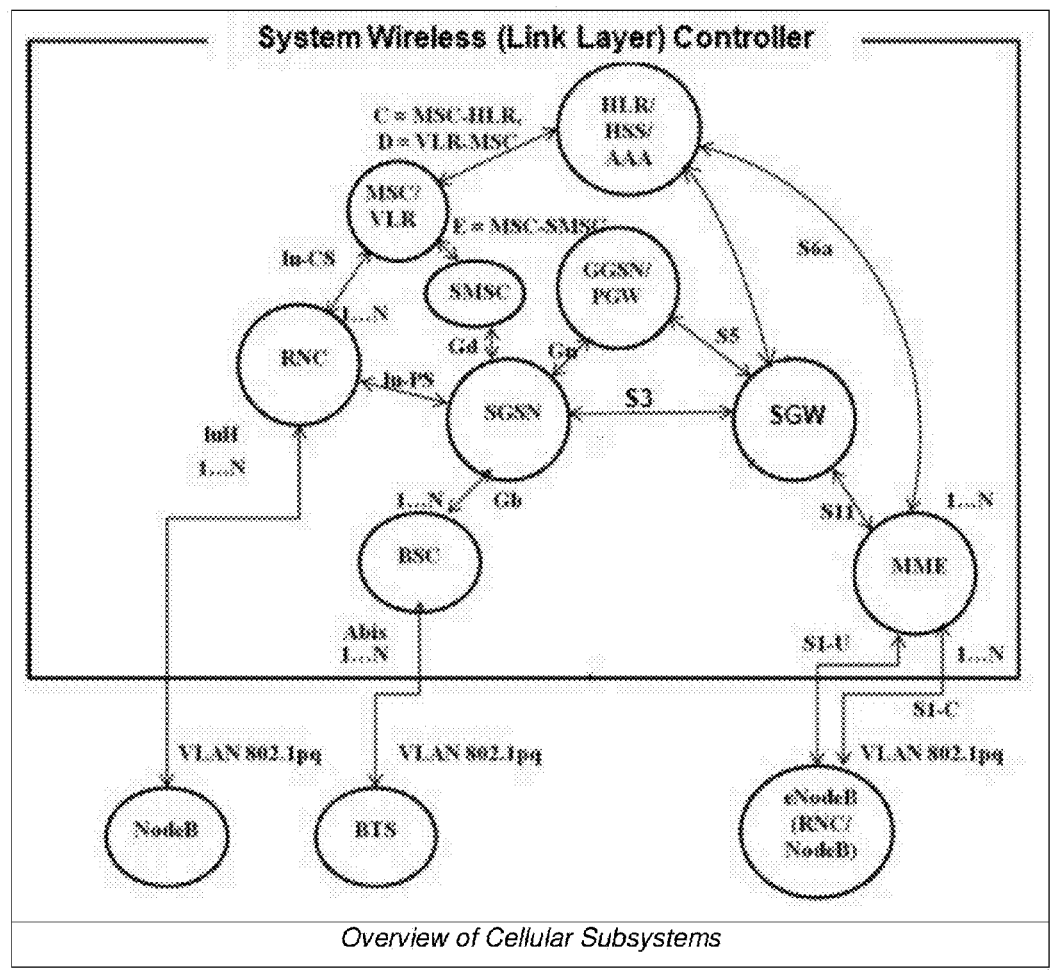
FIG. 2 is a simplified illustration of cellular subsystems.
Figure 3:
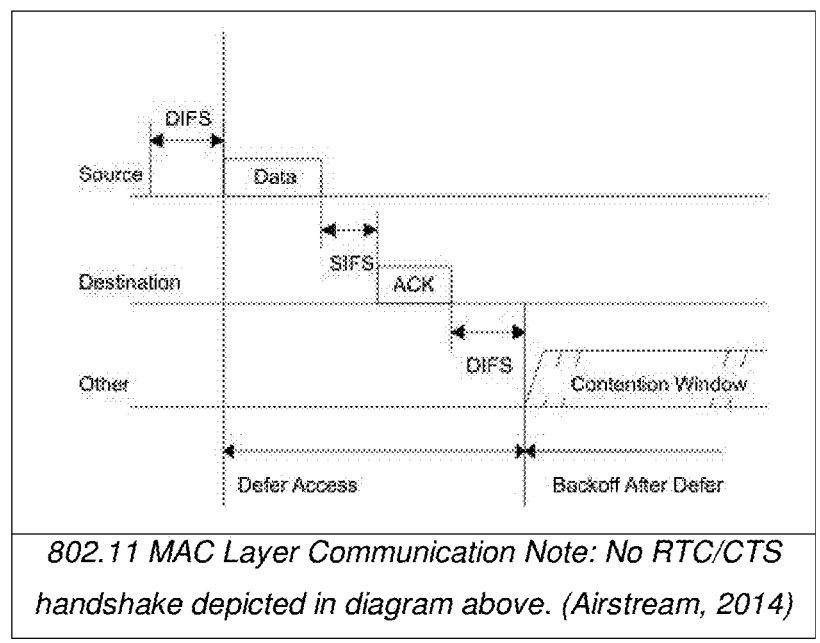
FIG. 3 is a simplified illustration showing an 802.11 MAC layer communication.

Aspects of the present disclosure include systems, methods, and devices for high performance roaming through autonomous distribution of wireless devices and improved performance where the repetitive data path functions for each individual client device is implemented in hardware in a system controller architecture. Aspects of the present disclosure further include enhancing radio transmission such that end user devices may choose a base station over other base stations in an area (based upon Power Spectral Density (PSD) and broadcast transmission parameters). This is important because it implies that the number of cellular devices connected to a specific cellular base station can be controlled with the use of parameters transmitted in the Broadcast Channel (BCCH). Aspects of the present disclosure further include end user service based queuing and an end user device prioritization configuration.

Unlike 802.11 devices, assuming sufficient transmit power and sufficient receive sensitivity; a base station can attract distant devices in the same manner. Though many 3G/4G chipsets (i.e. Mindspeed/Intel) have a time limitation (~1 Km distance) in regard to how long they will wait for a response from a peer device, chipsets can be programmed to deal with devices at greater distances >~1 Km by configuring the chipset to only respond to devices within a circular area with a diameter of ~1 Km 'distance of interest' for distances >1 Km, ignoring devices that are not within that area of interest.

Wi-Fi and cellular devices used in hot spots (locations that represent extensions to the Internet) may use link layer protocols to control access to the Wireless Local Area Network (WLAN) and ultimately to the Wide Area Network (WAN). Both wireless technologies may form a LAN environment where IP addresses with a subnet designation may be delivered to individual devices for data access. Cellular devices utilize IP addresses primarily for data access, but with Long Term Evolution may use these services for using voice services as well. These addresses are then allowed access to the WAN through a network process referred to as Network Address Translation (NAT). During normal operation each device initiates a data connection and delivers network frames that are transmitted to the backbone network of a service provider through a network gateway. The network gateway provides the NAT service that is used to proxy IP network requests to the WAN.

Wi-Fi and cellular devices used in an enterprise network environment may not utilize NAT, but rather be assigned IP addresses distributed by a router or server that supplies Dynamic Host Configuration Protocol (DHCP) for the enterprise network. Link layer network technology can be used to facilitate adaptation to legacy network infrastructure, adaptation to new network backhauls, QoS of wired integration points within a legacy or new Wide Area Network (WAN) entry point. QoS of wireless technology that utilizes techniques such as MIMO and virtual roaming (discussed later). As the performance at the edge of the network continues to increase, more demands will be made on the network infrastructure to perform QoS functions nearer to the edge of the network.

Figure 4:
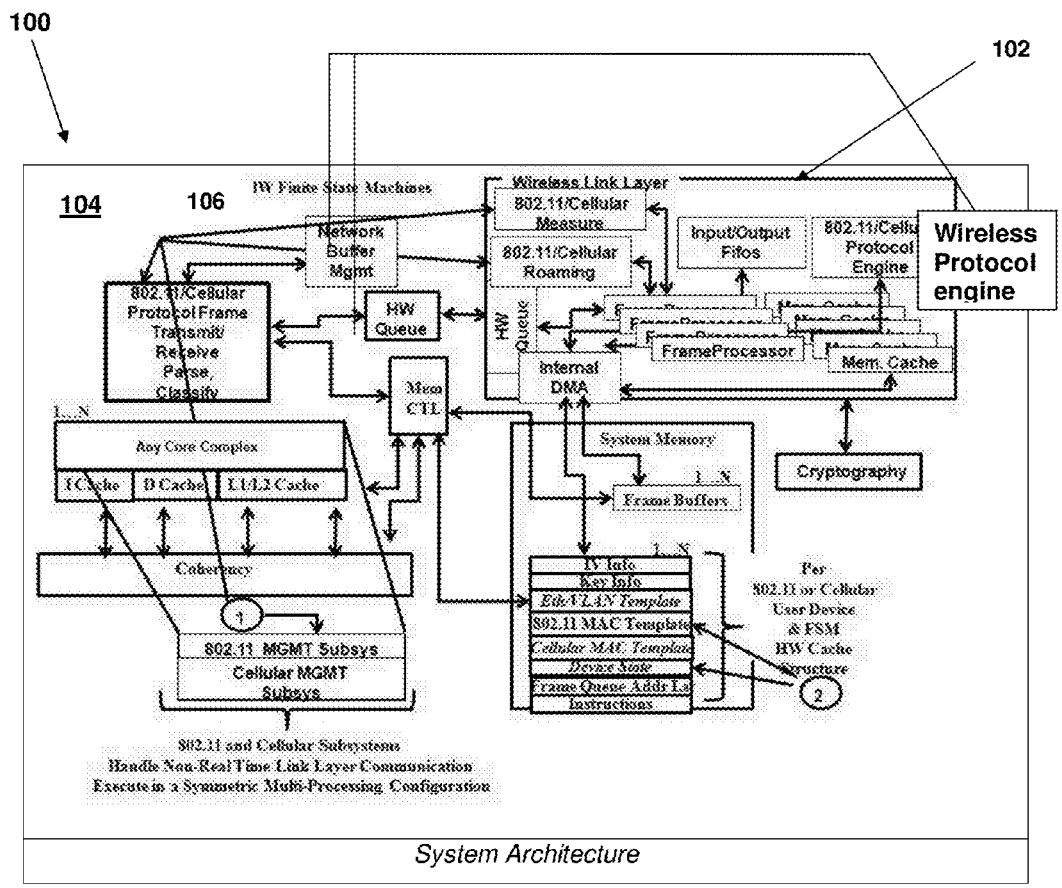
FIG. 4 is a simplified block diagram of a proposed system architecture.

Aspects of a new multi-nodal wireless communication system, designated 100, shown in FIG. 4 entail the following attributes:

1. High performance roaming through the autonomous distribution of wireless devices by selectively communicating through different base stations to end devices.
2. Higher performance wireless communication where the repetitive data path functions for each individual client device is implemented in hardware through a system controller.
3. The measurement of Power Spectral Density across multiple RF cells to determine the best integration of 802.11 and cellular backhaul systems while performing intelligent frequency distribution across adjacent cells.
4. Integration of WiFi and cellular backhaul networks to utilize the same network topology.
5. Cognitive adaptation of Digital Signal Processing (DSP) parameters based upon empirical measurement of RF environmental parameters. These measurements aid the system controller in deciding which base station to utilize for communication (this is possible because measurements are more frequent and fast, since they are implemented in hardware).
6. The ability to prioritize frames based upon link layer behavior.
7. The use of security encryption utilizing random numbers that are generated from a system with a sufficient amount of entropy (to be quantified later).

The multi-nodal wireless communication system 100 follows the paradigm that the radios are simply radio interfaces that simply communicate as commanded by a regional system [communication] controller. In some embodiments, radios comprise base stations, cell towers, wireless hubs, or wireless networks.

The radio interfaces are comprised of an enumeration of radios (with a transmitter and receiver), a very small processor, memory resources and an Ethernet interface. These radios can communicate Cellular Frequencies utilizing W-CDMA using a 5 MHz or greater channel bandwidth or the radios can communicate Wi-Fi with 22 and 25 MHz channel bandwidth. 802.11n can utilize 20 Mhz or 40 Mhz channel bandwidths. LTE (using OFDMA/SC-FDMA) comprised of channel bandwidths of 1.4, 3, 5, 10, 15 and 20 Mhz. LTE clients are communicated using a mask that indicates the OFDMA subcarrier(s) to be used in the uplink transmission.

The radios may be preconfigured with real time link layer messages to support real-time communication messages, while all non real-time messages may be sent to a regional system [communication] controller where the message can be characterized and where an appropriate response can be constructed. The link layer messages may be characterized per technology so that subsystem functions can be clearly identified and aspects of the design can be described adequately.

In some embodiments, the present disclosure includes a system of radios and their use in a large, integrated link layer network. This new link layer communication design may be implemented using the Ethernet technology (MAC header, the VLAN header, and a proprietary layer 2 protocol header)

to implement communication features that implement features 1 thru 7 above as well as specialized hardware that processes wireless link layer functions and communication, as well as further extending the design of commercial network processor architectures (e.g., exemplar: Freescale QorIQ DPQAA) that perform classification of network frames (wired and wireless), queuing and routing of frames, encryption/decryption of frames, and network buffer management. Though most wireless systems provide adaptive features, these features are not implemented with cognitive feedback from a radio frequency (RF) and network environment that is not visible to the device. The multi-nodal wireless communication system 100 depicted in FIG. 4 describes the overall hardware functions implemented by a system controller 104 that support these new features. In some embodiments, the system controller 104 may include a cell controller. According to aspects of the present disclosure, the system controller 104 may comprise a plurality of system controllers working cooperatively within a link layer communication network. The system controller 104 further includes a set of hardware finite state machines. System controller 104 may further comprise or operate in connection with at least one network service computing device and may include one or more servers, mainframes, mobile devices, laptop computers, tablets, video streaming devices, smart televisions, smart phones, web appliances, communication network nodes (e.g., network routers, switches, or bridges), or computing systems embedded within another device or system.

By communicating the TMSI, IMSI, and TLLI of an end user device between different cellular base stations within the same system controller 104, the multi-nodal wireless communication system 100 is able to improve the speed at which a device changes from one Location Area Code (LAC) to another. This is because the normal sequence of messages required to move from one cell to another is no longer required since the system controller reroutes frames through a different base station based upon RF measurements. This dramatically improves the performance of the Location Area Update process in cellular networks. In some embodiments, all of the existing cellular technologies may implement this portion of the specification as it is required when moving from one cellular coverage area to another. Additionally, if the TMSI & TLLI are ensured to be unique across all system controllers, then this information can be moved in between interconnected system controllers thus improving performance further. By using the same LAC for different radios across disparate physical areas, the use of TMSI, IMSI and TLLI may become universal across all areas of coverage and therefore allow roaming to occur more efficiently. Also, since roaming decisions are now centralized at the system controller 104, the mobile clients no longer perform as many roaming events since the system controller 104 will now be able to move the transmissions and receptions to different radios without the knowledge of the mobile client.

This multi-nodal wireless communication system 100 is based upon the concept of splitting the wireless Media Access Control (MAC) across interconnected system controllers using specialized hardware that process non-real time portions of the wireless MAC protocol as well as handle high speed frame processing for wireless devices under its control. These system controllers make "intelligent" decisions based upon feedback from multiple radios within a physical area. The multi-nodal wireless communication system 100 is comprised of hardware systems that are connected utilizing unreliable communication media (Ethernet), but could utilize other forms of unreliable communication such as satellite and wireless bridges as long as the required communication delay does not violate time constraints imposed by the MAC layer communication required between a centralized system [communication] controller and radio that communicates the wireless MAC protocol. The multi-nodal wireless system [communication] controller 100 should be capable of providing ubiquitous RF coverage across many desperate physical locations as well as be capable of integrating into existing, legacy network topologies that may be strictly based upon wired communication technologies. The multi-nodal wireless system [communication] controller 100 utilizes RF transmitters and receivers that perform real time data communication to end user devices. These end user devices are typically mobile; however, they can also include stationary devices such as desktop computers, laptops, tablets, or the like.

Figure 5:
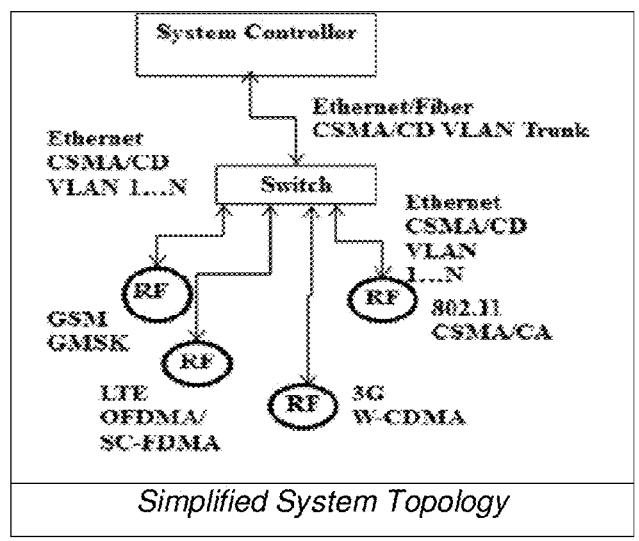
FIG. 5 is a simplified block diagram of a proposed system topology.
Figure 6:
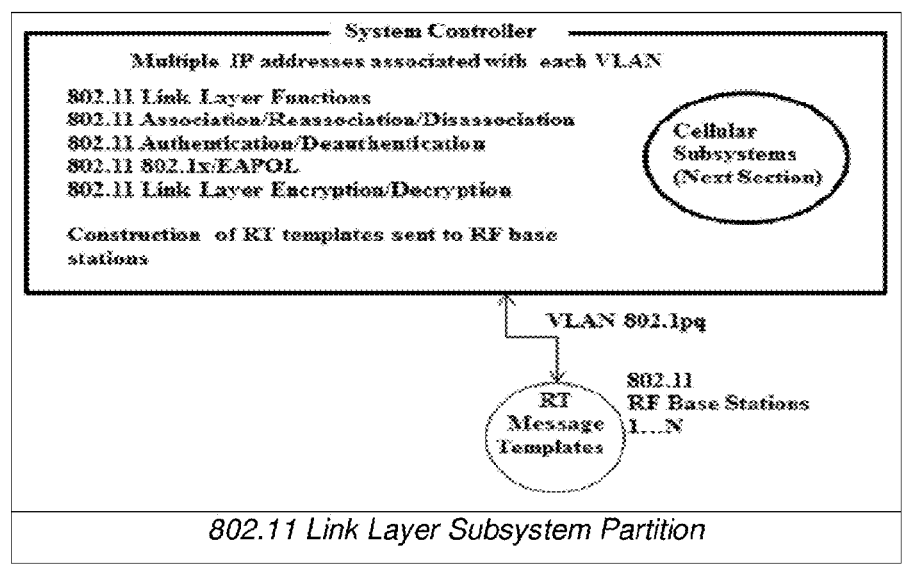
FIG. 6 is a simplified illustration of an 802.11 link layer subsystem partition.

FIG. 5 above depicts an exemplary overall topology of the multi-nodal wireless communication system 100. The system topology describes the overall top level architecture of the multi-nodal wireless communication system 100. The hardware link layer communication methods in the overall system according to aspects of the present disclosure will now be described. The system topology should be adaptable to ensure that the link layer design can be implemented without violating existing cellular and WiFi standards. This introduces a challenge that is addressed in the following manner.

Link Layer Communication Model

The link layer communication model splits both the cellular and the 802.11 MAC protocols across unreliable communication links in a unique way. As depicted in FIG. 5, Virtual Local Area Network (VLAN) technology as specified by the IEEE 802.1pq is utilized between the system controller 104 and the base stations. In doing so, the communication links can be prioritized dynamically. This design approach employs a fourfold advantage.

1. The new link layer communication model can be implemented across an existing wired infrastructure with very low impact to the existing network infrastructure. As an example, a network architect can overlay a completely different IP subnet over an existing wired network infrastructure without changing the existing wired network.
2. Based upon link layer communication behavior, prioritization of wireless frames can be changed dynamically. As an example, if Quality of Service (QoS) parameters dictate a particular percentage of the system bandwidth, the multi-nodal wireless communication system 100 can quickly change the VLAN priority tag to prioritize frames to one RF base station over another RF base station.
3. Unlike autonomous wireless routers and access points, the system controller 104 has visibility to the RF spectrum where radios exist. The multi-nodal wireless communication system 100 enables the system controller 104 to perform cognitive adaptation to the RF environment. Based upon the RF noise temperature, the system controller 104 can equally distribute mobile devices across the available RF spectrum in a fashion that provides for the greatest network performance. As an example, bit error rate (BER) as well as neighboring cell information transmitted by the RF base station can be communicated back to the system controller 104. Neighbor cell information can be communicated in the form of Power Spectral Density (PSD) calculations (this is covered in a later section). The system controller 104 can make a dynamic decision to send data frames across a different RF base station, in essence the device is now communicating with a different RF base station without awareness by the mobile device. This is a form of a cognitive adaptation based upon BER.

4. The integration of cellular and WiFi stacks provides the ability for cellular and WiFi devices to utilize the same backhaul network infrastructure. This provides relief of the cellular systems in regard to bandwidth utilization and improves the use of unoccupied bandwidth on the backhaul network infrastructure.

The link layer design includes adapters for both WiFi and cellular technologies. 802.11 technology will be discussed first followed by cellular technology. As depicted in FIG. 5, the wireless 802.11 MAC is split across unreliable communication links. Real time (RT) messages are addressed at the RF base station, while higher level management messages are handled at the system controller 104.

The following 802.11 link layer subsystem functions are addressed in the RF base station. The RF base station handles all RT messages. Since Probe Response messages are very similar to Beacon Messages, Beacon Messages are also handled in the RF base station.

TABLE 1

802.11 Real-Time Messages

| | |
|---|---|
| 1 | Beacon/DTIM |
| 2 | Probe Response |
| 3 | Acknowledgements |
| 4 | RTS/CTS (If Enabled) |

Figure 7:
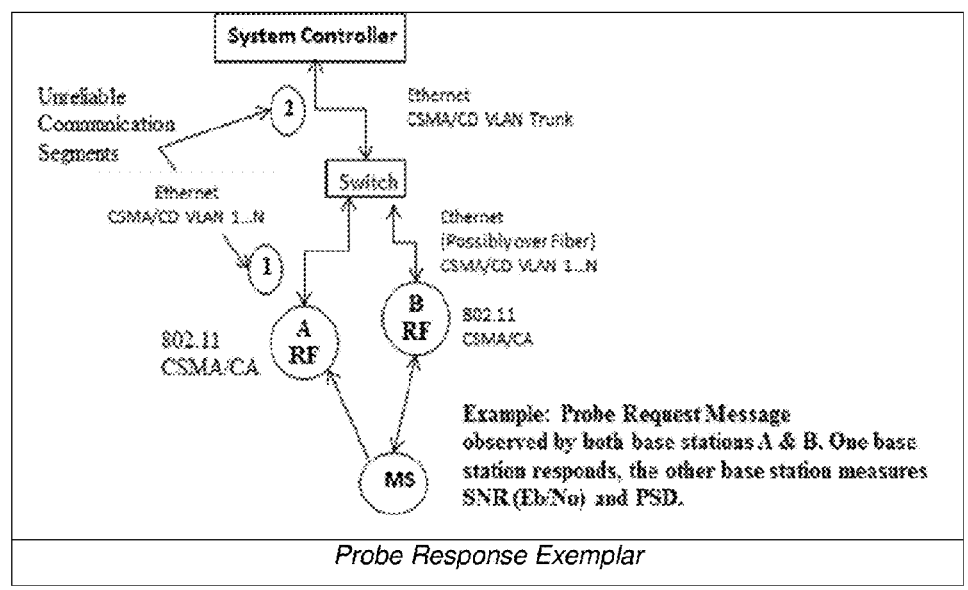
FIG. 7 is a simplified illustration of a probe response exemplar.
Figure 8:
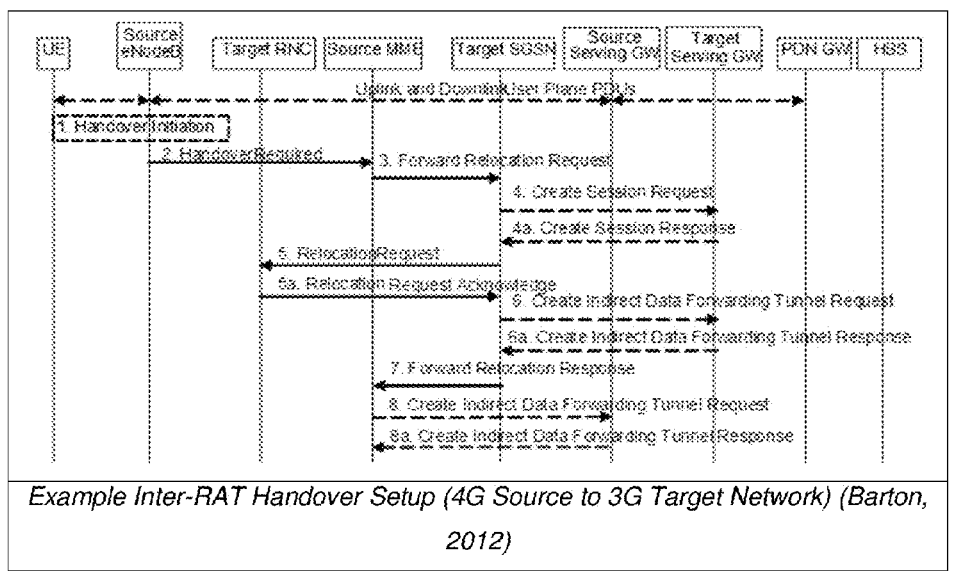
FIG. 8 is a simplified illustration of an example Inter-RAT handover set up arrangement.

Templates for these messages are sent by the system controller 104 to the RF base station for purposes of transmission to their RF coverage area. When cells overlap, these messages can also be forwarded by other RF base stations in the coverage area. A measure of the received power ($E_b/N_o$) can be made and a decision in regard to which RF base station should ultimately respond to later Association requests can be calculated. FIG. 7 depicts an 802.11 example.

On Ethernet there are two distinct delays: propagation delay and transmission delay. The following equation describes the nodal delay, the delay per node in an Ethernet network.

$$d_{nodal}=d_{proc}+d_{queue}+d_{trans}+d_{prop} \quad (5)$$

The velocity of an electromagnetic wave through a copper media is approximately $V_{Copper}=2.1*10^8$. Though base transmission rate has no bearing on propagation delay, base rate directly affects transmission rate $d_{trans}$. Assuming full duplex Ethernet operation $d_{trans}=0.512$ usec for a 64 byte frame. A probe request, including a proprietary header, can be no less than this size; therefore, round trip (RT) delay of $2*d_{trans}=1.024$ usec. Assuming a maximum length of 100 meters, $d_{prop}=0.4762$ usec with a round trip delay of $2*d_{prop}=0.9524$ usec. Ignoring $d_{queue}$ and $d_{proc}$ for a moment, one RT segment is 1.97 usec. Adding the segments depicted in FIG. 7 we have a $d_{total}=3.9528$ usec. FIG. 7 is representative of the minimum network delay between a system controller 104 and a RF base station; therefore, the 802.11 messages depicted in Table 1 represent messages that must be handled in RT by the RF base station.

TABLE 2

802.11 Non-Real Time Messages

| | |
|---|---|
| 1 | Association/Reassociation/Disassociation |
| 2 | Authentication/Deauthentication |
| 3 | 802.1x, EAPOL, etc . . . |
| 4 | 802.11 Data Messages |

WiFi messages listed in Table 2 above are handled by the system controller 104 which manages messages from all devices in a large regional area. These messages provide for a centralized management of all 802.11 devices in the area as well as provide for the accurate application of Quality of Service (QoS) between individual wireless networks since all data frame are sent through the system controller 104. For example, if a network identifier (e.g. SSID) is supposed to have available 60% of the available bandwidth while another network identifier is supposed to have available 40% of the available band, the bandwidth between the two networks can be arbitrated in RT instantaneously since the system controller 104 has full access to all traffic being delivered to the whole network prior to be distributed to individual RF base stations in the regional areas.

Cellular Link Layer MAC

There are many system design differences between the different cellular technologies (e.g. 2G/GSM, 3G/UMTS, 3G/CDMA2000, 4G/LTE). Cellular vendors have changed their subsystem designs to improve access speeds, coverage, and reduce cost to deployment. The focus is on cellular subsystems that intersect GSM, 3G/UMTS, and 4G/LTE cellular link layer subsystem functions. Unlike WiFi devices, cellular provider networks have routinely (out of necessity) split their link layer communication across unreliable communication links (e.g. Ethernet/Fiber).

TABLE 3

Example Cellular UMTS Messages (Wikipedia, 2014)

| MOBILITY MANAGEMENT (MM) MESSAGES | RADIO RESOURCE (RR) MESSAGES |
|---|---|
| imsi detach/attach indication | additional assignment |
| location updating reject | immediate assignment |
| location updating request | immediate assignment extended |
| location updating response | immediate assignment reject |
| authentication reject | ciphering mode command |
| authentication request | ciphering mode complete |
| authentication response | assignment command |
| identity request | assignment complete |
| identity response | assignment failure |
| tmsi reallocation command | handover command |
| tmsi reallocation complete | handover complete |
| cm service accept | handover failure |
| cm service reject | physical information |
| cm service abort | paging request type 1-3 |
| cm service request | system information type 1-8,2(bis/ter), 5(bis/ter) |
| cm establishment request | channel mode modify {ack} |
| Abort | classmark change/enquiry |
| mm status | measurement report/ frequency redefinition |

The cellular link layer communication model is much more distributed; however, there are improvements that can be made. Link layer communication model changes according to the present disclosure integrate WiFi and cellular technologies together in a hardware-rooted architecture as well as improve roaming between the technologies. The reasons this approach is superior to other approaches will be described.

Figure 9:
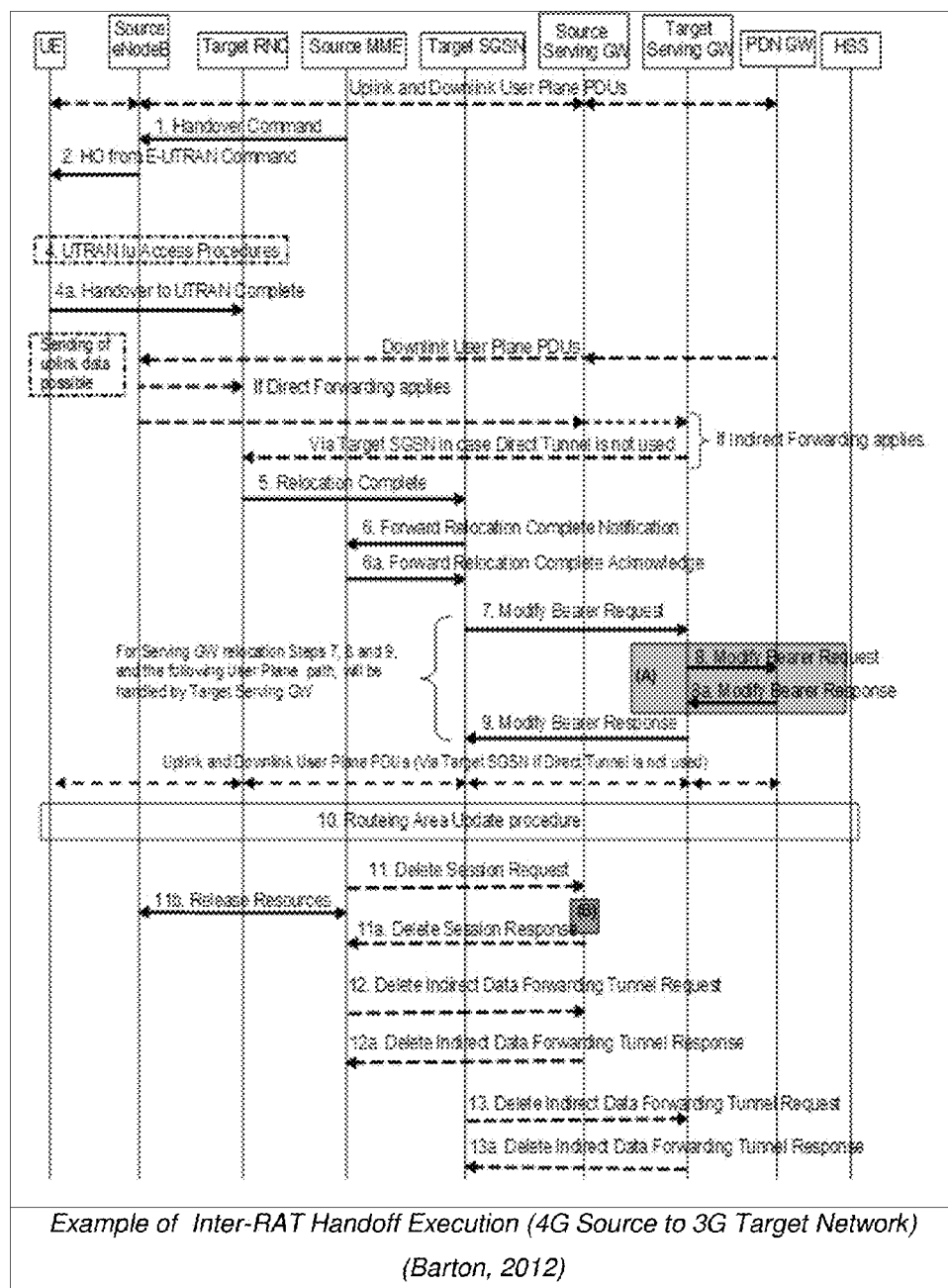
FIG. 9 is a simplified illustration of an example of Inter-RAT handoff execution.
Figure 10:
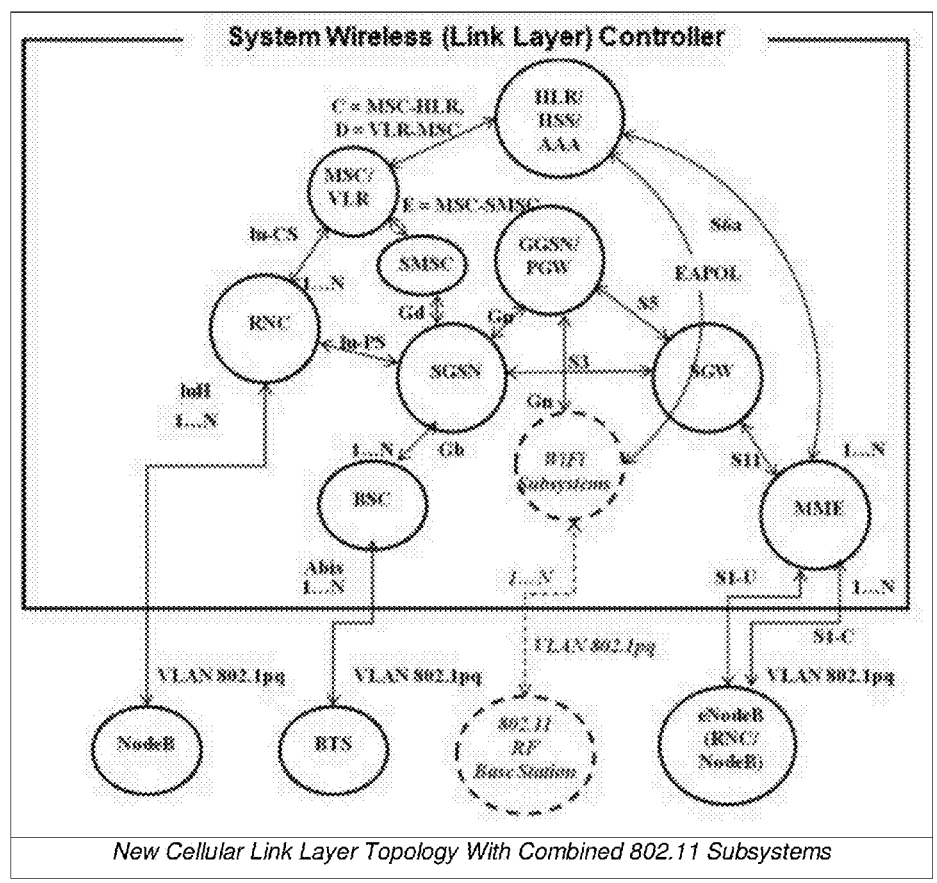
FIG. 10 is a simplified illustration of a new cellular link layer topology with a combined 802.11 subsystems.

The example above describes the handover setup procedure example between a 4G source to a 3G target network. The end goal is to ensure that when the handover is complete data frames will be sent to the new serving gateway service in this the GGSN 3G service. The Source MME subsystem initiates the Handover resource allocation procedure by sending a Forward Relocation Request (IMSI, Target Identification, CSG ID, CSG Membership Indication, MM Context, PDN Connections, MME Tunnel Endpoint Identifier for Control Plane, MME Address for Control plane, Source to Target Transparent Container, RAN Cause, MS Info Change Reporting Action (if available), CSG Information Reporting Action (if available), UE Time Zone, ISR Supported) message to the target SGSN subsystem of the 3G cellular network. Note that this entire setup process occurs before the User Equipment (UE) has actually "roamed" to the 3G network. Once the setup has completed, the source MME subsystem initiates the handover process by coordinating with the UE by sending a handover command (depicted in FIG. 9). The UE responds to the network with a handover complete message to the target RNC subsystem who initiates a message to its SGSN subsystem which then conveys a completion message to the source MME subsystem. The source MME acknowledges the completion message and the SGSN notifies its GGSN service (using a "Modify Bearer" request). Once the GGSN service then notifies the source PGW of the change, data frames are now presented through the new serving 3G gateway (e.g. SGSN and GGSN).

Using a system controller 104 of the present disclosure, these subsystems (WiFi networks and cellular networks) are combined into a single platform that can more quickly execute the roaming examples because communication latency is refocused between the radio(s) and the system controller 104 and not between the end user devices and the network. Latency is reduced greatly because fewer messages across unreliable communication links are required. Due to the increase in overall performance with a fully automated system on chip (SoC) cellular hardware data path driven by a proposed 500 MHz clock, a system controller 104 would be used to handle large geographic areas. With the use of Fiber channel communication links (assuming the use of repeaters and proper configuration), very low latency and high bandwidth can be achieved. System controller 104 provides a high performance (via hardware) centralized link layer solution for integrating a plurality of different radio transmissions.

With the architecture above, the cellular MAC is split between the system controller 104 and BTS, NodeB, and eNodeB transceivers. Today these cellular subsystems are found in desperate locations across the country with large form factors to accommodate many RF channels from radios supporting 360 degree tower coverage. Since these subsystems interact with each other across vast physical locations, very little information is communicated in regard to the RF environment as it relates to BER and RF performance. With the new link layer architecture of the present disclosure, cellular coverage can be provided for large geographic areas by the same system controller 104. In this case a full hardware data path can be applied to handle frame classification, data path processing and distribution to the wireless subsystems required to handle this processing as well as gather BER information in regard to RF performance in local areas. The BER information is then used to modify the radio characteristics on a per frame basis based upon the cellular coverage area (RF sector). These features integrated with Wi-Fi capability provides the ability to off load traffic from the cellular network, freeing up cellular bandwidth for other users. By the use of a 802.11 split MAC, Authentication and Association credentials are provided directly into the cellular network using Extensible Authentication Protocol of Local Area Network EAPOL. Using the same authentication triplets used between the service provider and the user equipment (UE), WiFi can be enabled and provide service to cellular UE. Just as is the case with 3G technology that utilize the Packet Gateway (PGW) or the Gateway GPRS Support Node (GGSN), Network Address Translation (NAT) services are provided for IP addresses that are provided for the local area. This service is used to go to the Internet from a UE that is using WiFi instead of the straight cellular services. Because the WiFi RF antennas can be elevated, and have amplification added for both transmit and receive, it is possible to use WiFi to offload some (located within 3 km) cellular data traffic.

The link layer communication model has been described for both the 802.11 where the RF MAC is split between a RF base station and the addition of the 802.11 subsystem to cellular subsystems. The point areas where the 802.11 subsystems are integrated will function correctly for all versions (e.g. GSM, UMTS, LTE) of cellular subsystems. Since 3G UMTS utilizes scramble codes on tower transmissions, as well as, P/N codes distributed to each client, the use of the same scramble code between different RF regions is proposed (or the use of multiple scramble codes within the same RF region), thus reducing cell reselection to parametric PSD calculations and base station selection by the system controller. In addition, a method of authentication has been described as well as how access to the Wide Area Network (WAN) is provided as is the case with all data services on UE.

Link Layer Hardware

In order to provide the best class of service for the link layer model described in the previous section, hardware must be designed to support the following features:

TABLE 4

Sample Link Layer Feature List

1 Link Layer Encryption/Decryption (Cellular & WiFi). Also encryption over the wired network as well.
2 Frame Manager (Classification Engine), Queue Manager, and Data Path Acceleration Architecture (DPAA)
3 Fixed format headers sent to wireless base stations
4 Table of all UE required
5 NAT and Proxy ARP provided for all bridged UE (different modes of operation), MAC learning feature to support MAC address transition across Layer 2 switch interfaces.
6 High performance frame processing with little or no intervention with GPP HW
7 Large number of Fiber and Ethernet interfaces available in one unit
8 Security Fuses, secure boot, security monitor (can be connected to tamper detection).
9 Additional related hardware attributes such as dual power supplies, solid state disks and the like.

The hardware design to support the link layer hardware may start with the design of the SoC. This design may then facilitate the use of dedicated hardware state machines that may act independently from each other. These hardware state machines may be provided instructions in memory that are then loaded into their internal register cache for execution. These instructions facilitate the functions required to support the predefined headers found for both the link layer Ethernet communication as well as the cellular and 802.11

MAC fields. Since most of these fields are based upon configuration parameters that are configured by software, in some embodiments, the link layer software may implement the structures that are accessed by the hardware to support this link layer communication.

The hardware state machines (as configured by software and depicted in FIGS. 4 and 11) of the system controller 104 used for frame processing contain internal register memory that is used to communicate frames to a wireless base station. This internal register memory may be used to construct a proper frame header for a particular device (e.g., base station) that has been configured. In addition some hardware state machines also include a hardware internal Direct Memory Address (DMA) engine. As one example of utilizing the link layer hardware, when a base station device has properly authenticated itself to the network, the base station MAC address, BSSID, radio MAC address(es), VLAN header information, security key information, and capabilities may be communicated and stored into hardware registers (or system memory). When a network frame buffer is received from a wireless base station, the hardware frame classification engine may evaluate a unique identifier associated with the base station such as the source MAC address, VLAN tag information. Based upon this information it may conduct further classification to identify the source MAC address of the actual wireless client. The source MAC address may then translate to a unique hardware ID. A message with the address of the frame and that ID may be sent to the hardware queue. This hardware queue is configured to send frames with this queue ID to the security engine for link layer decryption. The security engine returns a specific queue ID after decrypting this frame (based upon its hardware memory cache structure). The hardware queue is configured to send frames with this queue ID to the wireless link layer engine for further processing. As an example, based upon the fields in a 802.11 MAC header, a wireless hardware engine of the system controller 104 may perform standard operations on the frame starting at the address of the frame. The wireless link layer hardware state machine is specifically designed to understand the 802.11 and GSM/UMTS MAC protocols. Using 802.11 as an example, the hardware state machine behavior can be based on the source (radio MAC) address of the sender in the forward direction. If the destination [MAC and/or IP] address is that of another wireless device that is managed by this system controller 104 the frame will be forwarded onto the same queue that other frames from the network in the reverse direction are placed for eventual transmission to the wireless device queued in a fashion that is described in [00184].

Link layer encryption may be based upon cryptographic algorithms verified and validated by The National Institute of Standards and Technology (NIST). NIST issued the Federal Information Processing Standard (FIPS) Publication 140-2 (FIPS PUB 140-2) is a United States government computer security standard that is used to accredit cryptographic modules. This publication is entitled "Security Requirements for Cryptographic Modules" and was published on May 25, 2001 and was updated on Dec. 3, 2002.

The National Institute of Standards and Technology (NIST) issued the FIPS 140 Publication Series to define requirements and standards for cryptography modules for both hardware and software components developed by technology companies. Federal agencies and departments can validate whether a module, termed a Hardware Security Module, is covered by an existing FIPS 140-1 or FIPS 140-2 certificate which specifies module name, hardware, software, firmware, and/or applet version numbers. Many cryptographic modules are produced by the private sector (and even by the open source) communities for use by the U.S. government and other regulated industries, including financial and health-care institutions, that collect, store, transfer, share, and disseminate sensitive but unclassified (SBU) information.

NIST regulated security programs enforce government and industry cooperation to establish secure systems and networks by developing, managing and promoting security assessment tools, techniques, and services, and supporting programs for testing, evaluation and validation. NIST security programs extend to development and maintenance of security metrics; security evaluation criteria and evaluation methodologies; tests and test methods; security-specific criteria for laboratory accreditation; guidance on the use of evaluated and tested products; research to address assurance methods and system-wide security and assessment methodologies; security protocol validation activities; and appropriate coordination with assessment-related activities of voluntary industry standards bodies and other assessment regimes.

Annex C of FIPS 140-2 specifies Approved Random Number Generators. Random Number Generators (RNG) are used to generate random content for cryptographic algorithms that require the need of random content such as content required for the generation of IV information for IPSEC or DTLS protocols as two examples.

United States Federal Government standard Federal Information Processing Standard (FIPS) Publication 140-2 (FIPS PUB 140-2) requires verification that each sample produced by a Random Number Generator (RNG) be compared against the immediately preceding sample to verify that the random number generator does not generate the same numeric value twice sequentially; statistically, this would indicate a hardware or software fault rather than a coincidence. FIPS 140-2 specifies that any time a Random Number Generator (RNG) generates a new random number, the generated number is to be compared against a previously generated random number. If the two are the same, the event indicates a hardware (or software) failure rather than by some extraordinary, statistical chance. If the two are the same, an error indication is generated.

In order for any system to be compliant with requirements such as FIPS 140-2, but not perform the check in software, the hardware must enable the security engine utilizing a hardware autonomous data path to perform this function. Thus, security can be implemented in separate devices interposed between devices intended to communicate securely, for example cellular link layer encryption datagram, 802.11 link layer datagram and insecure Internet Protocol (IP) datagrams can be repackaged securely for transport over the public Internet or other unprotected network infrastructure.

Figure 12:
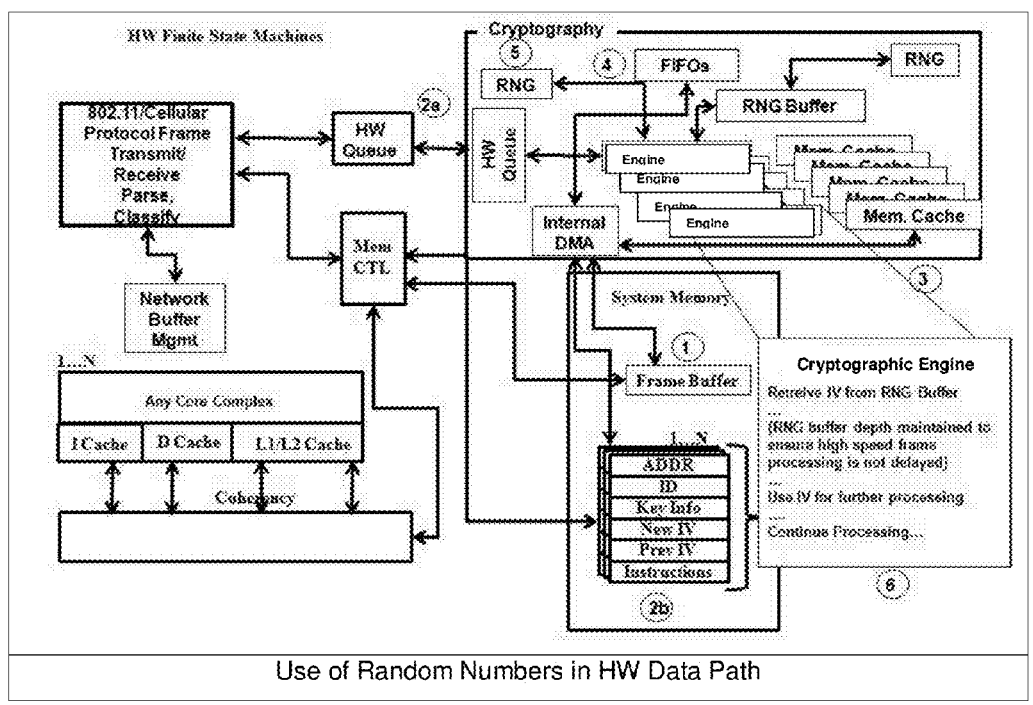
FIG. 12 is simplified block diagram showing the use of random number in a HW data path.

The design of a RNG requires the use of hardware design techniques known as "Asynchronous Design". When using asynchronous design techniques to design a RNG subsystem, one must use the instability inherent in relying upon propagation delays in a logic design that vary with temperature, voltage level fluctuation, substrate differences, and register settling time that occur through combinatorial logic designs. These techniques are used to ensure that the RNG subsystem does provide random numbers with sufficient entropy; due to impurities introduced during design synthesis, each chip will have different attributes. The following illustrative technique, depicted in FIG. 12, can facilitate random number generator verification, which may be performed without using any microprocessor execution time or specialized hardware.

An input frame that requires encryption is received by the hardware data path and is parsed, stored in system memory (1 in FIG. 12) by the hardware receive direct memory access (DMA) engine. A message is sent by the wireless classification engine to the HW queue across a hardware bus. This message contains the address of the HW cache associated to the unique ID in system memory (2b in FIG. 12). The wireless protocol engine reads the message in the HW Queue (2a in FIG. 12) and alerts the DMA to read the HW memory using the address found in the HW Queue message) and distribute a processing request to a cryptographic module (3 in FIG. 12). The hardware queue also instructs the DMA to read the Frame Buffer memory using the address found in the HW Queue message (4 in FIG. 12). The cryptographic module reads a random number from a RNG buffer because it must generate an IV. This IV contains a mask (e.g. seed) that is XOR'd with the random number (5 in FIG. 12). Finally, the cryptographic module executes its loaded instructions (in its internal memory cache) and checks the newly generated IV to the previous IV for all active flows. If the IV matches any other active flow, it is indicative of a problem and an error is returned, otherwise the new IV is stored at the address of the previous IV for the flow by use of its DMA engine and processing continues normally (6 in FIG. 12).

This process illustrates a FIPS compliant hardware design to meet the cryptographic needs of the system controller 104.

Link Layer Software

The link layer software is comprised of various subsystems that interact with the hardware state machines described in the hardware section above. The software may pre-populate the hardware memory of the hardware state machines to accommodate the transmission of frames to wireless device from other wireless devices as well as devices from the WAN side of the network device. Network headers that are used to communicate to the wireless base stations may be pre-populated on a per-flow basis. Note that the wireless link layer engine may modify some portions of the header as data moves through an autonomous hardware data path.

Figure 11:
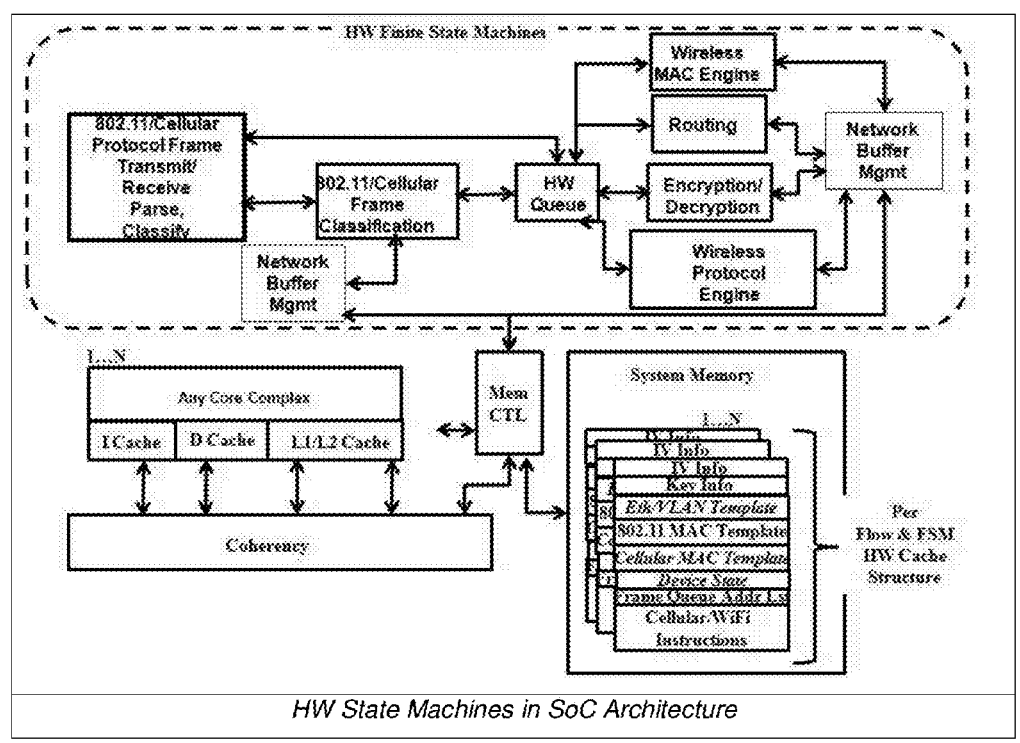
FIG. 11 is simplified illustration of an HW state machines in SoC architecture.

As described in FIG. 11, the wireless link layer engine includes HW memory cache that contains the proper Ethernet, VLAN, Cellular or 802.11 MAC header pre-populated on a per flow basis. This means two per wireless device (1 for the forward direction and 1 for the reverse direction) flow to and from a wireless device. FIG. 13 describes the network header formats that may be pre-populated in the wireless link layer hardware state machine. This finite state machine (FSM) must also maintain flow control structures between the system controller 104 and the RF base stations. There are mechanisms in place with regard to the cellular protocol specification; however, on the 802.11 side there may not be integrated specifications. The exemplary frame formats of FIG. 14 support link layer communication between the RF base stations and the system controller 104.

Wireless State Machines

Cellular and 802.11 devices are constantly measuring the RF environment. As such they are constantly performing neighbor cell power measurements, if sufficient BER rate is sensed by the receiver (where rate adaptation did not improve), an 802.11 client device will initiate its form of cell reselection (issues an 802.11 Reassociation request). On cellular devices this is performed by monitoring all BCCH carriers contained and making one measurement per BCCH carrier. The size of the neighbor cell list (e.g. number of neighboring transmitters), either increases or decreases the amount of time UE spend performing these measurements. Cellular devices initiate the process of cell tower/transmitter reselection by a process referred to as Location Area Update (LAU). This process is analogous to the example when in a moving vehicle. The cellular device in your hand will receive a signal from a new tower which will have a different Location Area Code (LAC). This process is repeated as the car continues to move from one tower to the next. This process is sufficient for voice services, while processes referred to as Routing Area Update and MM Attach is required for data services. A cellular device can also request supplementary services such as [no] call waiting, [no] call forwarding, and activate Short Message Service (SMS). Utilizing the new proposed roaming technique according to aspects of the present disclosure, the same LAC may be used across many different areas while the transmission and reception from devices would seamlessly move from one radio to another without the knowledge of a wireless client mobile entity (ME).

Finite State Machine Behavior

Figure 15:
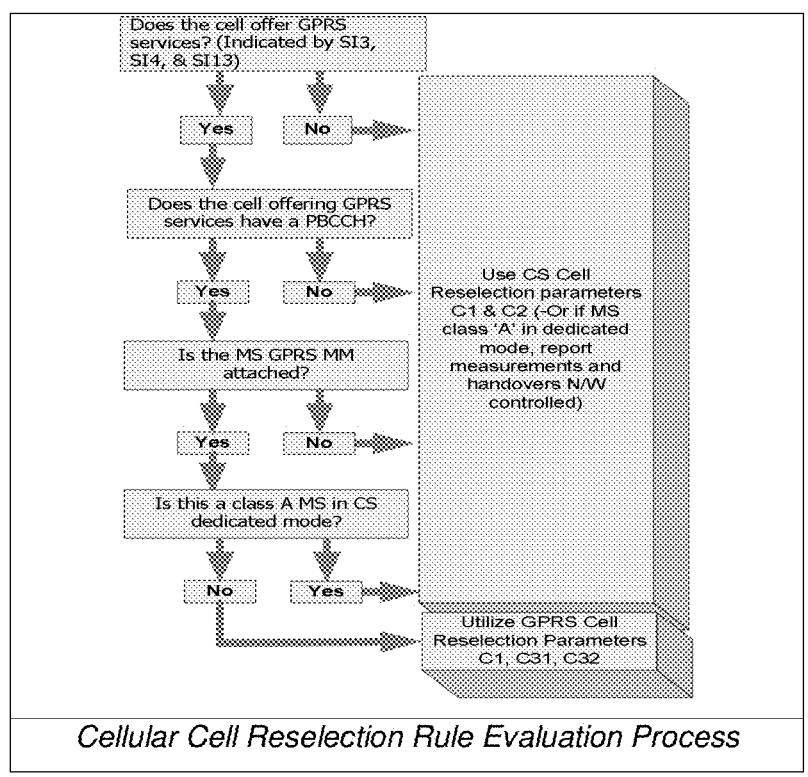
FIG. 15 is a flow chart illustrating a cellular cell reselection rule evaluation process.
Figure 16:
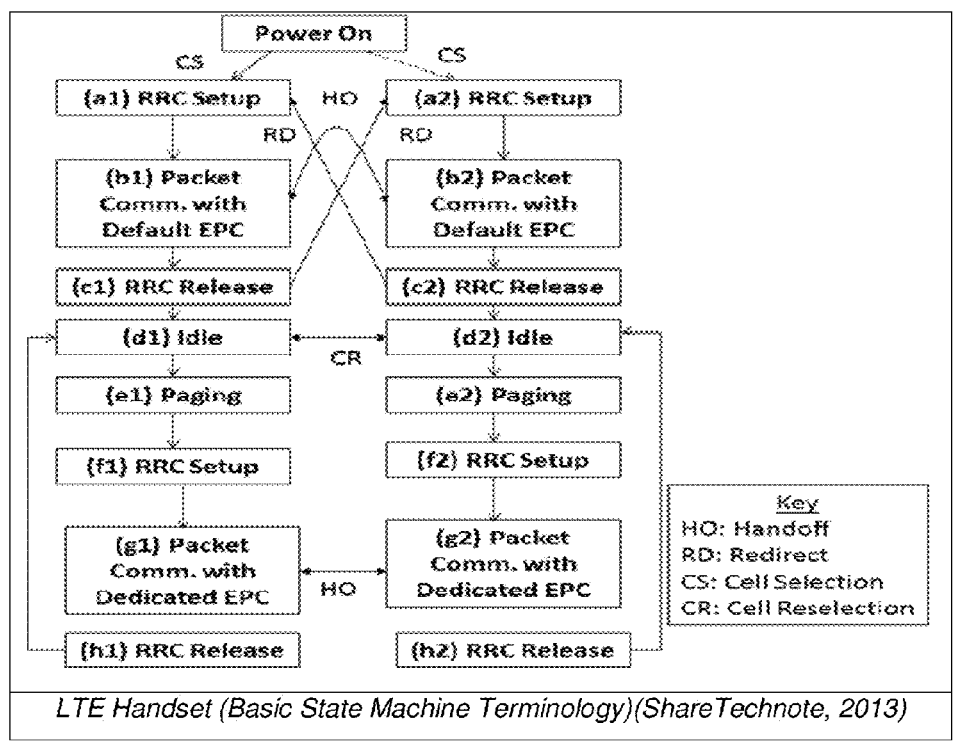
FIG. 16 is a simplified block diagram of an LTE handset.

FIG. 15 depicts a cell reselection state machine. The $Dev\_Xmit\_CCCH_{max}$ and the Cell_Reselect_off field values are transmitted on the Broadcast Channel (BCCH) of a cellular base station. In order to distribute the load of cellular devices across cellular base stations, the system controller 104 can dynamically modify the parameters being transmitted on this channel thereby influencing the state machine of the UE to connect to a different RF base station. For UMTS and LTE UE, the network can also request a cell reselection.

$$C1 = PSD_{avg} - Dev\_Rx\_Rqd_{min} - \max(Dev\_Xmit\_CCCH_{max} - Dev\_Pwr\_Class) \quad (6)$$

$PSD_{avg}$=Average receive signal level $Dev\_Rx\_Rqd_{min}$=Minimum $PSD_{avg}$ the MS must receive to access this cell $Dev\_Xmit\_CCCH_{max}$=Maximum power the MS is allowed to transmit on the RACH Dev_Pwr_Class=MS power class $$C2 = C1 + Cell\_Reselect\_Off - \max(Temp_{off} \text{ for Penalty\_Time}) \quad (7)$$

Cell_Reselect_Off=dB weighting applied to a cell which may be positive or negative $Temp_{Off}$=Positive dB weighting applied to a cell for the time Penalty_Time Penalty_Time=Timer set in the MS by the neighbor cell; on it expiry, the $Temp_{Off}$ is removed. $Temp_{Off}$ is only applied to neighbor cells.

In addition, cellular and 802.11 wireless devices also perform rate adaptation based upon sensed BER information. An 802.11 wireless client device normally initiates a Reassociation request, while a cellular device utilizes the LAU procedure and manages the cell reselection.

An example LTE cell reselection, initiated by the network side is as follows: A UE is in connection with a cell 'A'. A "cell," as used in the present example may comprise a cell tower or other base station. The network sends a command to the UE to perform a signal quality measurement on cell 'B' (e.g. UMTS command="Measurement Control", while LTE command="RRC Connection Reconfiguration"). The UE performs the measurement and sends the result to Cell 'A'. (e.g. UMTS and LTE="Measurement Report"). If the system controller deems the measurement favorably, the UE is sent a change cell command. (e.g. UMTS command="Physical Channel Reconfiguration or ActiveSet-Update", while LTE="RRC Connection Reconfiguration"). Once the UE changes to cell '13' successfully, the UE will send a cell change completion message to cell 'B' (e.g. UMTS="Physical Channel Reconfiguration Complete or ActiveSetUpdateComplete", while LTE="RRC Connection Reconfiguration Complete"). (*ShareTechnote*, 2013)

LTE phones presently have two antennas that can be used in a 2×2 MIMO mode. The LTE phone can use one antenna to talk to one tower while using the second antenna to communicate to the second cell tower.

Roaming

In 802.11, roaming to another access point involves sending a "Reassociation" request to the new access point. This "new" access point was discovered by an outcome of signal strength measurements by the client device. In the 802.11 state machine below, the Reassociation message speeds up the Authentication and Association state change so it more quickly moves to the successfully Authenticated and Associated state. When a wireless device roams, it is important that data transfer is not lost during the process. The MS state machine has an impact on this behavior. When an 802.11 device sends it "ReAssociation" message, it must still properly receive frames from the base station it is presently associated to. In addition, if the device and the base station it is roaming to do not have direct communication and coordination with the base station it is roaming from the device will be forced to perform a complete Association to the device it is roaming to. With the system controller 104 link layer approach, the roaming between access points can be seamless.

Figure 17:
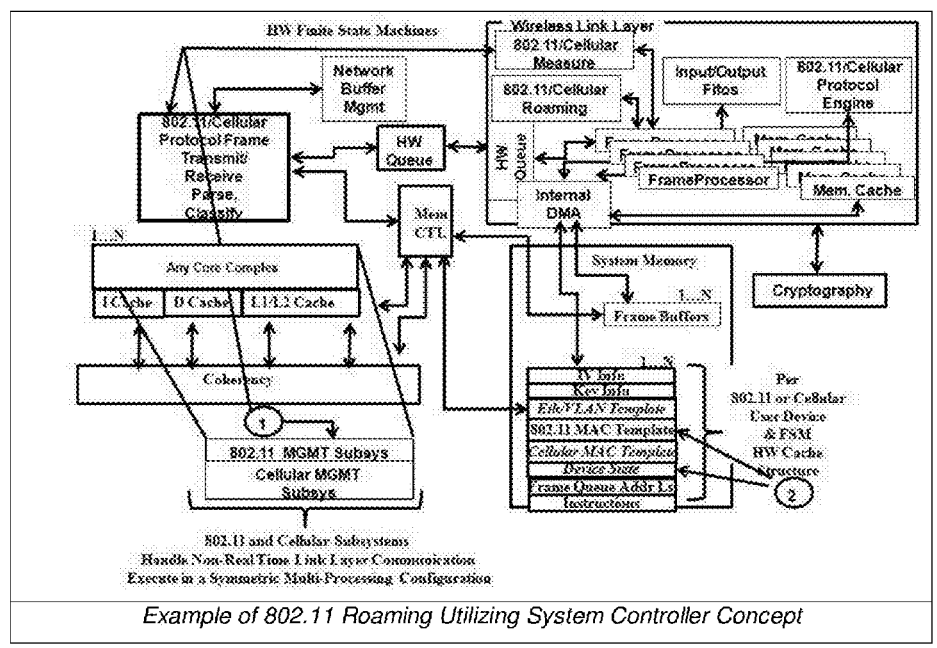
FIG. 17 is simplified block diagram of an example of an 802.11 roaming utilizing a system controller concept.

In one embodiment, a remote sensing software that manages the hardware link layer (e.g. 802.11/Cellular Measure) RF measurement subsystem either measures that the RF energy from a particular device is actually stronger on a different RF base station that it is presently receiving data or that a Reassociation message is received from that device. In either case, a seamless roaming event is initiated by the software (refer to 1 in FIG. 17). This software modifies the roaming event per device table managed in memory using the hardware queue specified above. In one embodiment, the hardware queue is the only hardware entity that can assure the change to this shared memory location is updated atomically without interrupt to other processing flows and to the hardware that is processing the hardware data path. The fields updated are the pre-populated Eth/VLAN header template, the 802.11 MAC to reflect a change to any 802.11 parameters required such as BSSID & RF MAC address change, and device state (refer to 2 in FIG. 17). Note that the Frame Queue Address List (records addresses of all frames to be transmitted to a device), Key and IV information is not modified; therefore, frames queued toward the wireless device will be sent to the new RF base station immediately when the change occurs through 802.1 pq link layer communication toward the correct RF base station.

Cellular Roaming

The system controller 104 commands mobile devices through their mobile station (MS) to perform a measurement of a neighboring cell. The cellular measurement subsystem is used to continually command a measurement of neighboring RF base stations. Software executing on one or more cores makes a decision based upon signal strength as well as traffic load across the base stations. The system controller 104 makes it possible to better understand the RF environment in regional areas and to be more responsive to changes in these areas.

Figure 18:
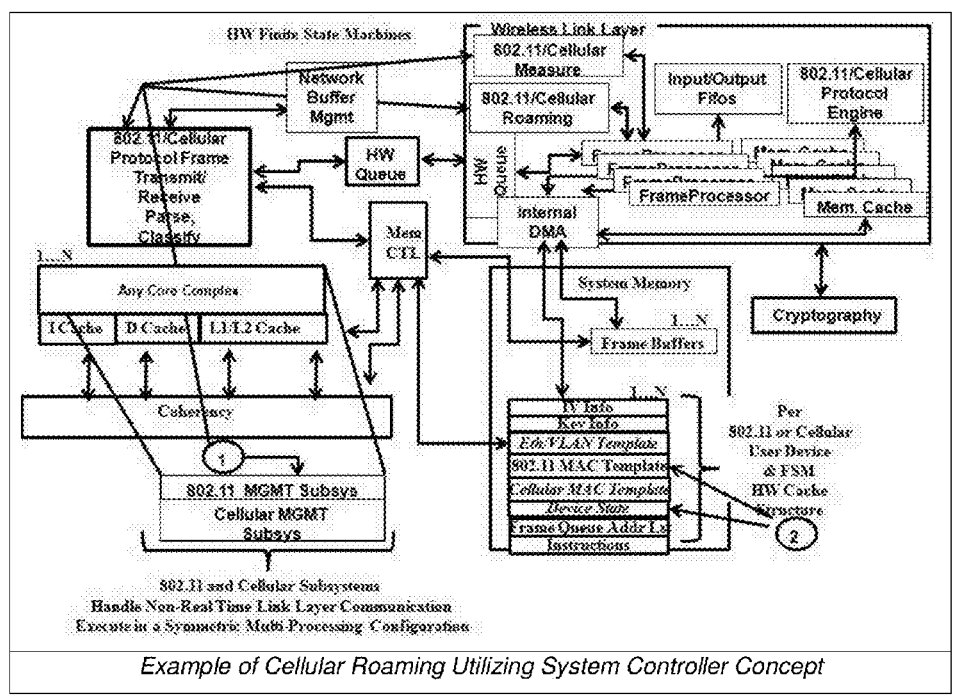
FIG. 18 is a simplified block diagram of an example of cellular roaming utilizing a system controller concept.
Figure 19:
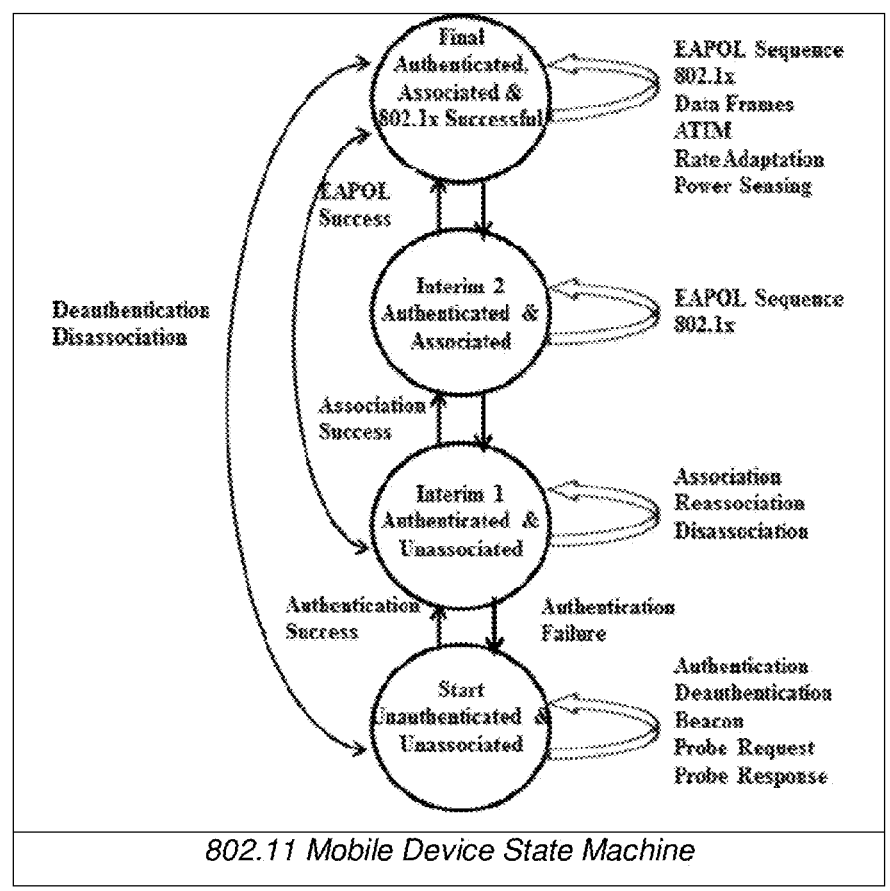
FIG. 19 is a simplified illustration of a mobile device state machine.

Based upon RF measurements roaming is initiated by the software (refer to 1 in FIG. 18). This software modifies the roaming event per device table managed in memory using the hardware queue specified above. The hardware queue is the only hardware entity that can assure the change to this shared memory location is updated atomically without interrupt to other processing flows and to the hardware that is processing the hardware data path. The fields updated are the pre-populated Eth/VLAN header template, the Cellular MAC to reflect the new cellular parameters (Note: TMSI, TLLI, should all remain the same. These identifiers can be globally unique by utilizing the MAC address of the unit for their derivation) and device state (refer to 2 in FIG. 18). Note that the Frame Queue Address List (records addresses of all frames to be transmitted to a device), Key (authentication triplet) and IV information is not modified; therefore, frames queued toward the wireless device will be sent to the new cellular RF base station immediately when the change occurs through 802.1 pq link layer communication toward the correct cellular RF base station.

With the use of MIMO and 802.11ac technology, a 'Reassociation' message is not required when a system controller 104 can be used to authenticate the user over an existing encrypted channel. The system controller 104 can make it possible, using link layer command and control, for the neighboring 802.11 RF base station to start communicating with the wireless client (using its second antenna) in a 2×2 MIMO configuration while the wireless client device is still communicating with the other RF base station through the use of the other antenna. The RF base stations may need to be told to not answer on its second antenna for this client device. This is acceptable since the RF base station must transmit ACKs with the BSSID of the network it is associated to. The client device would not know that the second spatially diverse antenna it was using is on another RF base station. The system controller 104 may make the decision as to when to complete the full process of 802.11 roaming. This process is identical to the method used by LTE mobile devices. LTE devices can utilize their second antenna in a 2×2 MIMO configuration to interact with multiple base stations simultaneously. This requires only software support for the proper analysis of eigenvectors to be performed on the 802.11 client based upon the concept of having two (very separated) spatially diverse streams possibly on two separate channel frequencies.

Power Spectral Density Estimation

Figure 20:
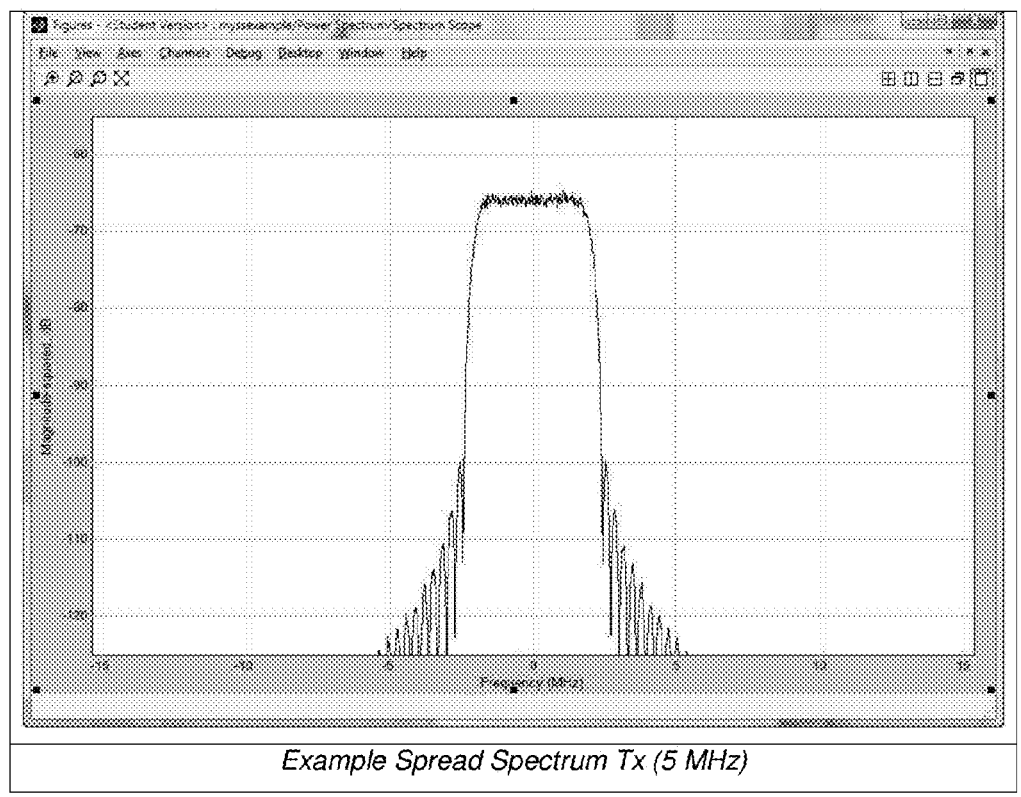
FIG. 20 is a graph illustrating a spread spectrum Tx (5 MHz)
Figure 21:
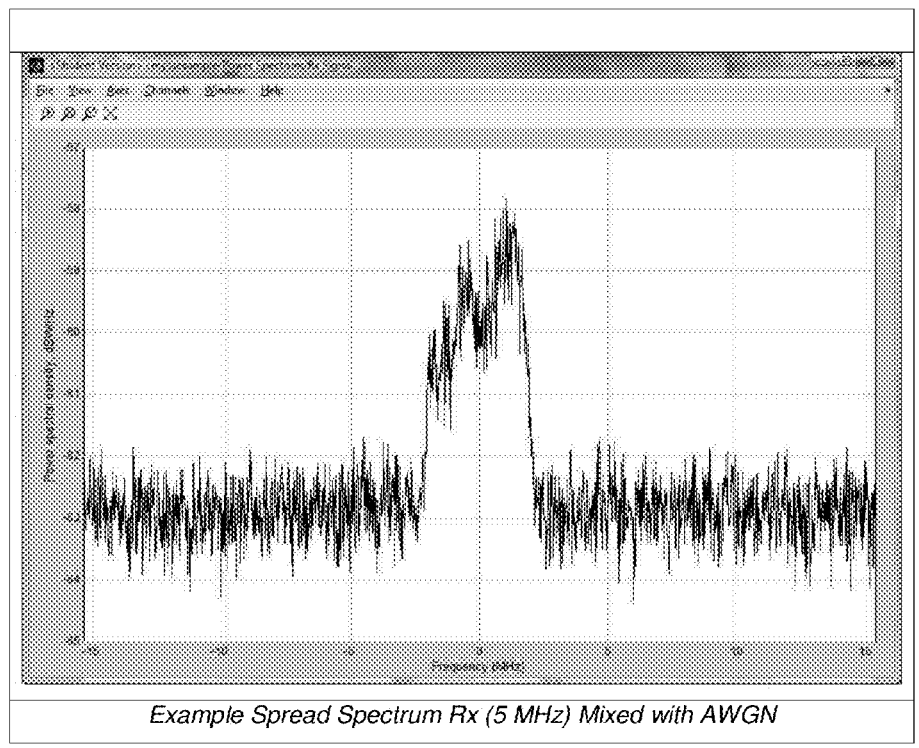
FIG. 21 is a graph illustrating a spread spectrum Rx (5 MHz) mixed with AWGN.
Figure 22:
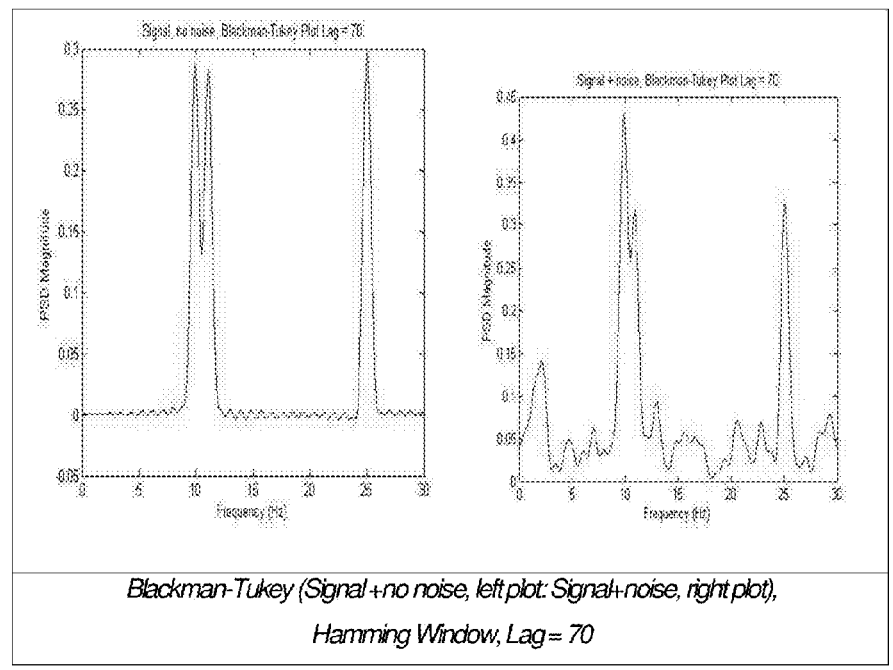
FIG. 22 are graphs of a Blackman-Tukey (Signal+No Noise, left plot Signal+right plot)
Figure 23:
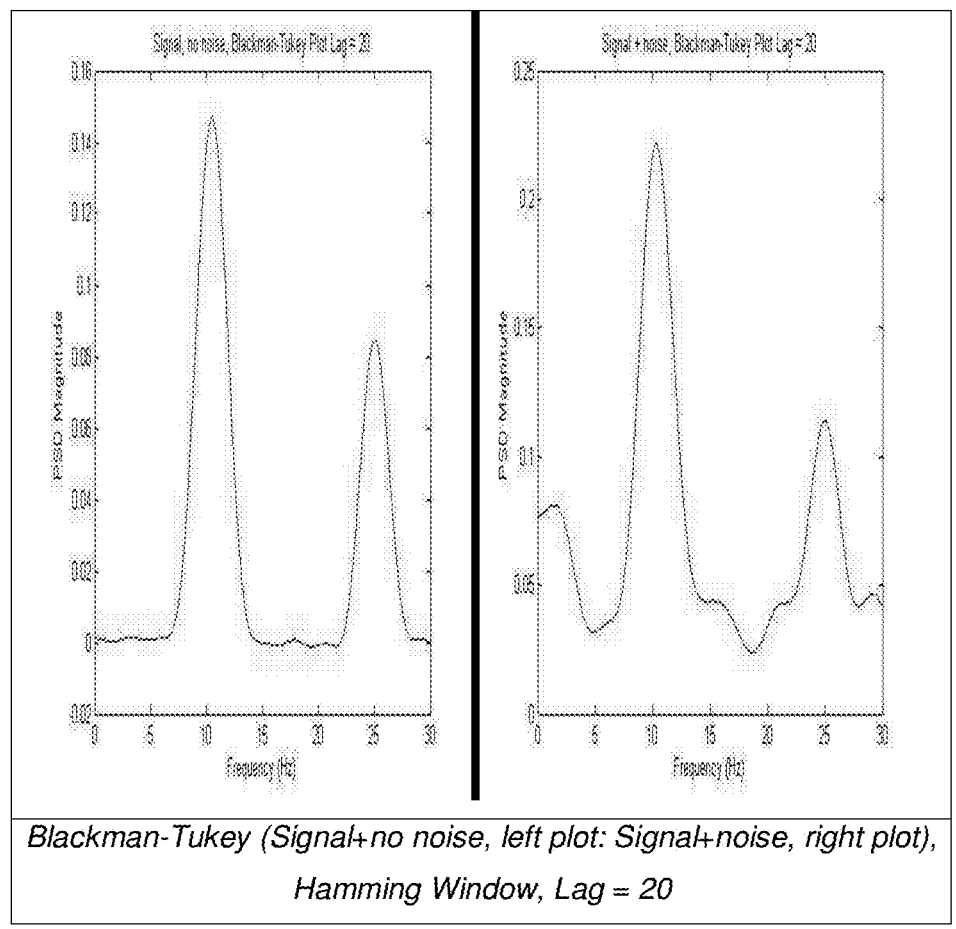
FIG. 23 are graphs of Blackman-Tukey (Signal+No Noise, left plot Signal+right plot) Hamming Window, Lag=70.
Figure 24:
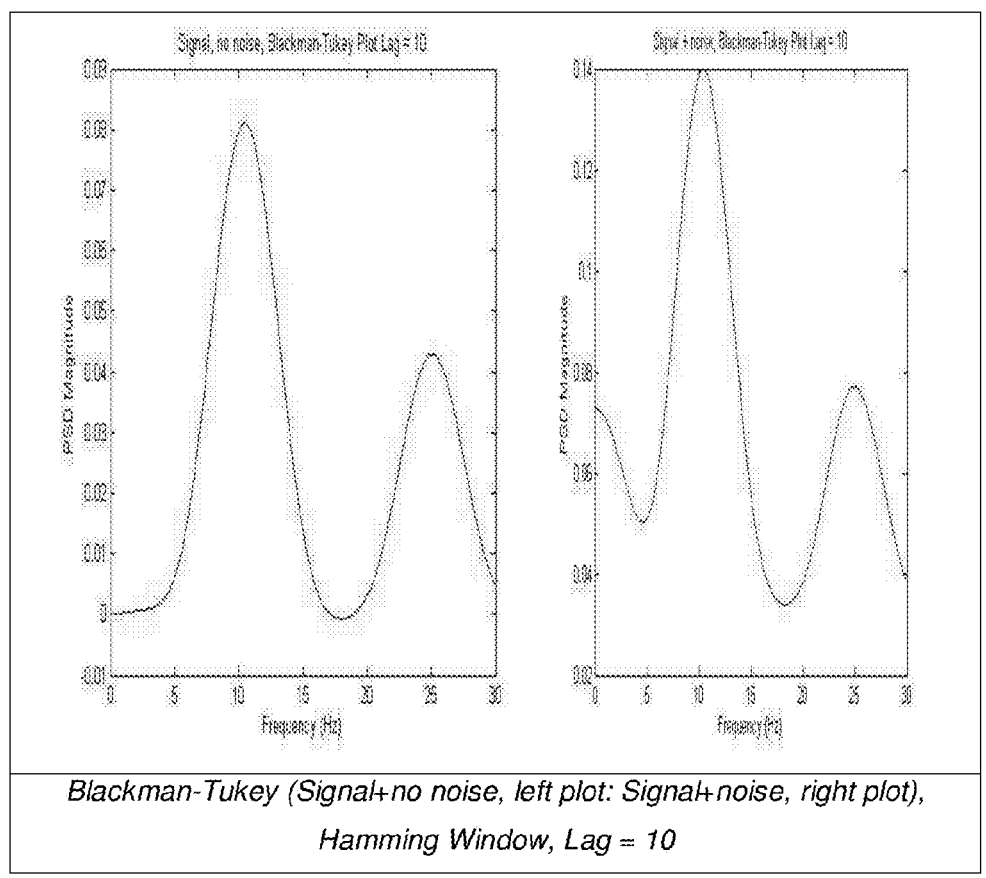
FIG. 24 are graphs of Blackman-Tukey (Signal+No Noise, left plot: Signal+no noise, right plot), Hamming Window, Lag=10.
Figure 25:
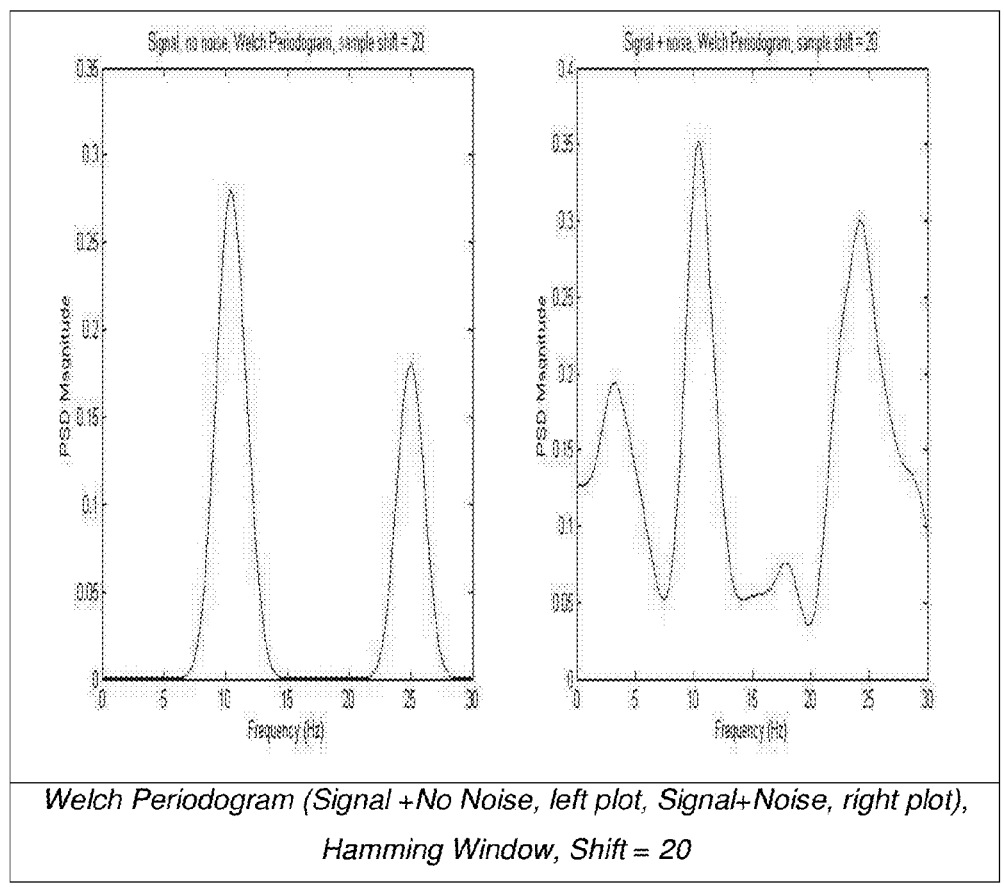
FIG. 25 are graphs Welch Periodogram (Signal+No Noise, left plot, Signal+Noise, right plot), Hamming Window, Shift=20.
Figure 26:
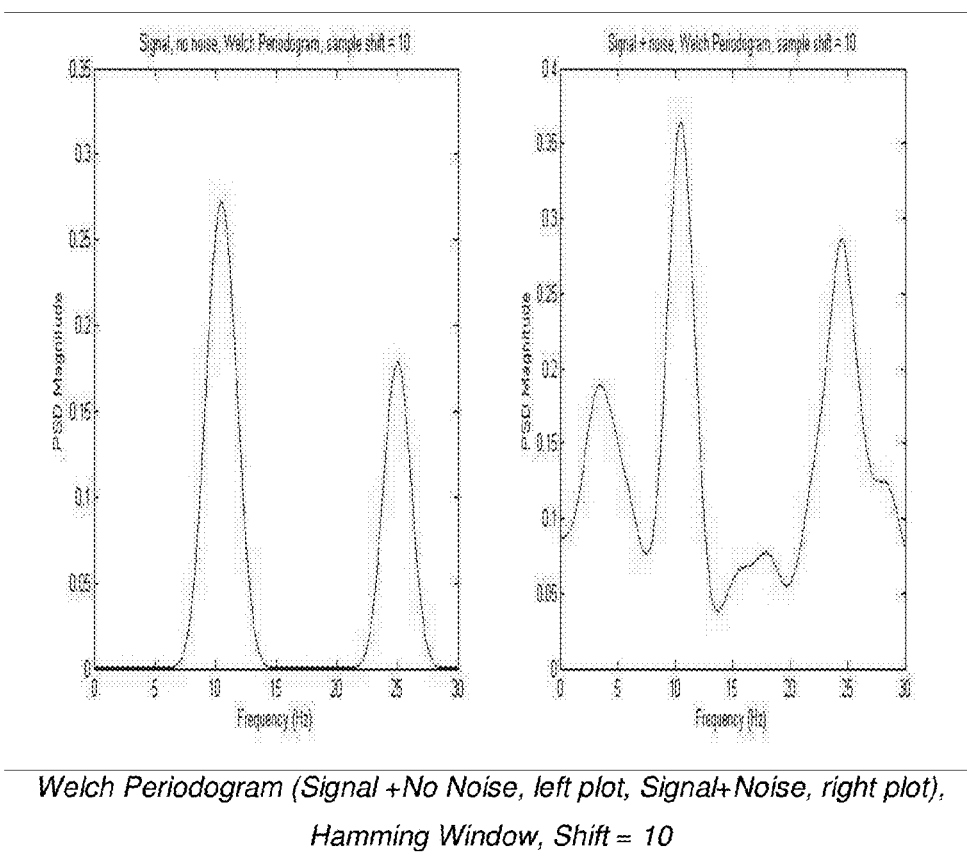
FIG. 26 are graphs of Welch Periodogram (Signal+No Noise, left plot, Signal+Noise, right plot), Hamming Window, Shift=10.
Figure 27:
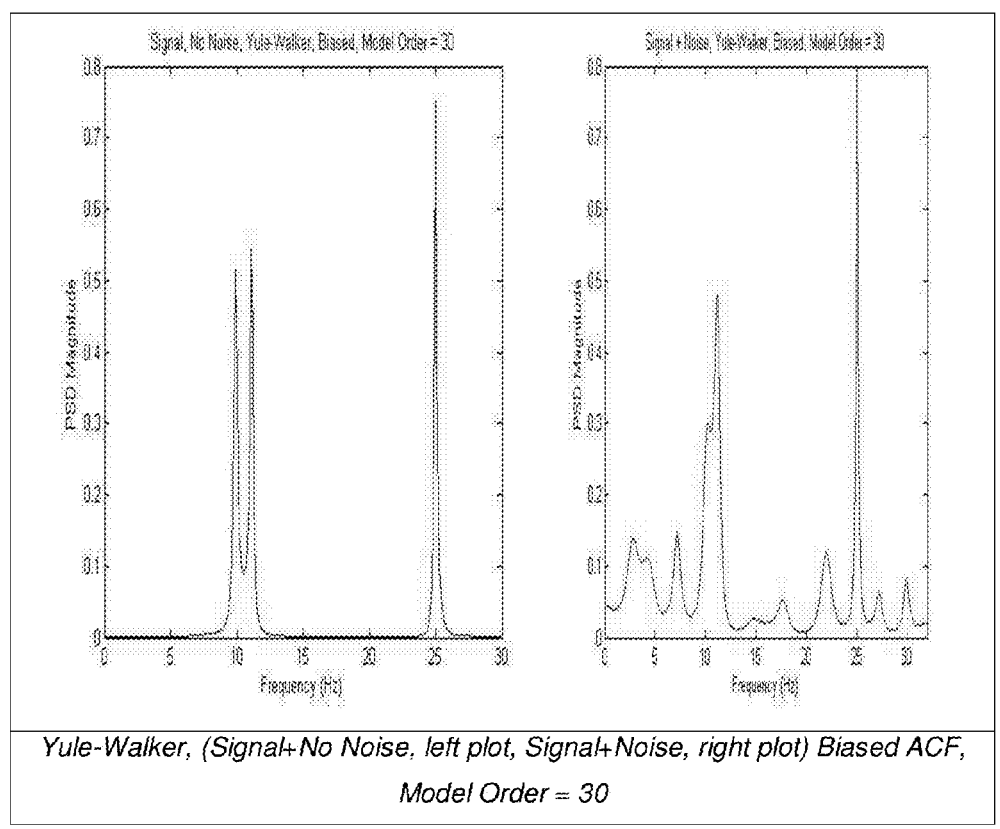
FIG. 27 are graphs of Yule-Walker, (Signal+No Noise, left plot, Signal+Noise, right plot) Biased ACF, Model Order=30.
Figure 28:
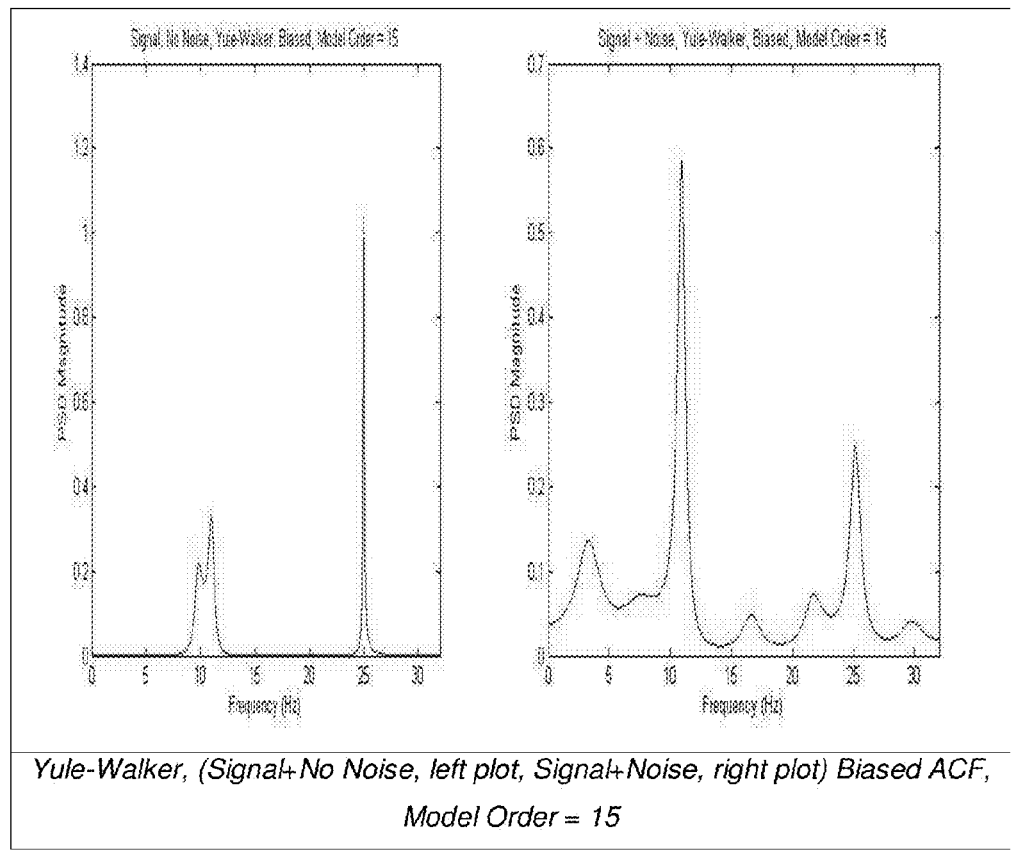
FIG. 28 are graphs of a Yule-Walker, (Signal+No Noise, left plot), Signal+Noise, right plot), Based ACF, Model Order=15.
Figure 29:
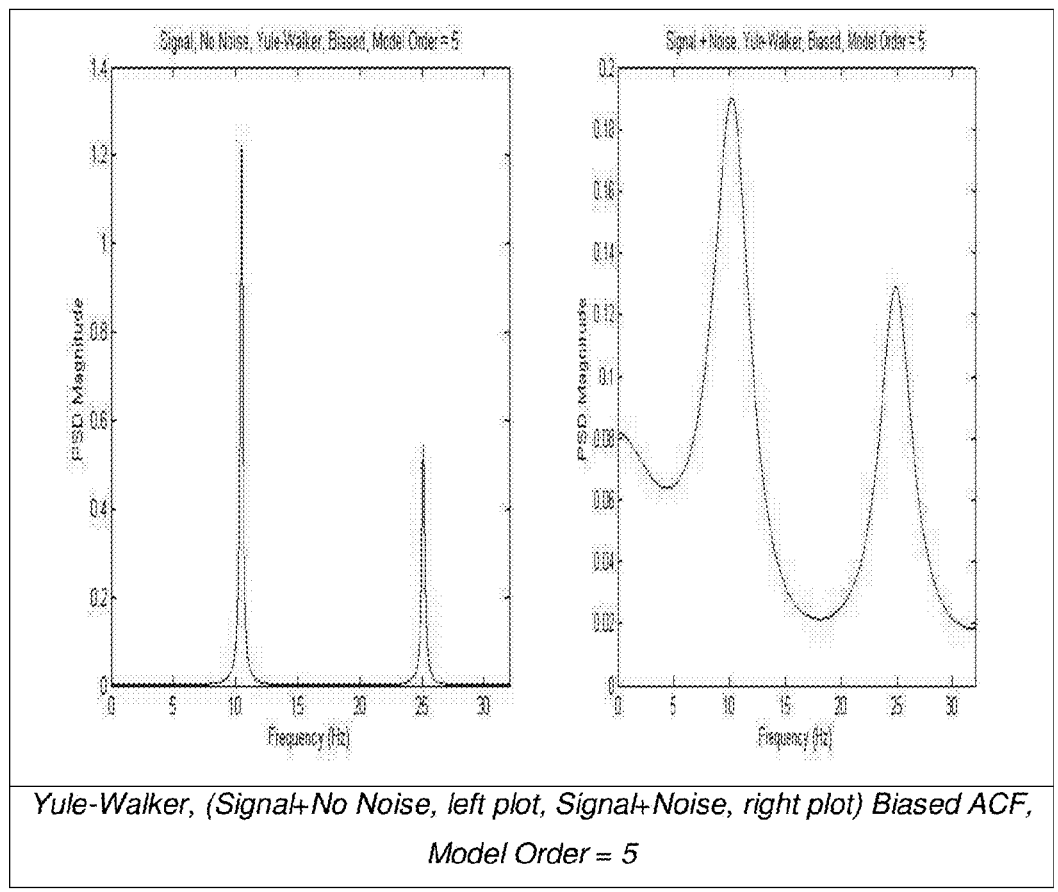
FIG. 29 are graphs of a Yule-Walker, (Signal+No Noise, left plot, Signal+Noise, right plot) Biased ACF, Model Order=5.
Figure 30:
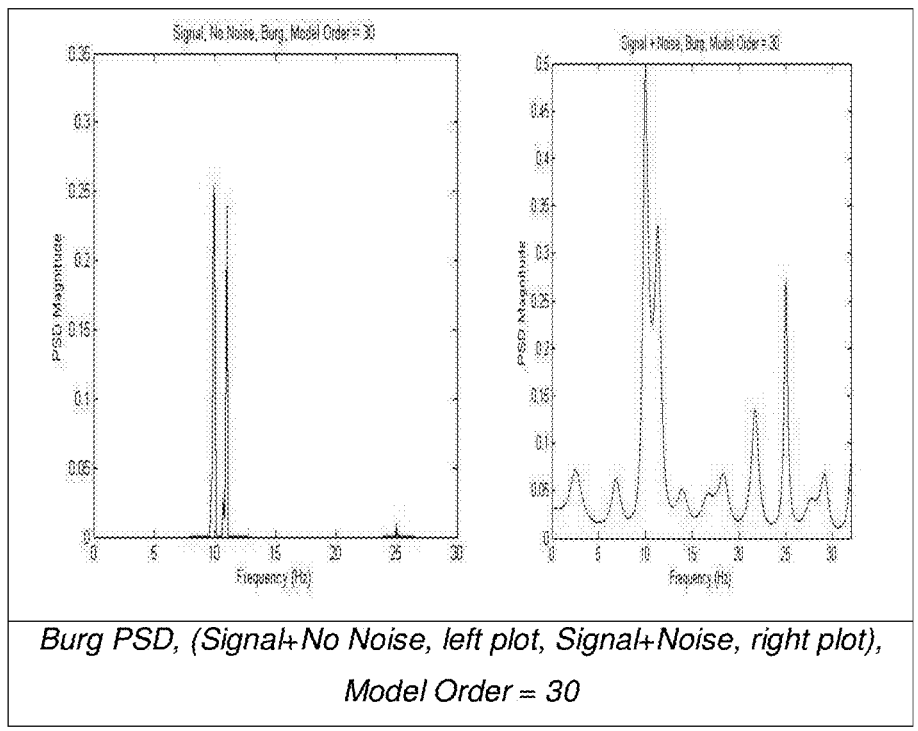
FIG. 30 are graphs of a Burg PSD, (Signal+No Noise, let plot, Signal+Noise, right plot), Model Order=30.
Figure 31:
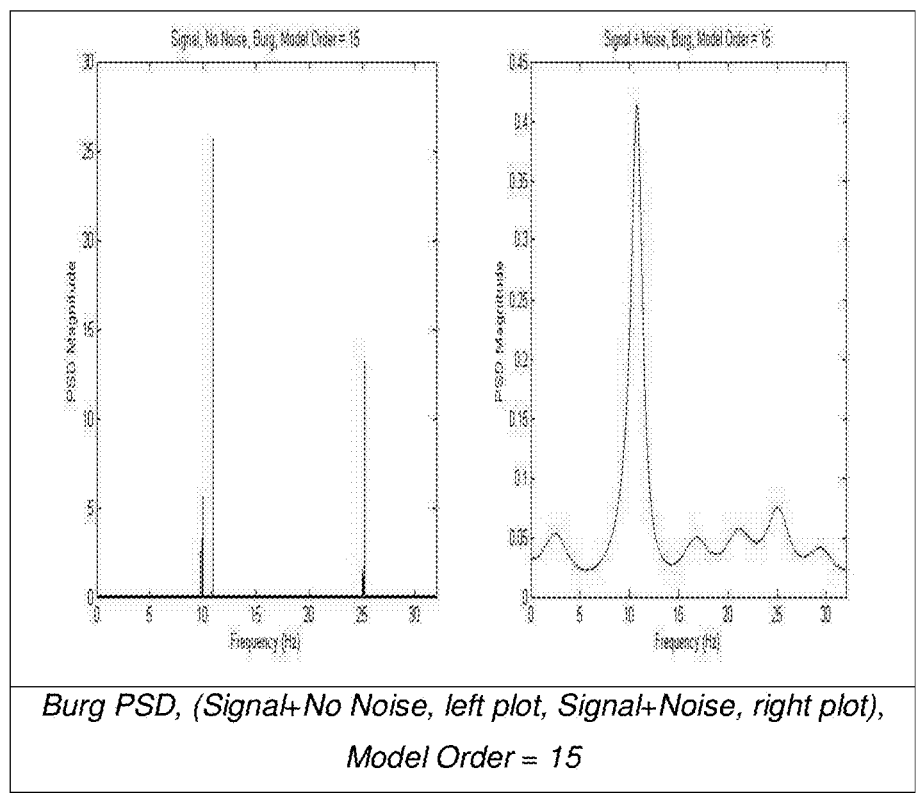
FIG. 31 are graphs of a Burg PSD, (Signal+No Noise left plot, Signal+Noise, right plot), FIG. 32 are graphs of a Burg PSD, (Signal+No Noise, left plot, Signal+Noise, right plot), Model Order=5.
Figure 32:
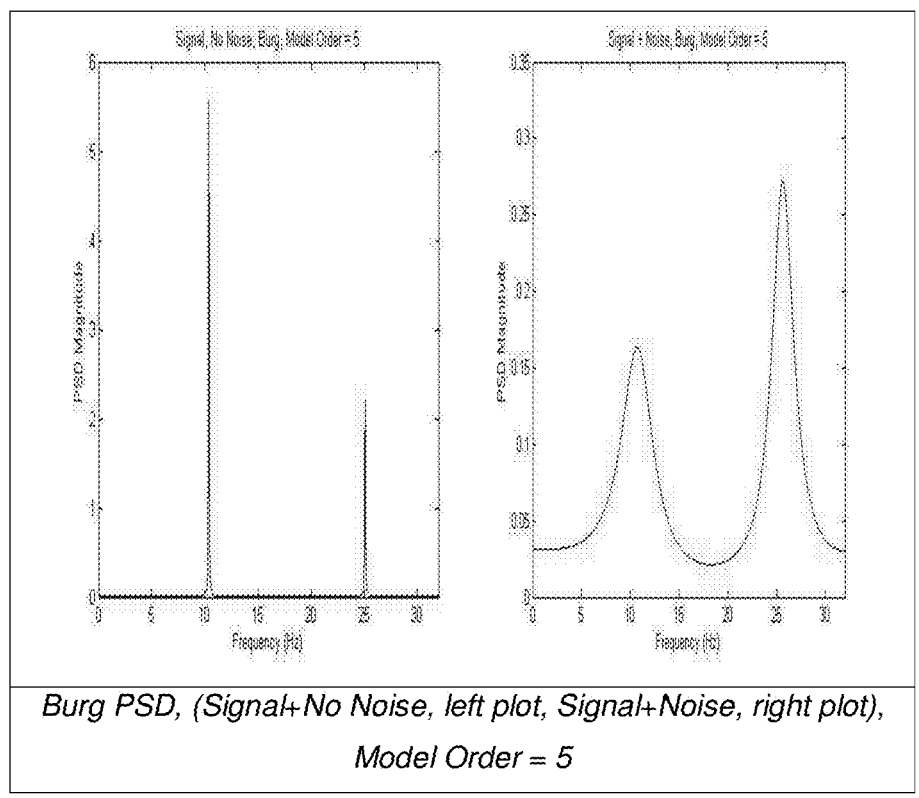
Figure 33:
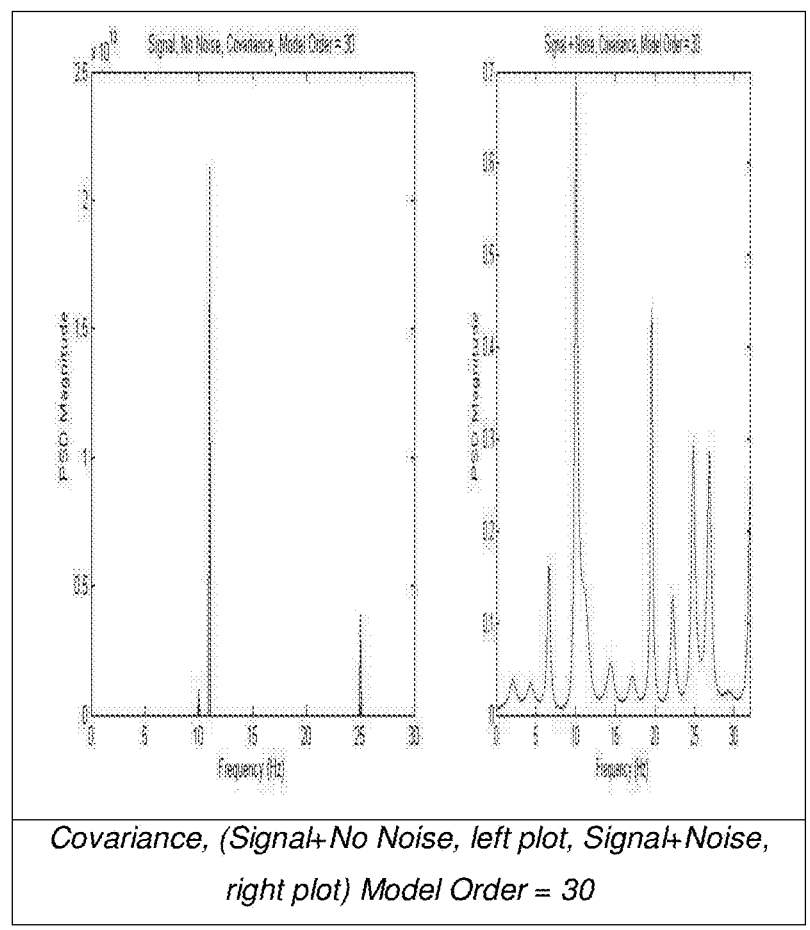
FIG. 33 are graphs illustrating convariance (Signal+No Noise, left plot, Signal+noise, right plot) Model Order=30.
Figure 34:
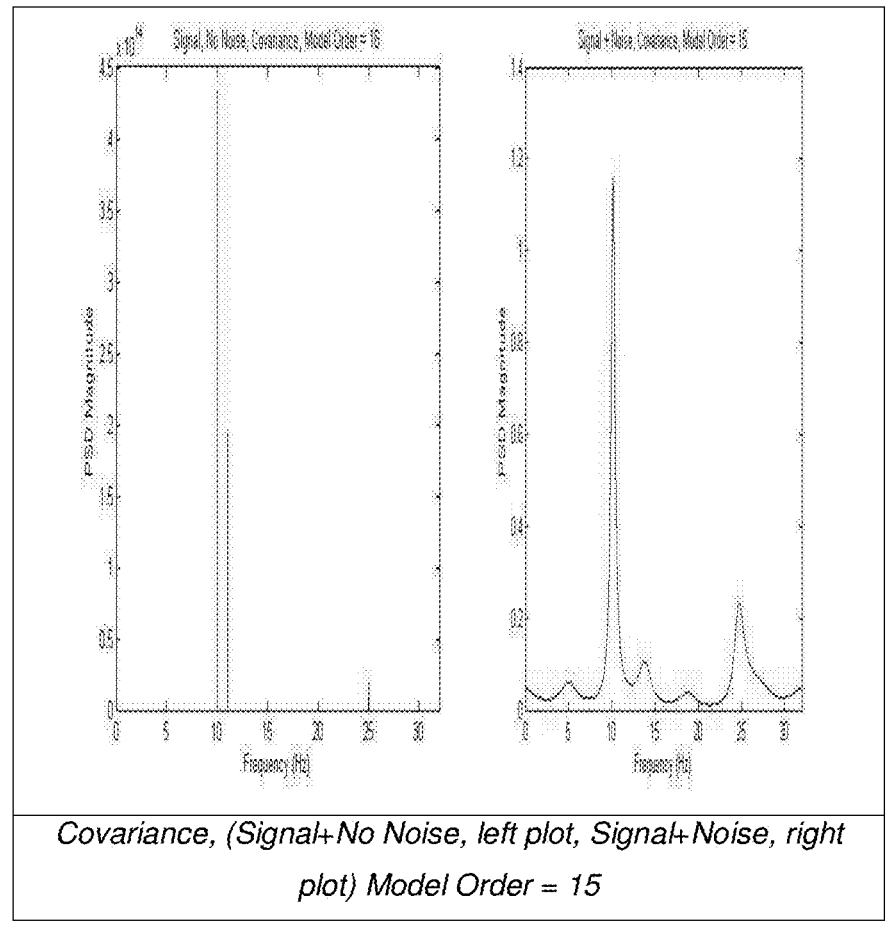
FIG. 34 are graphs illustrating convariance (Signal+No Noise, left plot, Signal+noise, right plot) Model Order=15.
Figure 35:
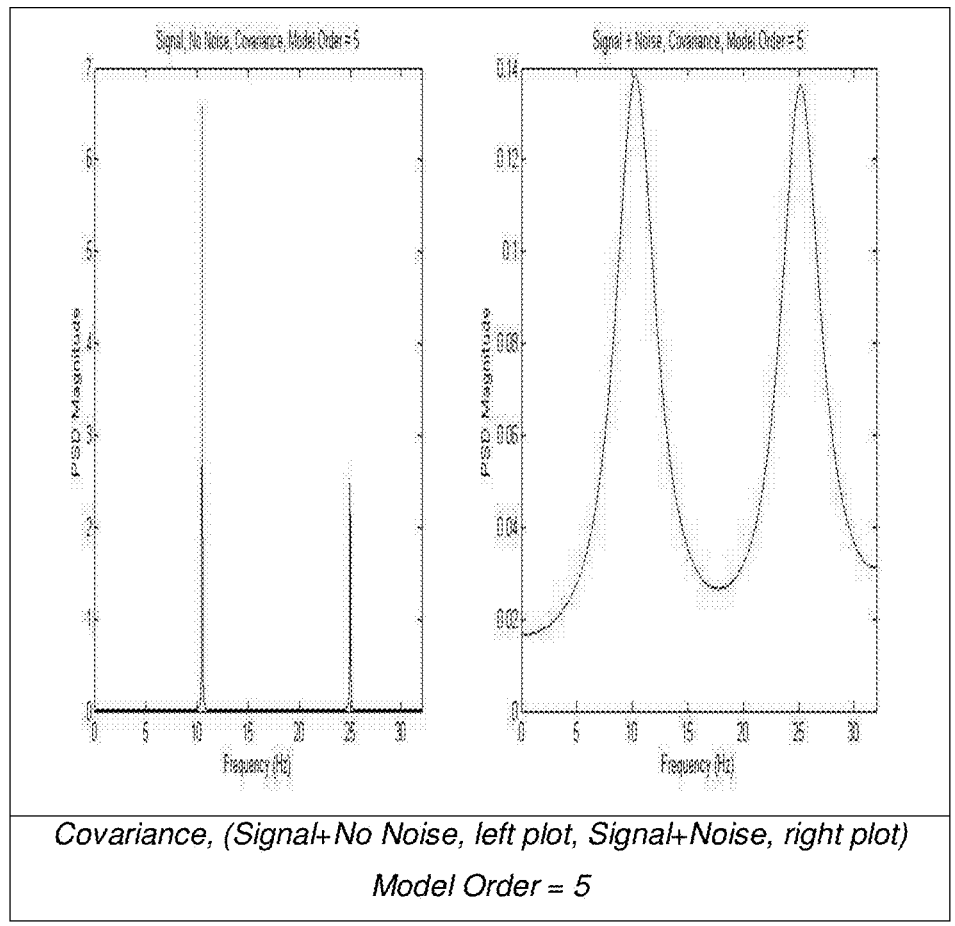
FIG. 35 are graphs illustrating convariance (Signal+No Noise, right plot), Model Order=5.
Figure 36:
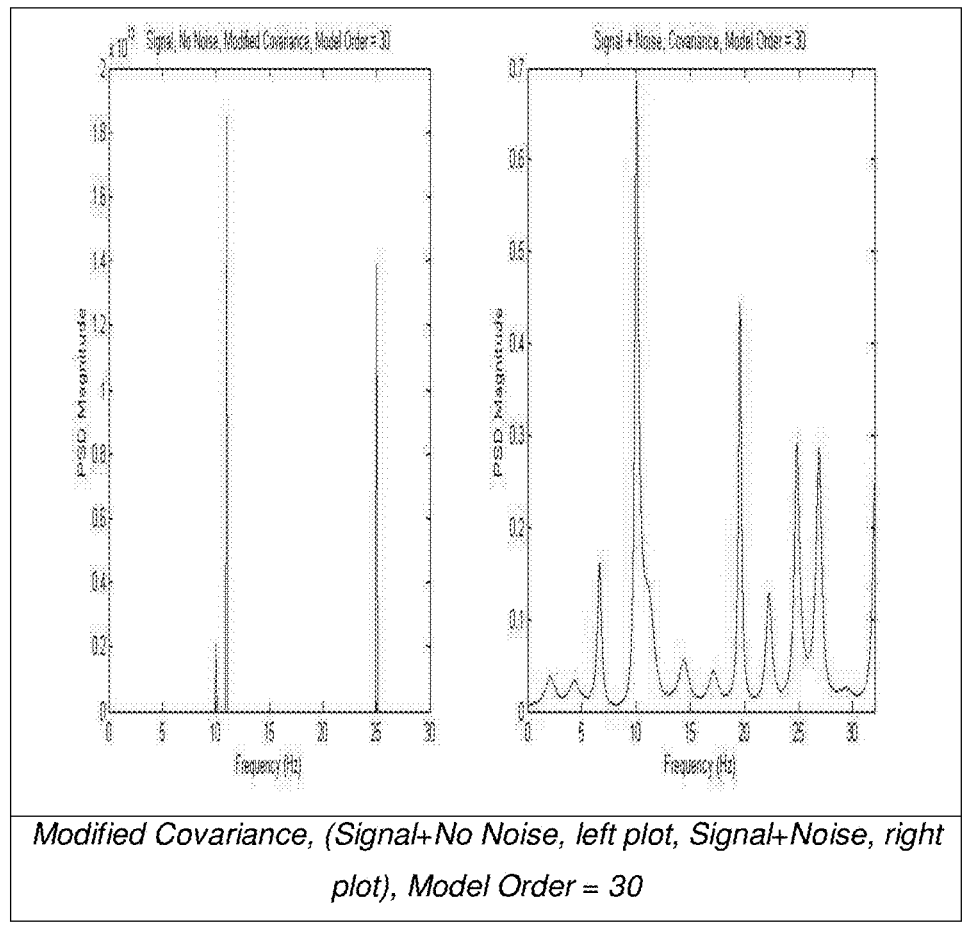
FIG. 36 are graphs illustrating modified convariance (Signal+No Noise, left plot, Signal+Noise, right plot), Model Order=30.
Figure 37:
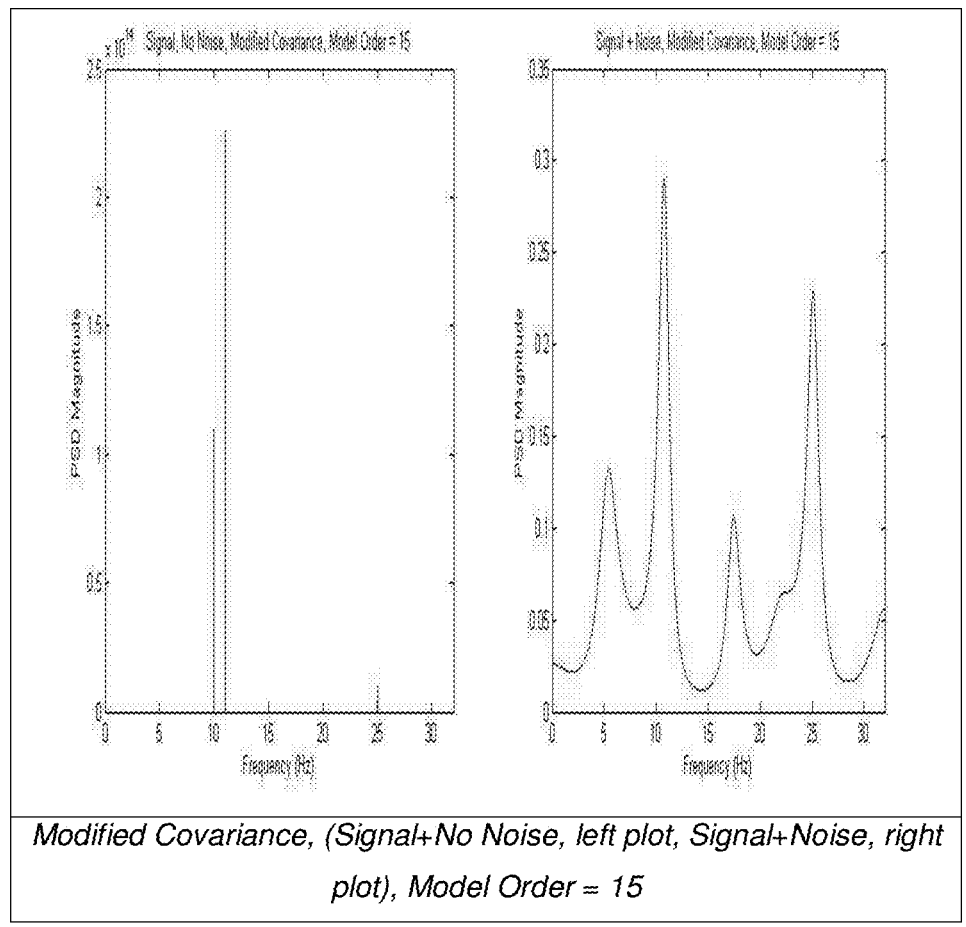
FIG. 37 are graphs illustrating modified convariance (Signal+No Noise, left plot, Signal+Noise, right plot), Model Order=15.
Figure 38:
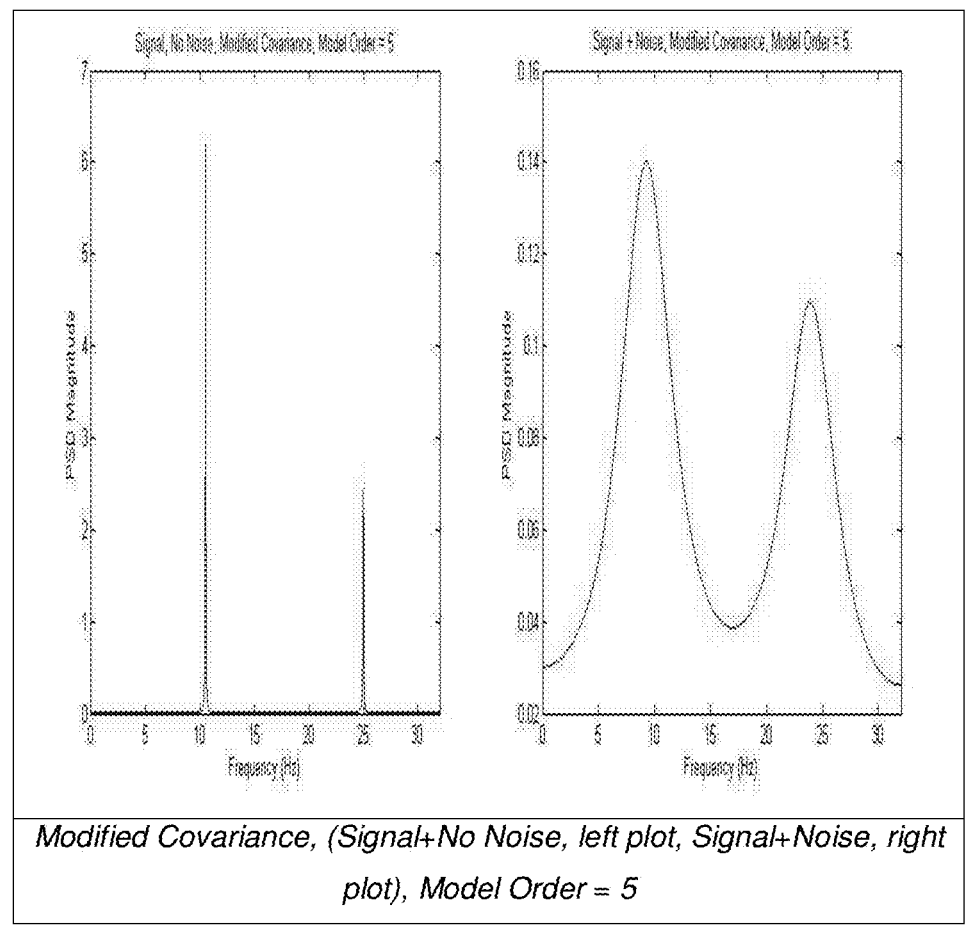
FIG. 38 are graphs illustrating modified convariance (Signal+No Noise, left plot, Signal+Noise, right plot), Model Order=5.
Figure 39:
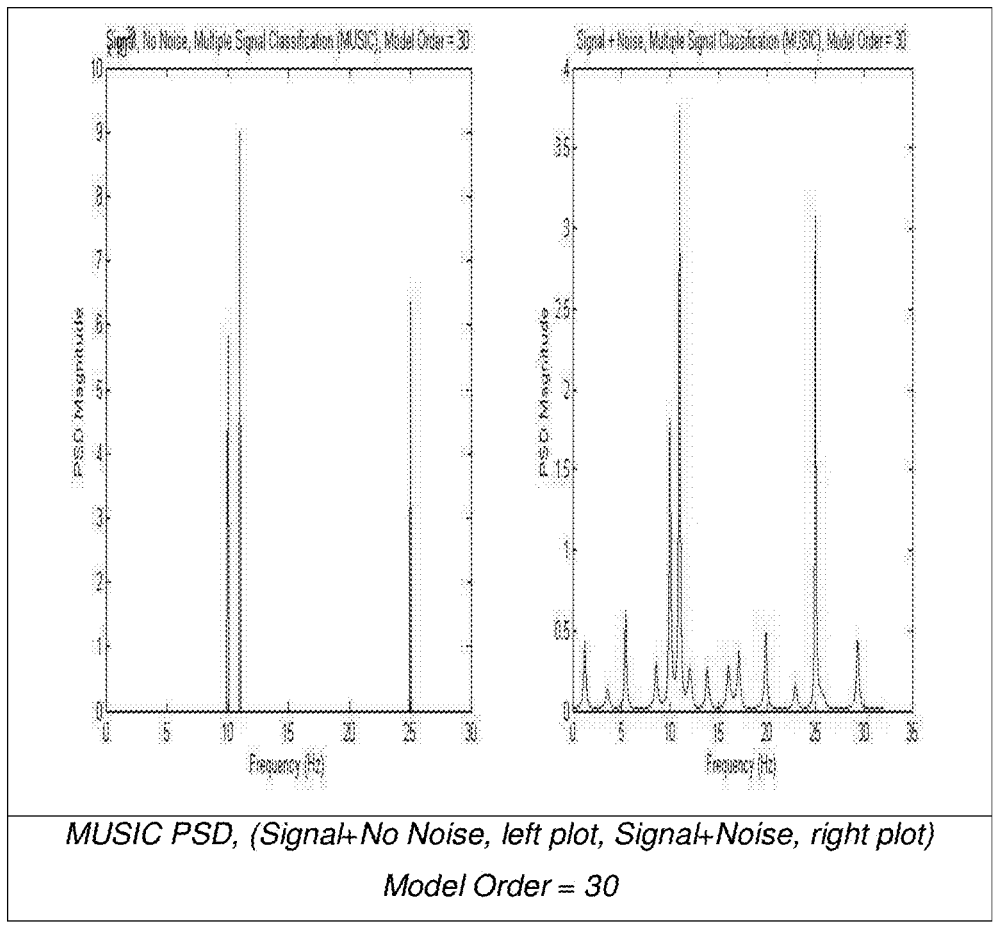
FIG. 39 are graphs illustrating MUSIC PSD, (Signal+No Noise, left plot, Signal+Noise, right plot), Model Order=30.
Figure 40:
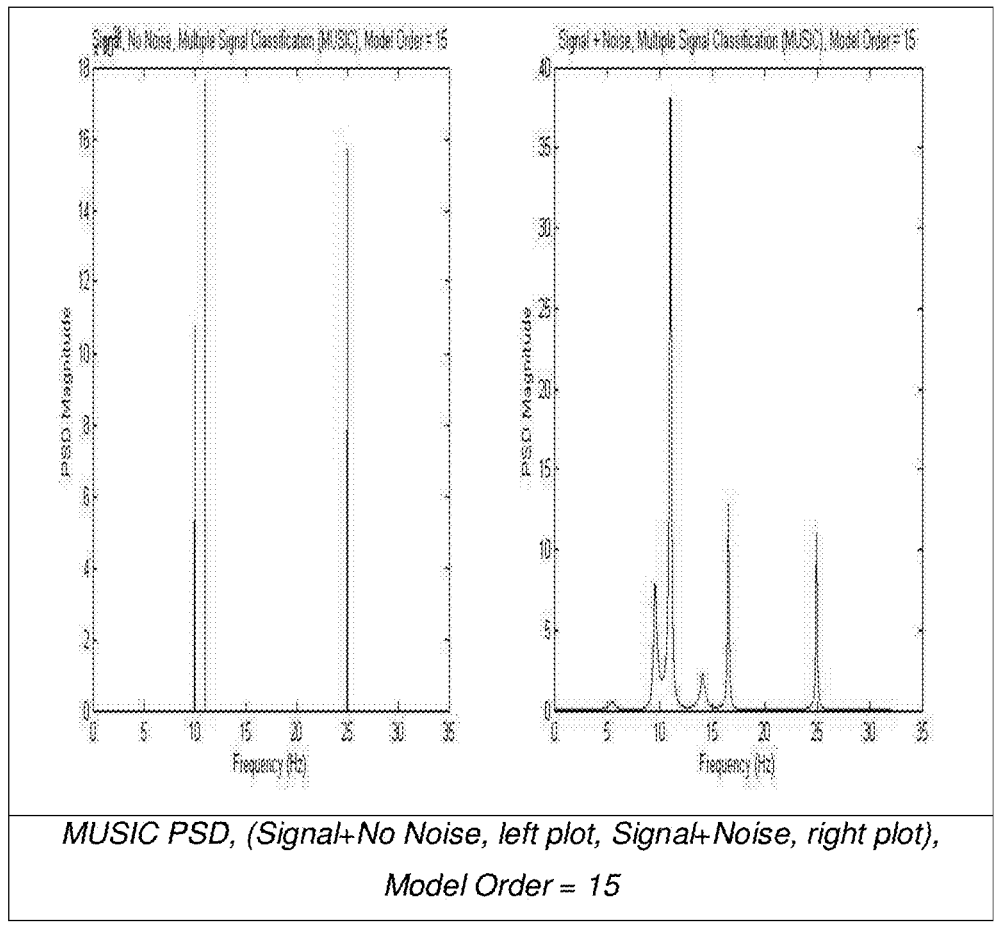
FIG. 40 are graphs illustrating MUSIC PSD (Signal+No Noise, left plot, Signal+Noise, right plot), Model Order=15.
Figure 41:
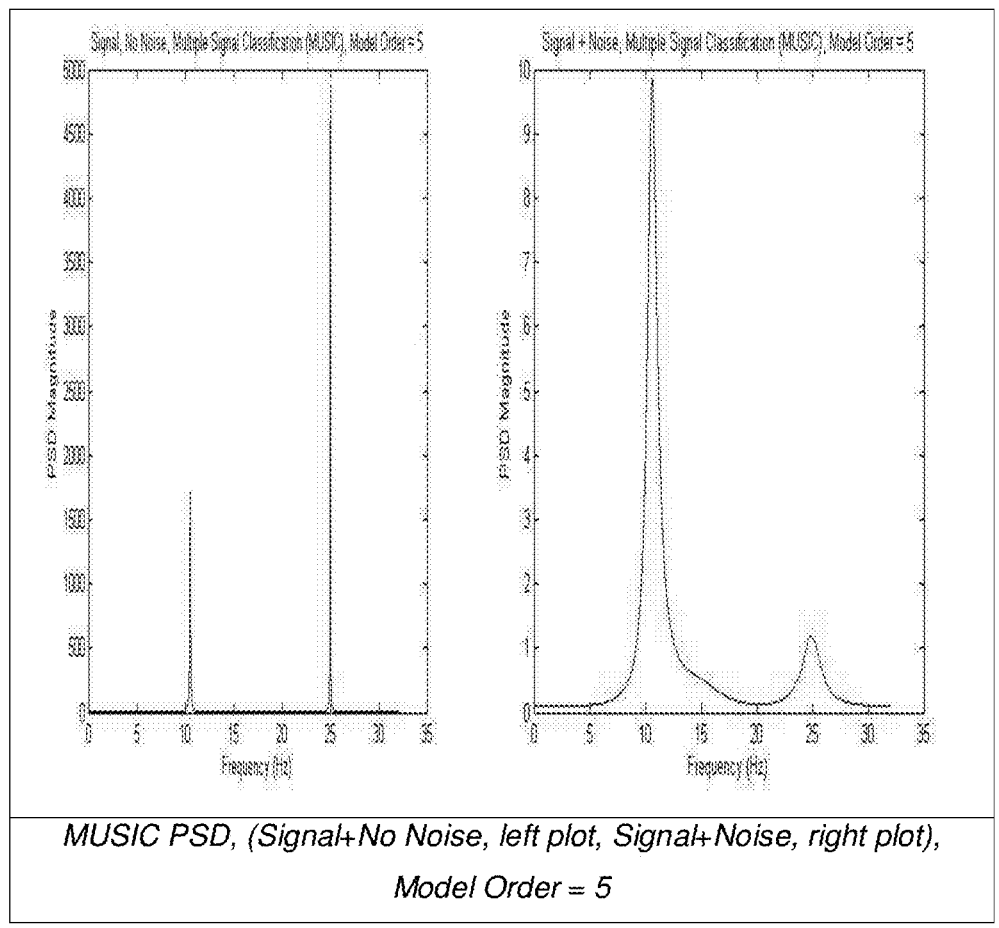
FIG. 41 are graphs illustrating MUSIC PSD (Signal+No Noise, left plot, Signal+Noise, right plot), Model Order=5.
Figure 43:
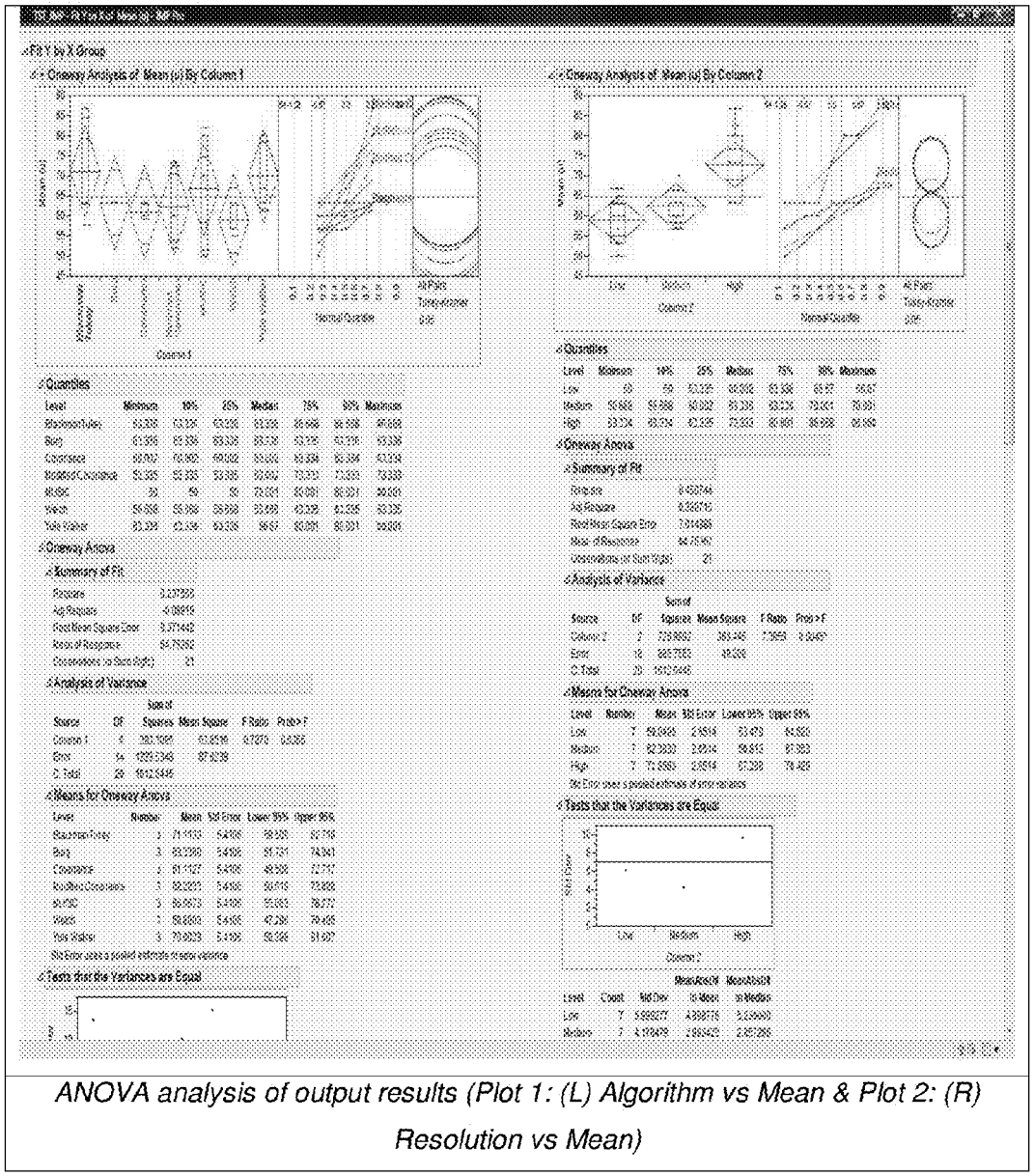
FIG. 43 is an illustrating showing ANOVA analysis of output results (Plot 1: Algorithm vs. mean & Plot 2: (R) Resolution vs. Mean)
Figure 44:
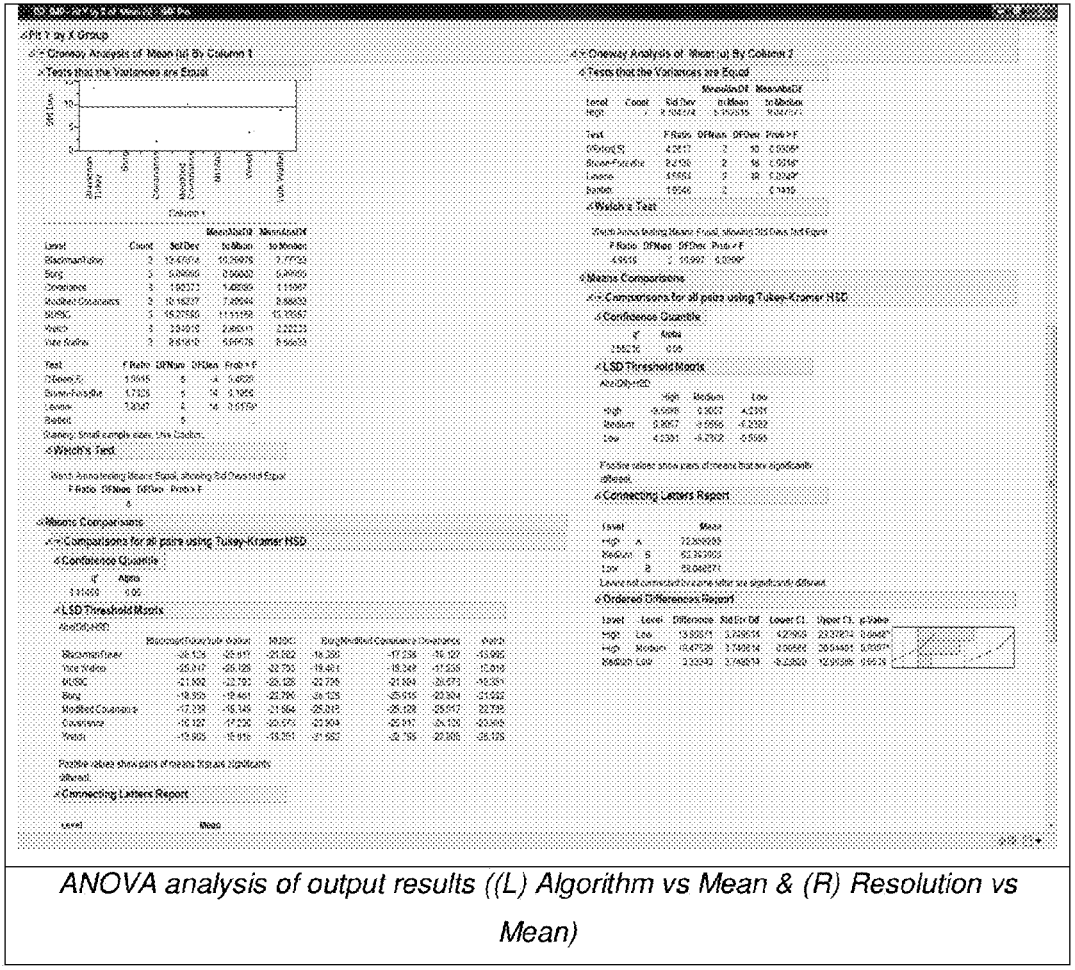
FIG. 44 is an illustration showing ANOVA analysis of output results ((L) Algorithm vs. Mean & (R) Resolution vs. Mean)
Figure 45:
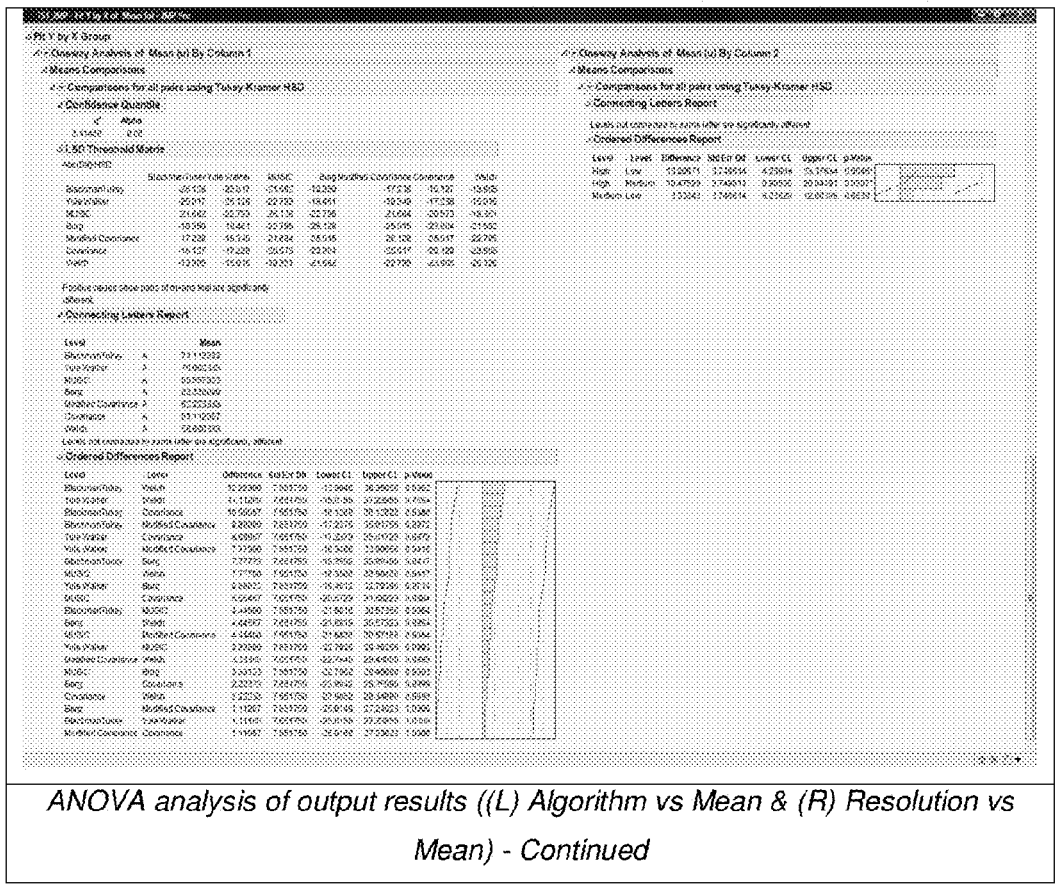
FIG. 45 is an illustration showing ANOVA analysis of output results ((L) Algorithm vs. Mean & (R) Resolution vs. Mean)
Figure 46:
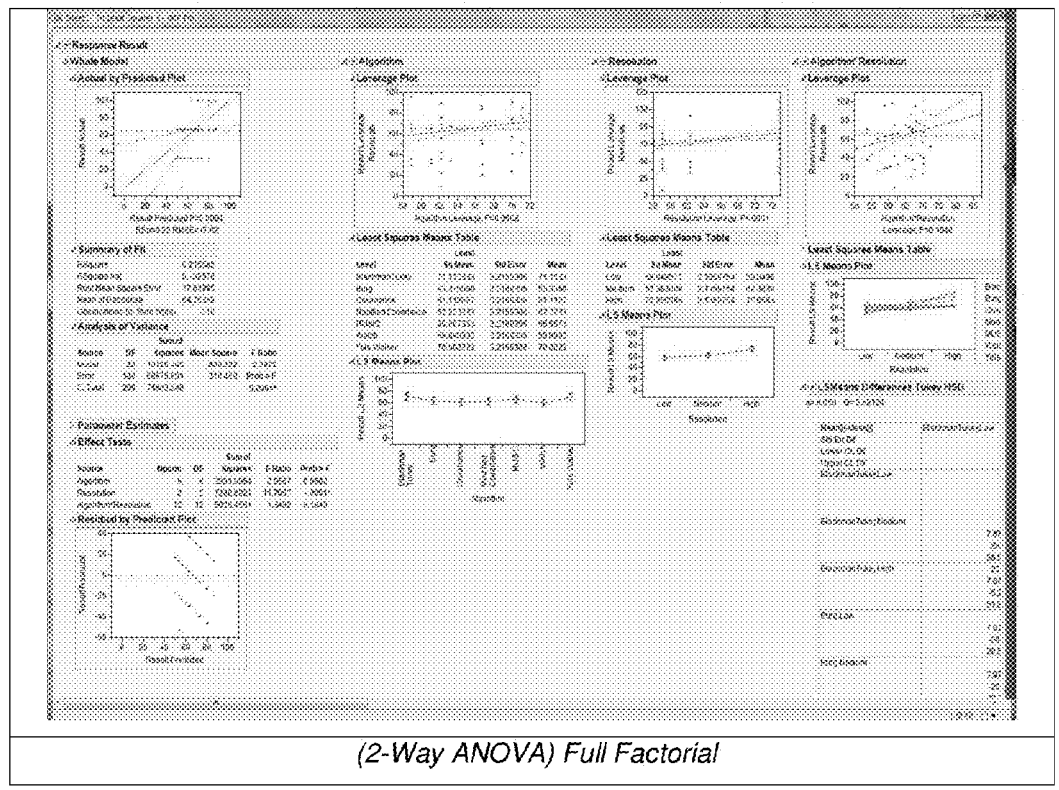
FIG. 46 is an illustration showing a 2-Way ANOVA Full Factorial.

In order for mobile devices to make roaming decisions, these devices must calculate power spectral density. In addition, channel information from a RF base station can be provided to the system controller 104 to determine and estimate the active signals in the area. An evaluation of PSD and estimation techniques will now be described. To calculate the power of a W-CDMA signal, one may integrate over the entire bandwidth of the signal. For instance, a WCDMA signal based upon the 3GPP WCDMA Frequency Division Duplex (FDD) release 99 Downlink Dedicated Physical Channel (DPCH) with a bandwidth of 5 MHz may generate the Power Spectral Density plot of FIG. 20.

Other signals of interest can be derived from base stations in the area. These base stations can perform signal analysis of the RF environment and report the results of this analysis to the system controller 104. Such information can be used to determine why high incidents of BER are reported in specific cell coverage areas. Signal estimation and detection methods were studied with the goal to determine the best Power Spectral Density (PSD) estimation method for the derivation of the PSD of sinusoid signals in the presence of white noise utilizing different estimation methods. In order to achieve this goal, two general classification methods were utilized: non-parametric and parametric methods. Non-parametric methods derive their PSD estimate directly from the input data. Parametric methods model the data as an output of a linear system driven by White Gaussian Noise (e.g. W.G.N) with a specified variance so system parameters can be estimated. Two different input levels were utilized: Level 1: Three input sinusoids, Level 2: Three input sinusoids and regenerated random noise (for each factor).

The following estimation methods were utilized as my factors in this experiment: Blackman-Tukey correlogram, Welch Periodogram, Yule-Walker, Burg, Covariance, Modified Covariance, and Multiple Signal Classification (MUSIC). The analysis of variance (ANOVA) method was then utilized to analyze the variance within each estimation method as well as the variances between different estimation methods.

Factors and Factor Ranges

For each estimation method, the ranges of the factor were varied to best illustrate frequency resolution and derivation of power spectral density. Though a Hamming Window for both the correlogram and periodogram estimation methods were utilized, the ranges of the factors were different for both the correlogram and periodogram estimation methods. The following lag ranges for the correlogram estimation method as 10, 20, and 70 were used. In the equation below L indicates the lag index and is computed using the Discrete Time Fourier Transform (DTFT) of the autocorrelation sequence.

$$P_{xx}(f) = T \sum_{m=-L}^{L} \hat{r}_{xx}(m) e^{-i2\pi f nT} \quad (8)$$

For the periodogram estimation method, different shift adjustments were used for the analysis window. By utilizing an analysis window, we can cause different overlapping sequences and therefore improve the PSD estimate. In the equation below, n represents the index of the input sample sequence.

$$P(f) = \frac{T}{n} \sum_{n=0}^{N-1} |x(n) - e^{-i2\pi f nT}|^2 \quad (9)$$

Again, the input sequence can be overlapped (accomplished by utilizing different shift adjustments) to improve the power spectral density estimate. The following shift adjustments will be used for the periodogram estimation method as 10, 20, and 30.

For the Yule-Walker, Burg, Covariance (& modified covariance), and MUSIC PSD estimation methods, model order 5, 15, and 30 will be utilized. The following is the equation used to calculate the Yule-Walker PSD:

$$\tilde{P}_{AR}(f) := \frac{T * \text{var}(w)}{\left|1 + \sum_{k=1}^{P} \tilde{a}_p(k) e^{-j2\pi k fT}\right|^2} \quad (10)$$

Since the Burg method is an AR process, the following is the equation used to calculate the Burg PSD:

$$\tilde{P}_{AR}(f) := \frac{T * \text{var}(w)}{\left|1 + \sum_{k=1}^{P} \tilde{a}_p(k) e^{-j2\pi k fT}\right|^2} \quad (11)$$

The value $\tilde{a}_p(k)$ is derived by utilizing a harmonic mean between the forward and backward partial correlation coefficients to calculate the reflection coefficient, $K_p$. Once these AR parameters are calculated, the PSD estimate is calculated as described in the equation above.

$$K_p := \frac{-2 \sum_{n=p+1}^{N} e_{p-1}^{f}[n] e_{p-1}^{b*}[n]}{\sum_{n=p+1}^{N} |e_{p-1}^{f}[n]|^2 + \sum_{n=p+1}^{N} |e_{p-1}^{b}[n]|^2} \quad (12)$$

At each order, P, the variance of the forward and backward linear error prediction is minimized. This calculated utilizing an arithmetic mean:

$$\text{var}(fb) := 1 \bigg/ 2 \left[ 1/N \sum_{n=p+1}^{N} |e_p^f[n]|^2 + 1/N \sum_{n=p+1}^{N} |e_p^b[n]|^2 \right] \quad (13)$$

Since the Covariance method is also an AR process, the following is the equation used to calculate the Covariance PSD:

$$\tilde{P}_{AR}(f) := \frac{T * \text{var}(w)}{\left|1 + \sum_{k=1}^{P} \tilde{a}_p(k) e^{-j2\pi k fT}\right|^2} \quad (14)$$

The following is how to compute the covariance matrix of a signal x of time series length N, with maximum lag M:

$$C_{ij} := \left(\frac{1}{N-M}\right) \sum_{k=1}^{N-M} x(k + \boxed{?}\boxed{?}i) x(k + \boxed{?}\boxed{?}j) \quad (15)$$

and individual elements of $R_p$:

$$r_p[i, j] := \sum_{k=p+1}^{N} x^*(k - \boxed{?}i) x(k - \boxed{?}\boxed{?}j) + x(n - p + i) x^*(n - p + j). \quad (16)$$

This PSD algorithm minimizes the forward error prediction utilizing least squares to determine AR parameters, $\tilde{a}_p(k)$.

Since the Modified Covariance method is also an AR process, the following is the equation used to calculate the Modified Covariance PSD:

$$\tilde{P}_{AR}(f) := \frac{T * \text{var}(w)}{\left|1 + \sum_{k=1}^{P} \tilde{a}_p(k)e^{-j2\pi kfT}\right|^2} \quad (17)$$

The following is how to compute the covariance matrix of a signal x of time series length N, with maximum lag M:

$$C_{ij} := \left(\frac{1}{N-M}\right) \sum_{k=1}^{N-M} x(k+i)x(k+j) \quad (18)$$

and individual elements of $R_p$:

$$r_p[i,j] := \sum_{k=p+1}^{N} x^*(k-i)x(k-j) + x(n-p+i)x^*(n-p+j). \quad (19)$$

This PSD algorithm minimizes the both the forward error prediction and the backward error prediction utilizing least squares to determine AR parameters, $\tilde{a}_p(k)$.

The 'pseudo' (not true PSD) MUSIC spectrum estimate is derived from the following equation:

$$P_{MUSIC}(f) := \frac{1}{\bar{e}^H(f)\left(\sum_{k=M+1}^{P+1} \bar{v}_k \bar{v}_k^H\right)\bar{e}(f)} \quad (20)$$

The power spectral density information is lost when utilizing the MUSIC algorithm; however, it is quite useful in the derivation of the frequency components of signals embedded in white noise.

Levels

Input the following signal combinations (Levels):

TABLE 5

| | Input Signals for PSD Measurement Tests |
|---|---|
| 1 | Signal (3 sinusoids) |
| 2 | Signal (3 sinusoids) + AWGN |

Create the noise signal using a randomly generated noise signal in MATLAB, using the "rand( )" function.

Measurement

Measure the magnitude (y-axis) of the three output sinusoids as function of frequency (x-axis) for each factor, range, and input level for a large (10) replicated set of test executions. Random noise is regenerated per replicated test.

Response Variables

The following may be used as response variables for the tests to be performed.

TABLE 6

| | Response Variables (Measured Results) |
|---|---|
| 1 | Number of output signal frequencies. |
| 2 | Magnitude of each output signal frequency. This is a maximum of three magnitudes per replicated test. |

Factors, Factor Levels, and Response Variables

The following sections will describe the Factors, Factor Levels, and Response Variables for each of the following algorithms: Blackman-Tukey correlogram, Welch Periodogram, Yule-Walker, Burg, Covariance, Modified Covariance, and Multiple Signal Classification (MUSIC). Also included are test runs for these algorithms. The results for 5 runs [replicates] for each algorithm will be executed and recorded.

Blackman-Tukey Test Factors, Factor Levels, and Response Variables

Three input sinusoids at the following frequencies: 10 Hz, 11 Hz, and 25 Hz, with Factor having 3 levels: 10, 20, and 70. Factor: Lag equals variable 'L' as used in the following equation:

$$P_{xx}(f) = T \sum_{m=-L}^{L} \hat{r}_{xx}(m) e^{-i2\pi fmT} \quad (21)$$

Welch Test Factors, Factor Levels, and Response Variables

Three input sinusoids at the following frequencies: 10 Hz, 11 Hz, and 25 Hz, with Factor having 2 levels: Shift Index 10 and 20. Factor: Shift index used in the following equation. The shift index is used to overlap the input sequence x(n) in the equation below.

$$P(f) = \frac{T}{N} \sum_{n=0}^{N-1} |x(n)e^{-i2\pi fnT}|^2 \quad (22)$$

Yule-Walker Test Factors, Factor Levels, and Response Variables

Three input sinusoids at the following frequencies: 10 Hz, 11 Hz, and 25 Hz, with Factor having 3 levels: Model Order 5, 15, and 30. Factor: Model order is used in the following equation. The model order represents the 'p' summation range in the equation below.

The following is the equation used to calculate the Yule-Walker PSD:

$$\tilde{P}_{AR}(f) := \frac{T*\text{var}(w)}{\left|1 + \sum_{k=1}^{P} \tilde{a}_p(k) e^{-j2\pi kfT}\right|^2} \tag{23}$$

Burg Test Factors, Factor Levels, and Response Variables

Three input sinusoids at the following frequencies: 10 Hz, 11 Hz, and 25 Hz, with Factor having 3 levels: Model Order 5, 15, and 30. Factor: Model order is used in the following equation. The model order represents the 'p' summation range in the equation below.

$$\tilde{P}_{AR}(f) := \frac{T*\text{var}(w)}{\left|1 + \sum_{k=1}^{P} \tilde{a}_p(k) e^{-j2\pi kfT}\right|^2} \tag{24}$$

Unlike the Yule-Walker AR process, the value $\tilde{a}_p(k)$ for the Burg PSD estimator, is derived by utilizing a harmonic mean between the forward and backward partial correlation coefficients to calculate the reflection coefficient, $K_p$. Once these AR parameters are calculated, the PSD estimate is calculated as described in the equation above.

$$K_p := \frac{-2 \sum_{n=p+1}^{N} e_{p-1}^f[n] e_{p-1}^{b*}[n]}{\sum_{n=p+1}^{N} |e_{p-1}^f[n]|^2 + \sum_{n=p+1}^{N} |e_{p-1}^b[n]|^2} \tag{25}$$

At each order, P, the variance of the forward and backward linear error prediction is minimized. This calculated utilizing an arithmetic mean:

$$\text{var}(fb) := 1 \Big/ 2 \left[ 1/N \sum_{n=p+1}^{N} |e_p^f[n]|^2 + 1/N \sum_{n=p+1}^{N} |e_p^b[n]|^2 \right] \tag{26}$$

Covariance Test Factors, Factor Levels, and Response Variables

Three input sinusoids at the following frequencies: 10 Hz, 11 Hz, and 25 Hz, with Factor having 3 levels: Model Order 5, 15, and 30. Factor: Model order is used in the following equation. The model order represents the 'p' summation range in the equation below.

$$\tilde{P}_{AR}(f) := \frac{T*\text{var}(w)}{\left|1 + \sum_{k=1}^{P} \tilde{a}_p(k) e^{-j2\pi kfT}\right|^2} \tag{27}$$

Unique to the covariance PSD estimator, the following is used to compute the covariance matrix of a signal x of time series length N, with maximum lag M:

$$C_{ij} := \left(\frac{1}{N-M}\right) \sum_{k=1}^{N-M} x(k + \boxed{?}\boxed{?} i) x(k + \boxed{?}\boxed{?} j) \tag{28}$$

and individual elements of $R_p$:

$$r_p[i, j] := \sum_{k=p+1}^{N} x^*(k - \boxed{?} i) x(k - \boxed{?}\boxed{?} j) + x(n - p + i) x^*(n - p + j) \tag{29}$$

This PSD algorithm minimizes the forward error prediction utilizing least squares to determine AR parameters, $\tilde{a}_p(k)$ in the equation above.

Three input sinusoids at the following frequencies: 10 Hz, 11 Hz, and 25 Hz, with Factor having 3 levels: Model Order 5, 15, and 30. Factor: Model order is used in the following equation. The model order represents the 'p' summation range in the equation below.

$$\tilde{P}_{AR}(f) := \frac{T*\text{var}(w)}{\left|1 + \sum_{k=1}^{P} \tilde{a}_p(k) e^{-j2\pi kfT}\right|^2} \tag{30}$$

The following is how to compute the covariance matrix of a signal x of time series length N, with maximum lag M:

$$C_{ij} := \left(\frac{1}{N-M}\right) \sum_{k=1}^{N-M} x(k + \boxed{?}\boxed{?} i) x(k + \boxed{?}\boxed{?} j) \tag{31}$$

and individual elements of $R_p$:

$$r_p[i, j] := \sum_{k=p+1}^{N} x^*(k - \boxed{?} i) x(k - \boxed{?}\boxed{?} j) + x(n - p + i) x^*(n - p + j). \tag{32}$$

This PSD algorithm minimizes the both the forward error prediction and the backward error prediction utilizing least squares to determine AR parameters, $\tilde{a}_p(k)$ in the above equation.

Music Test Factors, Factor Levels, and Response Variables

Three input sinusoids at the following frequencies: 10 Hz, 11 Hz, and 25 Hz, with Factor having 3 levels: Model Order 5, 15, and 30. Factor: Model order is used in the following equation. The model order represents the 'p' summation range in the equation below.

The 'pseudo' (not true PSD) MUSIC spectrum estimate is derived from the following equation:

$$P_{MUSIC}(f) := \frac{1}{\bar{e}^H(f) \left(\sum_{k=M+1}^{P+1} \bar{v}_k \bar{v}_k^H\right) \bar{e}(f)} \tag{33}$$

JMP Results

Three input signals described above using MATLAB are modeled. Each signal was mixed with White Gaussian Noise (WGN) with zero mean. The following estimation methods are utilized as the algorithms in this experiment: Blackman-Tukey correlogram, Welch Periodogram, Yule-Walker, Burg, Covariance, Modified Covariance, and Multiple Signal Classification (MUSIC). The accuracy of the estimation method were measured using a low, medium, and high resolution factor (pertinent to each algorithm). The goal of this test is determine which estimation algorithm is most accurate given similar resolution factors. The way this is measured is to determine if, when three signals are entered mixed with random noise (two signals very close in frequency), that the frequency of all three signals on the output can be accurately estimated. 10 runs with each algorithm were run using a random estimation model with a low, medium, and resolution factor for each algorithm.

JMP Output Data

The following output data was produced by JMP. Several tests were performed to determine if there was any interaction between the main effects: Algorithm and Resolution, as well as, test the variances of each algorithm. A one-way ANOVA, a two-way ANOVA, several means tests, and finally the conclusion drawn from the two-way ANOVA test output were executed.

The output response data table above is coded in the following way:

TABLE 7

Output Response Results (ANOVA)

| | | |
|---|---|---|
| 1 | All three signals correctly estimated | 100 |
| 2 | Only two signals correctly estimated | 66.67 |
| 3 | Only one signal correctly estimated | 33.33 |

Each algorithm is listed with its resolution factor level of Low, Medium, or High. We expect to see the best results for each algorithm using the high resolution factor level.

JMP ANOVA (One-Way)

Response variable=mean output. The mean output was compared to both the algorithm and the resolution of the algorithm model. Parallel quantile plots data versus normal distribution should be seen. The tilt of each plot line indicates different standard deviations. Also, the distance between the plot lines indicates differences in variances. It was noted that the variances are different for each algorithm. Additionally, it is clear that the Burg algorithm has the smallest variance. The different quantile box sizes strongly indicate different variances.

Differences in variances are confirmed by the difference of variance test whose output is displayed above.

The various differences in means are displayed above in the table. Note that the variance for High resolution is quite different from both the low and medium resolution models.

JMP ANOVA (Two-Way)

The purpose of this test is to determine any interactions of the main effects. The Main effects: Algorithm and Resolution with their interaction (Algorithm and Resolution). The Least Squares Means plots [in the lower portion of the figure above] indicate that resolution factor (P-Value) is a significant factor. At first glance it would seem there is a significant interaction effect present-plot in lower portion of the 2-Way ANOVA display; however, after review of the Effect Tests, it is clear that the P-Value is only significant for the Resolution factor. There doesn't appear to be a strong interaction effect between factors Algorithm and Resolution.

JMP Result/Conclusion

This indicates no strong interaction between Resolution and Algorithm. However, it does suggest the major differences between the Algorithm and Resolution combinations. It indicates that the Blackman Tukey algorithm model and the MUSIC algorithm model when operated utilizing high resolution parameters provide the highest overall mean and therefore the most accurate result of the algorithms tested.

In fact, the estimation accuracy of the algorithms is accurately described above. It can be concluded that the best methods to estimate and calculate the PSD for wireless signals are the top two algorithms: the Blackman Tukey using its high resolution factor and the Yule Walker algorithm using its high resolution factor. Music using its high resolution factor cannot be considered for wireless PSD estimation since the algorithm loses the spectral power components of the signal; it is strictly to be used for estimating frequency components, but not spectral power components. Note that some of the algorithms perform better using their lower resolution factors than other algorithms that are using their highest resolution factors.

System Design

The hardware component types of the system design comprise the 802.11X and cellular base stations and the system controller 104. The base stations may be comprised of a General Purpose Processor (GPP), a number of Digital Signal Processors (DSP), and a number of RF receive and transmit chains. Both the transmitter and receiver may have an antenna. The receiver may have a (e.g. Low Noise Amplifier) a matched filter on the front end as well as an Analog to Digital Converter (ADC), the transmitter will have a Digital to Analog Converter (DAC) and may have a LNA along with an impedance matching circuit to ensure VSWR is not produced. The focus on the design of the base station is to ensure the design allows for a continual evolution in regard to the physical modulation techniques. The design needs to be capable of adapting to changes in the modulation techniques. The design also must ensure that the receive sensitivity is sufficient to receive the minimum desired signal. The receive sensitivity can be defined as the minimum desired signal power above the noise floor of the receiver as defined by the following equation:

$$\text{Pwr}_{min} = \text{NoiseFloor}_{rcvr} + \text{SNR}_{desired} \qquad (34)$$

System-On-Chip (SoC) designs now include GPP and a number of DSPs are typical. Often these designs do include an FPGA, however, some implementations are now focusing on DSP arrays such as those provided by Picochip (now Mindspeed) and Coherent Logix (HyperX). In these cases, small FPGAs are used for I/O multiplexing only while all DSP functions are performed in software on DSP arrays (27 nm technology) fully integrated with DSP tools such as MATLAB and SIMULINK.

Figure 48:
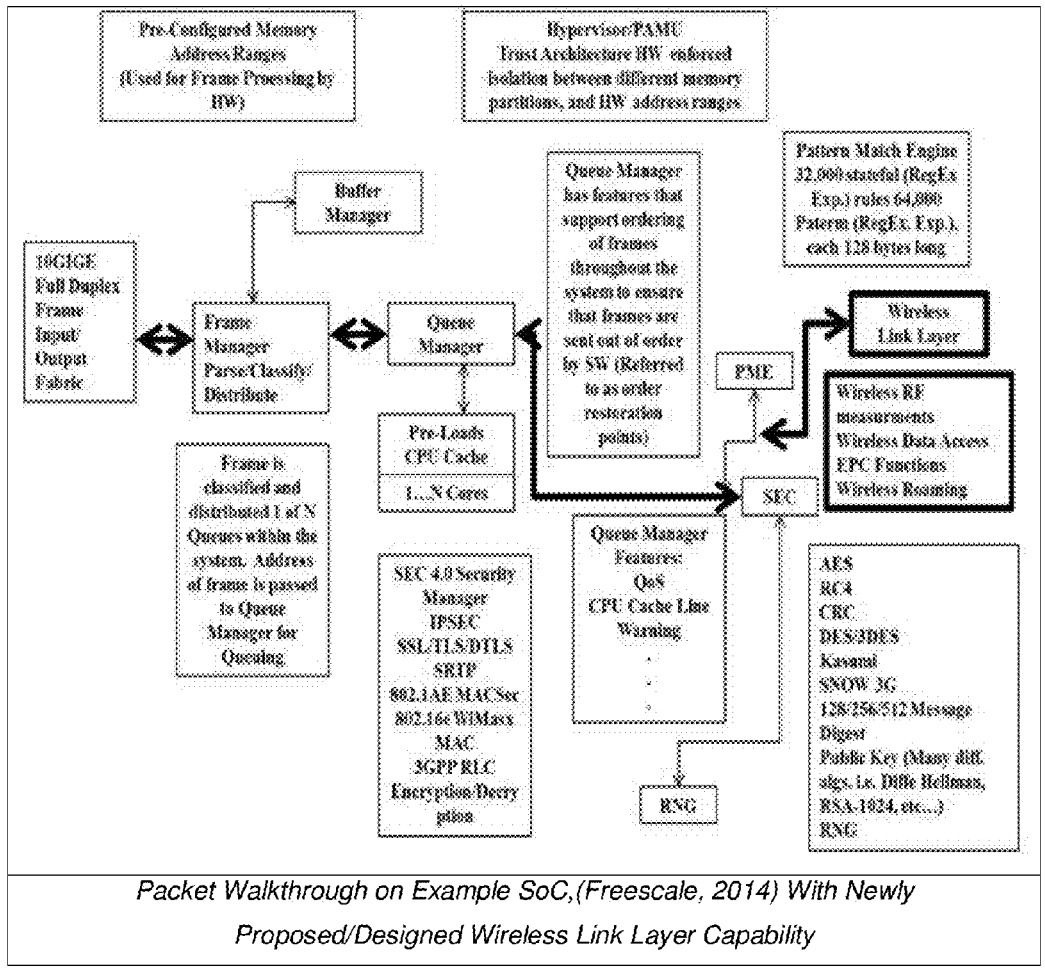
FIG. 48 is a simplified block diagram showing a packet walkthrough on Example SoC with a newly proposed/designed wireless link layer capability.

The system controller 104 may be comprised of specialized hardware that is designed to perform high performance network frame processing and may be designed to handle >40 Gbs encrypted link layer network traffic. In order for the system controller 104 to handle encrypted network traffic at this rate, it must have a hardware based data path. The hardware data path includes the following functions:

Classification of network frames. Frames with encrypted traffic can be characterized based upon the source MAC address of the mobile device that transmitted the frame as well as any relevant network headers such as VLAN tags. Once classification is performed, the address of the received frame may be distributed to a cryptography engine for decryption as well as pre and post processing engines. The packet walkthrough of FIG. 48 is an example of an architecture where majority of frame processing is off-loaded from GPP cores.

The HW state machine described above comprise their own Direct Memory Address (DMA) engines to read and write data to and from memory as required during frame processing through a memory gasket and memory controller. Such a configuration may include a GPP to provide configuration and management of the HW during its configuration and boot cycles [this is sometimes referred to as the control plane]. In addition, it may include a slow speed peripheral memory bus so that configuration registers on the HW could be modified during configuration. A GPP may also be included to handle exceptional conditions that occur during frame processing such as error frames and could be helpful in handling conditions that were not perceived during HW design.

For performance reasons, if multiple channels are required, frames should be allowed to be multiplexed to different dedicated HW blocks at the same time. However, this implies that the adaptive properties of each channel must be maintained by all dedicated HW IP blocks. These properties should be stored in memory and then retrieved from memory as different blocks receive frames that require different adaptive properties. Therefore, a cache is ideally included to ensure unnecessary memory fetches were not required by the DMA engine prior to processing a frame. In order to determine which adaptive properties are required to be loaded by the HW block requires classification of network and wireless frames as they are received. Additional dedicated HW may be included to handle frame classification and queuing logic. A set of HW state machines may communicate to each other via private, HW dedicated buses between a frame processor, the queue processor, and the link layer encryption HW IP blocks. The GPP core(s) may provide the ability to configure the HW registers in each of these blocks via a peripheral memory bus. The peripheral memory bus may also be used for monitoring, dynamic reconfiguration, error conditions, and management (thru a network interface). In this approach, memory transactions are limited to the frame processor and link layer encryption blocks. HW blocks utilize a private bus for communication and the GPP accesses memory a very small percentage of time mostly for monitoring and management functions. Additional provisions can be provided that force received frames to be stored on memory aligned pages thereby reducing non-aligned memory transactions to a very small percentage of overall memory transactions. HW may generate memory transactions to access adaptive properties stored on a per channel basis.

A key component of a HW data path is the wireless MAC engine. The MAC engine, which may be a programmable engine, bridges wireless frames to the wired interface, decrypts/encrypts wireless link layer data & management frames, performs RF measurements of mobile devices, implements wireless roaming between base stations, provides network proxy ARP (if required) for mobile devices, provides per device instruction execution, and monitors the state of the mobile device at all times. As depicted in FIG. 11, the wireless MAC engine uses information such as instructions, VLAN tag info, 802.11 or cellular MAC template (used to modify frames to and from the mobile device), and reserved memory that is used by the engine in real-time to modify and/or bridge wireless frames.

Hardware Design and Verification

A key step in hardware design is to ensure the requirements are well defined and understood. In particular, functions that implement features such as the wireless link layer MAC subsystem I described earlier in this paper must be implemented with a thorough knowledge of the protocols so the proper functional decomposition can be accomplished between software and hardware. In particular, standards in the wireless area are changing all the time; the portions of the system that have a high degree of volatility should be implemented in software. However, after many years the data path for these technologies continues to converge toward IP based protocol services. The LTE EPC now is moving all traffic (even voice) to IP based data frames. This commonality aids in the development of hardware to support the data path. This ensures that even the latest technology can benefit from the development of the type of hardware technology contemplated by the present disclosure.

However, even functions that are implemented in software still require hardware support. Often this aspect is overlooked during the system design phase. For instance, how does software interact with the hardware to redirect its data path to a new base station? As discussed earlier, this may be aided by a hardware synchronized ability to perform an atomic operation while the data path is still active. Interruption of the data path would cause delay in frame transmissions to a device and reduce its perceived performance. In this case hardware may enable the ability to be updated on a per user basis without mobile devices losing their connectivity and network access. In order to implement this new hardware feature, a systematic review of all 802.11 and cellular specifications may be required to determine what features requirements would be required to achieve the end goal of having all data and voice packets from wireless technology to be handled fully in hardware (e.g. data path acceleration architecture).

Once the requirements have been completed and fully understood, the hardware interface requirements with other subsystems within the SoC must be evaluated to determine if they will impede the wireless subsystem from achieving its functional or performance requirements. All electrical interfaces should be evaluated to ensure that they meet the performance bench marks and that there is sufficient electrical interface support for system level interfaces required from other subsystems.

Figure 49:
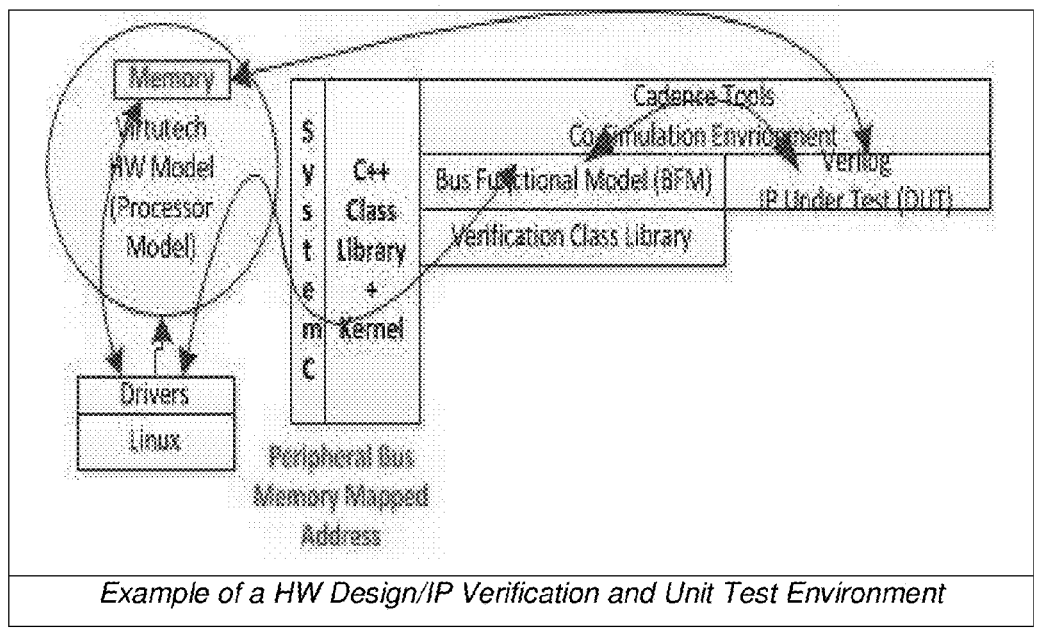
FIG. 49 is a simplified illustration showing an example of a HW design/IP verification and unit test environment.

During Verilog development there should be well defined interfaces between the functional hardware blocks. This is important at the very beginning because too often functions are duplicated or require too many additional wires of communication between the blocks which increases the die size, increases complexity, and increase the likelihood of failure particularly when implementing large designs. Implementation of combinatorial logic blocks should be consistent throughout the design to reduce complexity as an example when many personnel work on the same project. Once sufficient subsystems have been implemented, software should be written to interact with the test hardware simulation interfaces as early and often as possible so that problems can be spotted as early as possible. FIG. 49 depicts such an environment where Linux executes on a simulation of the processor instruction set and the software drivers are written within this environment to interact directly with the Verilog co-simulation environment through the use of SystemC adapters. The SystemC co-simulation adapters are provided by companies such as Virtutech (processor/system simulator and SystemC adapter) and Cadence tools (Verilog/SystemC adapters and simulator). Software engineers can implement software and test against the actual hardware during the hardware development cycle prior to hardware synthesis. In addition, randomized hardware simulations should run continuously (with hardware simulation probes) to catch timing problems and error signals that are caught during execution. When a random simulation fails, it is important to reproduce the failure; the hardware test co-simulation software should record parametric configuration information captured before each test. In only this way will test be reproduced and problems resolved efficiently.

Once all electrical interfaces have been defined, then these interfaces and their descriptions and definitions go into a requirements verification test matrix (RVTM), unit level test benches are created that imitate the electrical interfaces from other subsystems as well as connect all electrical interfaces to hardware signal sources. This enables the unit level tests to randomize patterns and clock edges across these electrical interfaces so that problems can be identified early and often. These tests then would feed into a larger collection of tests that are executed by system level test execution.

Hardware Simulation and Verification

In order to design the hardware and verify the function of a hardware subsystem, a hardware co-simulation environment may be required. This foundation for this environment is comprised of Verilog simulation using tools such as those developed by Cadence. Layered above this foundation are the Verilog hardware finite state machines that must be tested. In addition, software libraries built with the SystemC library may also be used to drive bus functional models to test the hardware. The Cadence co-simulation library provides SystemC adapters for their simulation environment that allow a SystemC model to connect digital logic to hardware connector names. Typically this is done through what is referred to as a "bus functional model". Such a model supports the ability to test individual hardware subsystems. Hardware subsystems interact with each other through the use of logic signals and buses. Assuming no transitional change of clock domains, all hardware subsystems are clocked with the same clock source; however, there are clock delays through different components used in a Verilog model such as combinatorial and sequential logic. Testing of individual subsystems entail the use of randomization of clock signals and data bits across all data buses and should include the variance of the clock signals within the specified operational range. As with all logic signals, these signals will vary temporarily (within a range) as a function of temperature and variances in the silicon and randomization of the skew of the clock signal is crucial to identify problems before synthesis. Building upon these subsystem tests, the subsystems are then connected together. New Bus Functional Models (BFM) are built that represent the new or combination of the new digital interfaces. As the tests include more and more logic blocks that must be simulated, the hardware test (SystemC) library needs to ensure that it is built as optimally as possible. The model must reduce unnecessary events (such as per pin events on a clock edge as an example), but be based upon a concept referred to as Transaction Level Modeling (TLM). This approach focuses on functional block events instead of events produced on each individual clock edge. When developing BFMs to connect to subsystems under test, it is important to base the event structure on TLM concepts. This approach still provides a very accurate digital signal timing display while the model runs at a very high rate of speed. As shown in FIG. 49, hardware models of IP within a SoC can be in a near cycle accurate way, with very acceptable performance, using the TLM based transaction model approach. In this example FIG. 49, a Linux operating system is executing on a simulation of the Power Architecture instruction set while executing a Linux kernel module that actually runs against the real hardware simulation using a shared (shared between the processor simulation) and the SystemC adapter that drives the logic pins on the Verilog model. The Verilog model actually executed and reacted as if it were already synthesized as part of the SoC. This testing would ensure that the Wireless Link Layer Subsystem hardware IP will execute as expected in real platform environments and ensure early testing of software can occur prior to tape-out of hardware.

Hardware tests are executed at the intended simulated clock speed of the hardware and are executed using a simulated clock signal at the programmed clock speed. An example of tests that are executed include the ability to skew the input and output digital signals in a random way to ensure the finite state machines are robust enough to handle differences found in silicon after SoC synthesis has occurred. Other tests include functionality tests to ensure that functions within the hardware Intellectual Property (IP) works as intended. Other tests include the random ordering of memory transactions to and from the hardware IP as well as negative testing. This simulation test software executes quickly because a very lightweight threading model is used to drive the hardware state machines. All hardware state machines are executed in simulation as they would in hardware. Each independently clocked state machine is another thread that executes in a round robin fashion to ensure that all clock dependencies are enforced.

Figure 50:
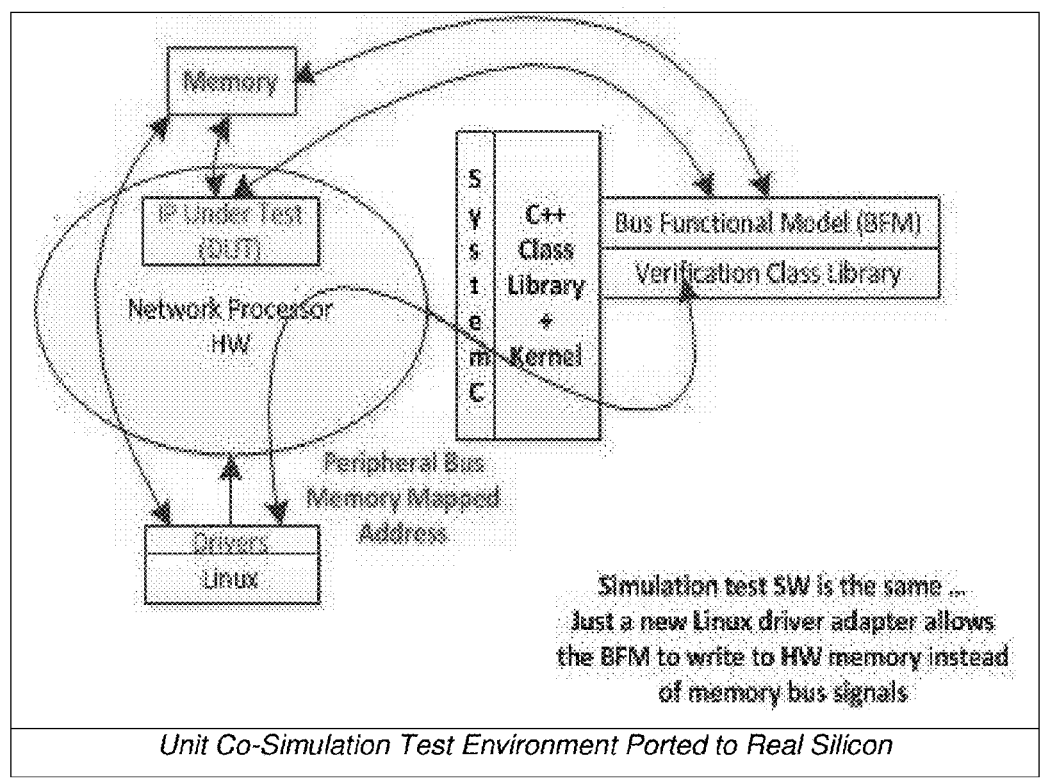
FIG. 50 is a simplified illustration showing a unit-co-simulation test environment ported to real silicon.
Figure 51:
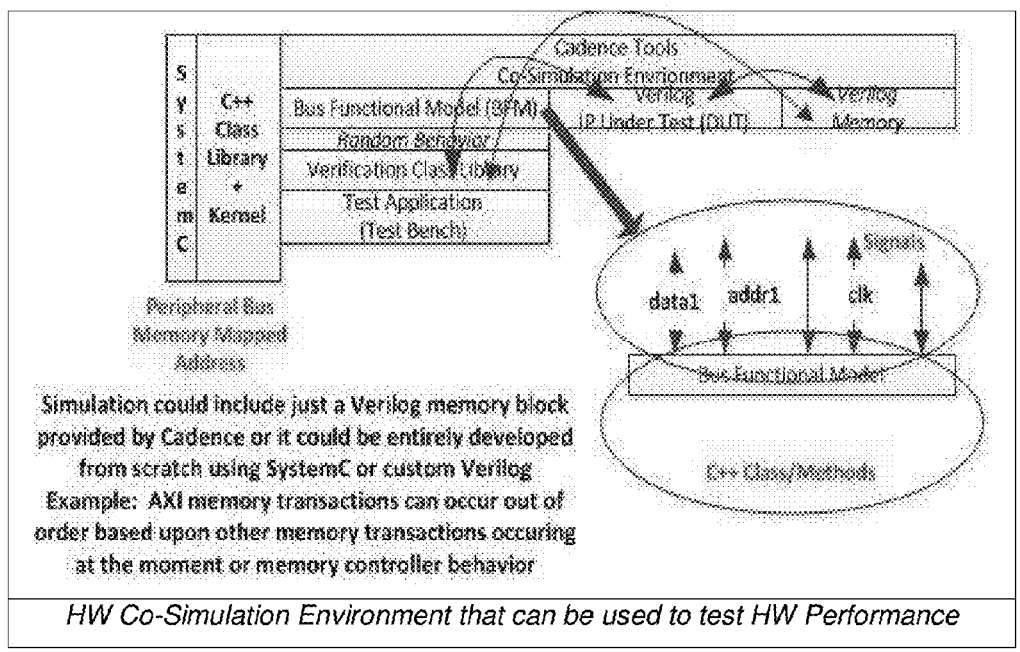
FIG. 51 is a simplified illustration showing an HW co-simulation environment used to test HW performance.
Figure 54:
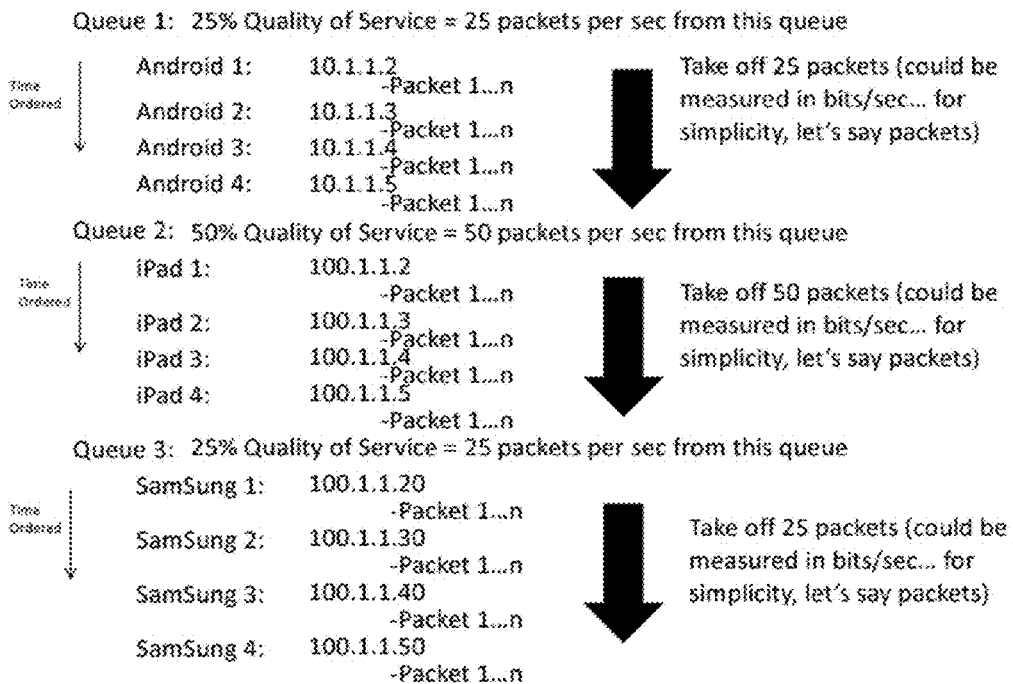
FIG. 54 is a simplified illustration showing additional details regarding end user service based queuing.
Figure 55:
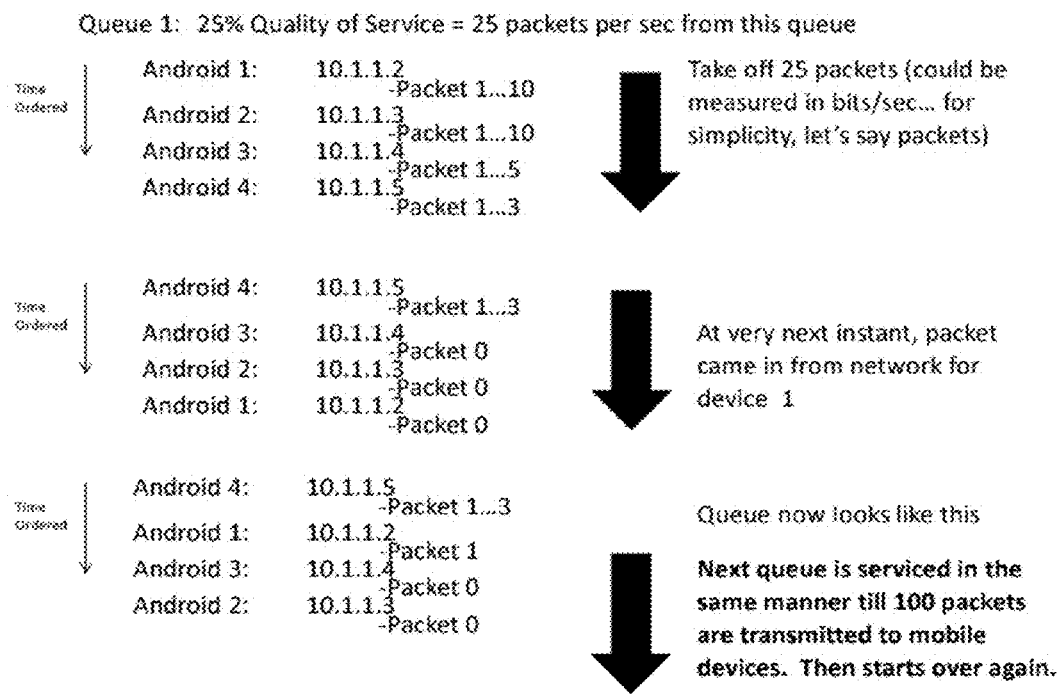
FIG. 55 is a simplified illustration showing additional details regarding end user service based queuing.

This same model can then be applied to a real synthesized SoC. Instead of the peripheral and memory buses being simulated virtual memory of a test processor running our memory simulation model, we use real system memory and write to real peripheral bus memory interfaces. Thus no changes to the actual tests need occur, just simply modify the memory adapters in the model so they map directly to SoC memory, not simulation memory. An example of this is depicted in FIG. 50.

Note how the Linux kernel modules (e.g. drivers) are used to provide the mapping between application simulation memory and real system memory. The hardware only understand hardware addresses, so all memory translations must occur between the co-simulation application and the real hardware memory map. Thus, the memory writes all occur (not across a simulated bus to simulated memory) to real system memory. Randomization of clock gitter has been especially helpful in finding bugs that may have escaped our testing prior to developing this functional verification, validation, and performance testing software tools and libraries.

Hardware Performance Simulation

Using the Cadence co-simulation environment with a simulated memory gasket and a robust SystemC test class library, unit level tests can be executed at the simulated clock rate that the target hardware will execute. By measuring simulation time, number of hardware clocks, and unit of time (e.g. seconds), hardware IP designers can ascertain if the design meets the required performance specifications. In addition to running the design as a cycle-accurate simulation, this environment can support executing the design at higher than planned clock rates to determine how performance can be improved in the future. This environment also includes randomization of the address ranges utilized so that an accurate model can be measured as it relates to real-world memory latency due to system memory collisions (e.g. heavy utilization). HW performance is not based upon raw bus rates, it based upon the ability of the hardware to reach a rate of speed that meets the minimum performance specifications. For example, a memory gasket can perform at 6.4 GB/sec; however, it can never reach that because it can only support 3 memory transactions at one time. This is because the memory bus interface being used will only be used for a large number of relatively short memory transactions, not one large transaction. Therefore, though the raw performance of the bus is impressive, it does not meet the requirements because with only 3 transactions allowed in parallel, we are limited to only a very small fraction of the maximum bandwidth.

This does not replace the testing of subsystems that interact with the hardware IP under test. Connected subsystems must meet their performance specification and must be tested to ensure their committed performance target is met when used as intended by the end product user. Hardware can be designed to meet a performance specification, but the preconditions and post conditions are important. If the only way the hardware is going to meet its performance target is to use it in a way that would never occur in its actual use, it should be considered compliant with the requirements.

FIGS. 52-55 disclose a concept of providing end use equipment based routing and frame processing. In other words, a HW construct/object may be maintained that represents facets of the end-user equipment so that HW QoS and frame queues can be based upon end user equipment as opposed to IP subnets and end application IP ports. Instead of applying QoS rules based upon IP subnets (and application port numbers) one can make QoS and frame processing decisions in HW based upon the state of end-user equipment thereby reducing bandwidth associated to devices that are backing up or have become despondent. IP backoff and delays can be very long and expensive in RF domain; often these delays are experienced by end users.

In one example, a wireless carrier may specify that LTE phones get 60% RF bandwidth across a set of eNodeB's, while other phones associated with a different carrier get 40%. This is managed across several cell areas meaning this BW ratio is not distributed to each end node but globally across a physical region.

FIGS. 52-55 exemplify a novel embodiment of queuing supported by a novel HW implementation that is not supported by network routers today. The FIGS. show not a standard weighted fair queuing or generalized processor approach that runs in standard routers, but rather, an approach that links these QoS mechanisms into packet processing in novel IP hardware.

Consistent with FIGS. 52-55, in one embodiment, the multi-nodal wireless communication system 100 provide end user equipment based routing and frame processing. This means maintaining a HW construct/object that represents facets of the end-user equipment so that HW QoS and frame queues can be based upon end user equipment as opposed to IP subnets and end application IP ports. Instead of applying QoS rules based upon IP subnets (& application port #'s), one can make QoS and frame processing decisions in HW based upon the state of end-user equipment thus reducing bandwidth associated to devices that are backing up or have become despondent. IP backoff & delays can be very long and expensive in RF domain; often these delays are experienced by end users.

As an example, it may be configured that phones for a first wireless carrier receive 60% RF bandwidth across a set of eNodesBs, while a second carrier gets 40%. This may be managed across several cell areas meaning the bandwidth ratio may not be distributed to each end node but globally across a physical region.

It should be understood from the foregoing that, while particular embodiments have been illustrated and described, various modifications can be made thereto without departing from the spirit and scope of the invention as will be apparent to those skilled in the art. Such changes and modifications are within the scope and teachings of this invention as defined in the claims appended hereto.

What is claimed is:

1. A multi-nodal wireless communications system, comprising:
    at least one system controller configured to create a link layer communication network, the system controller comprising a set of hardware finite state machines configured to:
        receive a network frame buffer from a base station associated with the link layer communication network;
        evaluate a source address of the base station;
        translate the source address to a unique ID value;
        transmit the unique ID value to a hardware queue;
        construct at least one predefined frame header template associated with data transmission between an end user device associated with the link layer communication network and the base station by a wireless protocol engine;
        receive a frame from the end user device associated with the link layer network as a request for the data transmission;
        identify that the frame includes the unique ID value;
        retrieve instructions and classifications associated with the unique ID value to locate the at least one predefined frame header template; and
        process the frame using the instructions and classifications and the at least one predefined frame header template and transmit to a wide area network (WAN).

2. The system of claim 1, wherein the set of hardware finite state machines is further configured to:
    receive a network frame from the WAN;
    evaluate a destination address associated with the network frame;
    translate the destination address to the unique ID value;
    transmit the unique ID value to the hardware queue;
    construct the at least one predefined frame header template associated with the base station and the end user device associated with the link layer communication network by the hardware queue; and
    process the network frame using the instructions and the classifications and the at least one predefined frame header template and transmit the network frame to the base station so that the base station transmits the network frame to end user device.

3. The system of claim 1, wherein the base station of the link layer communication network is associated with at least one of a cellular base station, 802.11 device, Wi-Fi router, or Wi-Fi access point.

4. The system of claim 1, wherein the link layer communication network is implemented using Ethernet technology.

5. The system of claim 1, further comprising integrating a plurality of Wi-Fi and cellular networks into the link layer communication network using virtual local area network (VLAN) technology.

6. The system of claim 1, wherein the system controller further comprises at least one memory for storing instructions that are executed by at least one processor to cause the system controller to:
measure radio frequency performance across a plurality of radios of the link layer communication network;
associate the end user device with a first radio of the link layer communication network;
associate the end user device with a second radio of the link layer network to replace the first radio to manage roaming without knowledge of the end user device.

7. The system of claim 6, wherein the radio frequency performance is based upon power spectral density and radio frequency noise measurements scheduled and recorded by the system controller HW state machine where RF measurements are performed by cellular and WiFi base stations and end user equipment.

8. The system of claim 6, wherein a same location area code is used for different radios of the plurality of radios of the link layer communication network across disparate physical areas.

9. The system of claim 1, wherein the address includes a Media Access Control (MAC) address, Internet Protocol (IP) address, or unique cellular identifier.

10. A multi-nodal wireless communications system, comprising:
at least one system controller configured to create a link layer communication network, the system controller comprising a set hardware finite state machines configured to:
receive a frame from a first end user device associated with the link layer communication network as a request for data transmission;
identify that the frame includes a unique ID value;
transmit the unique ID value to an associated hardware queue, the hardware queue configured to construct at least one frame header associated with a base station to facilitate data transmission between the base station and the first device or between the first device and the network using one frame header; and
process the frame in the link layer communication network by facilitating communication between the first device and the base station using the at least one frame header or between the first device and the network using one frame header.

11. The system of claim 10, further comprising allocating a first predetermined bandwidth of the link layer communication network to the first device based upon end user service based queuing.

12. The system of claim 11, further comprising allocating a second predetermined bandwidth greater than the first predetermined bandwidth of the link layer communication network to a second device based upon end user service based queuing and an end user device prioritization configuration.

13. The system of claim 10, wherein the link layer communication network includes a plurality of cellular and Wi-Fi networks.

14. The system of claim 10, wherein the link layer communication network communicates a temporary mobile subscriber identity, an international mobile subscriber identity, and a temporary logical link identifier of the first device between different base stations of the link layer communication network to improve the speed at which the first device changes from one Location Area Code (LAC) to another.

15. A method of transmitting data frames in a multi-nodal wireless communications system, comprising:
utilizing a system controller configured to create a link layer communication network, the system controller including a set of hardware finite state machines configured to perform the operations of:
receiving a first frame from a device associated with the link layer communication network as a request for data transmission;
identifying that the first frame includes a unique identifier;
transmitting the unique identifier to an associated hardware queue, the hardware queue configured to construct at least one predefined frame header associated with a base station to facilitate data transmission between the base station and the device; and
processing the first frame in the link layer communication network by facilitating communication between the device and the base station using the at least one predefined frame header.

16. The method of claim 15, further comprising transmitting the unique identifier to the associated hardware queue based upon instructions and classifications associated with the unique identifier and stored in a memory of the set of hardware finite state machines.

17. The method of claim 15, further comprising:
measuring radio frequency performance across a plurality of radios of the link layer communication network to manage roaming for the device; and
associating the device with a first radio based upon the radio frequency performance and noise interference measurements.

18. The method of claim 17, further comprising associating the device with a second radio based upon a change in the radio frequency performance.

19. The method of claim 17, wherein the roaming for the device is managed centrally by the system controller.

20. The method of claim 17, further comprising measuring the radio frequency performance using hardware of the device.

* * * * *